(12) United States Patent (10) Patent No.: US 7,577,571 B2
Yui (45) Date of Patent: Aug. 18, 2009

(54) ELECTRONIC APPARATUS, TIME PERIOD CHARGING SYSTEM, TIME PERIOD CHARGING METHOD, AND CHARGING MANAGEMENT SYSTEM FOR ELECTRONIC APPARATUS

(76) Inventor: Yasuji Yui, 7-35, Kitashinagawa 6-Chome, Shinagawa-ku, Tokyo (JP)

( * ) Notice: Subject to any disclaimer, the term of this patent is extended or adjusted under 35 U.S.C. 154(b) by 753 days.

(21) Appl. No.: 10/259,166

(22) Filed: Sep. 27, 2002

(65) Prior Publication Data
US 2003/0088523 A1 May 8, 2003

(30) Foreign Application Priority Data
Sep. 28, 2001 (JP) .............................. 2001-300961

(51) Int. Cl.
*G06Q 10/00* (2006.01)
*G06Q 30/00* (2006.01)
(52) U.S. Cl. ............................................. 705/1; 705/26
(58) Field of Classification Search .................... 705/32
See application file for complete search history.

(56) References Cited

U.S. PATENT DOCUMENTS

| | | | | |
|---|---|---|---|---|
| 5,943,650 | A * | 8/1999 | Kanno | 705/1 |
| 6,018,726 | A * | 1/2000 | Tsumura | 705/412 |
| 6,061,668 | A * | 5/2000 | Sharrow | 705/400 |
| 6,243,450 | B1 * | 6/2001 | Jansen et al. | 379/144.01 |
| 6,618,772 | B1 * | 9/2003 | Kao et al. | 710/15 |
| 6,862,684 | B1 * | 3/2005 | DiGiorgio | 713/163 |
| 6,938,025 | B1 * | 8/2005 | Lulich et al. | 706/45 |
| 2002/0022971 | A1 * | 2/2002 | Tanaka et al. | 705/1 |
| 2002/0025795 | A1 * | 2/2002 | Sharon et al. | 455/405 |
| 2002/0147693 | A1 * | 10/2002 | Banerjee et al. | 705/400 |
| 2002/0173977 | A1 * | 11/2002 | Dutta | 705/1 |
| 2004/0073451 | A1 * | 4/2004 | Maari | 705/1 |

* cited by examiner

*Primary Examiner*—F. Zeender
*Assistant Examiner*—Asfand M Sheikh
(74) *Attorney, Agent, or Firm*—Wolf, Greenfield & Sacks, P.C.

(57) ABSTRACT

The invention provides an electronic apparatus, a time period charging system, a time period charging method, and a charging management system for an electronic apparatus which eliminate various problems arising from a conventional charging method wherein an equivalent is paid to the proprietary right of contents. It is first discriminated whether or not contents data are of the type wherein use thereof should be charged based on information representative of a time period within which the contents data are used. Then, at least one of a time period within which the contents data are used and a time period within which the electronic apparatus is used is measured based on a result of the discrimination. When the contents data are of the type described, information to be used for the charging process is produced based on at least one of the information of the time period of use of the contents data and the information of the time period of use of the electronic apparatus. However, when the contents data are not of the type described, information to be used for the charging process is produced based on the information of the time period of use of the electronic apparatus.

33 Claims, 64 Drawing Sheets

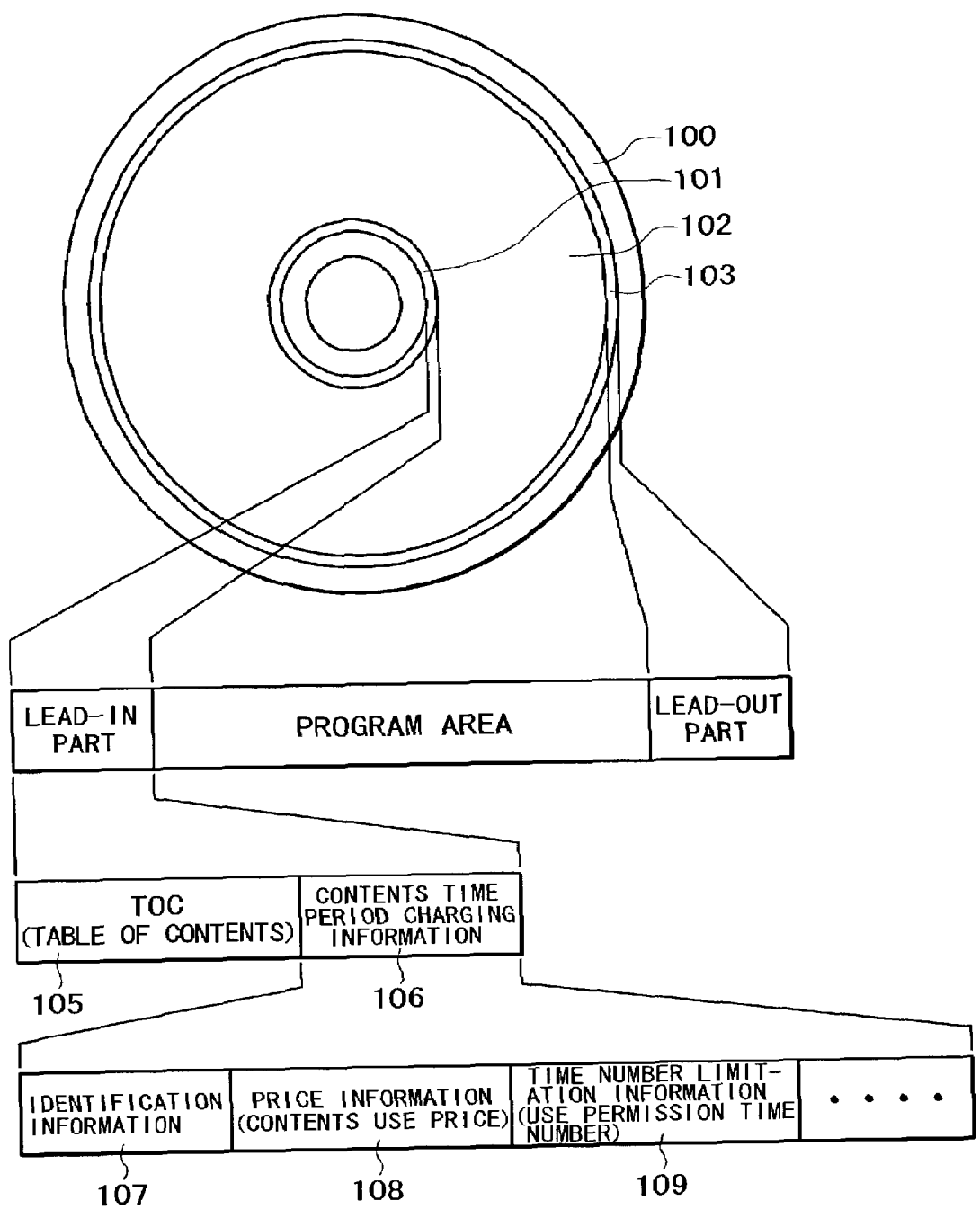

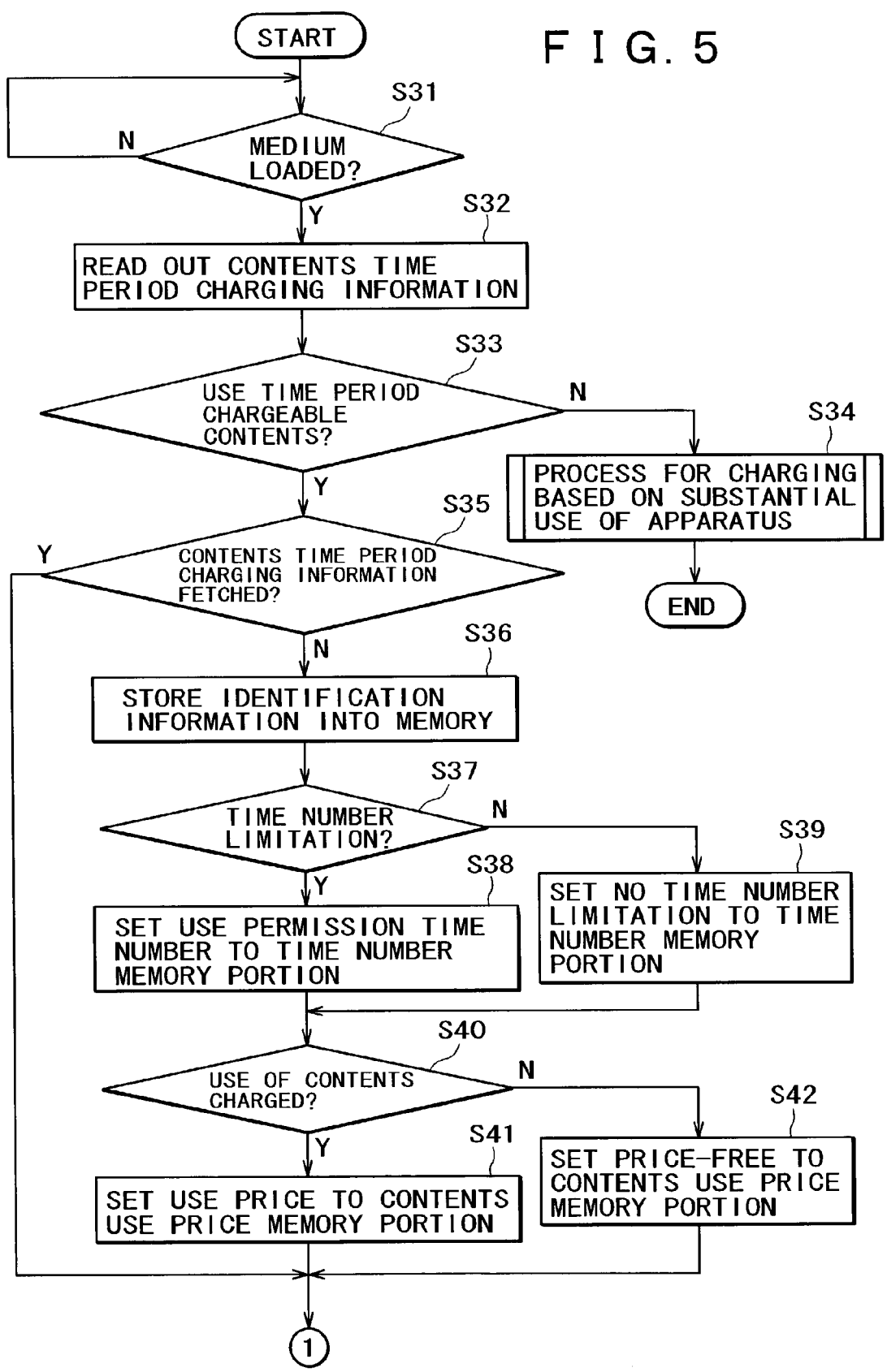

F I G. 7
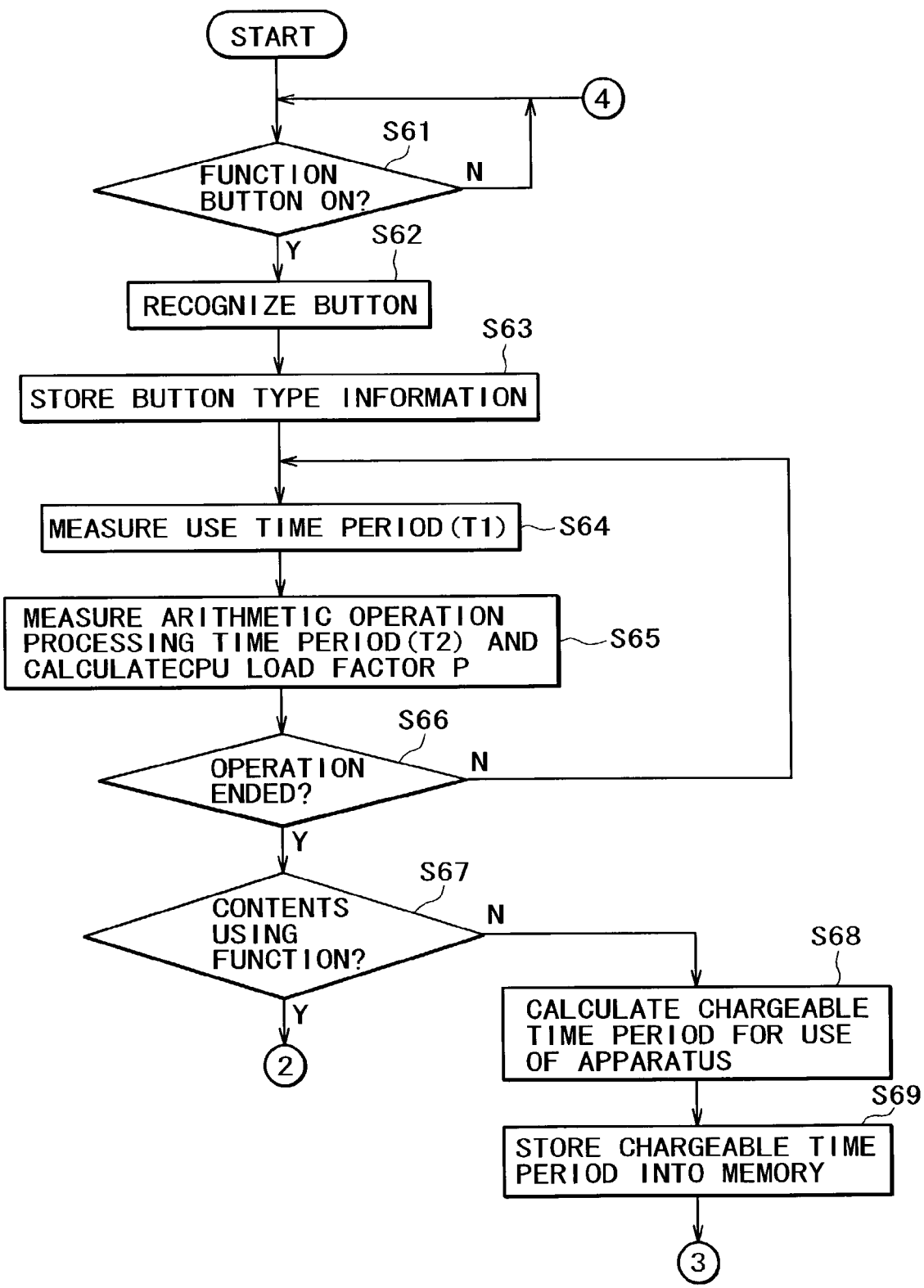

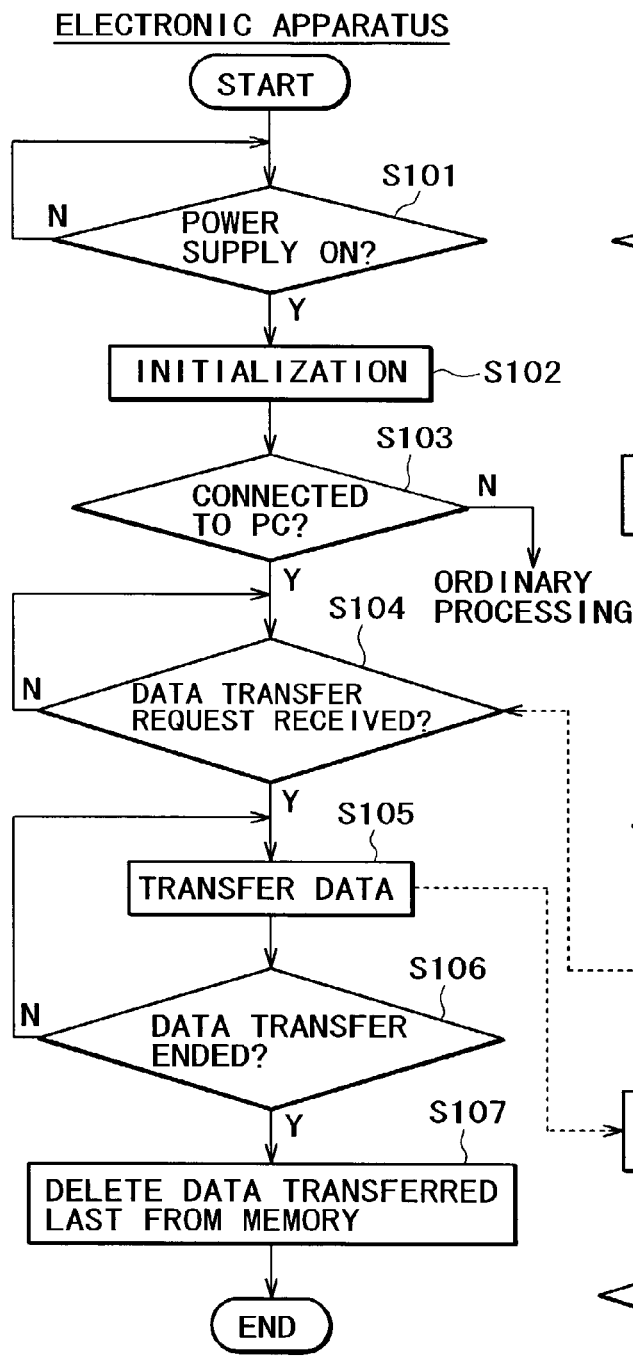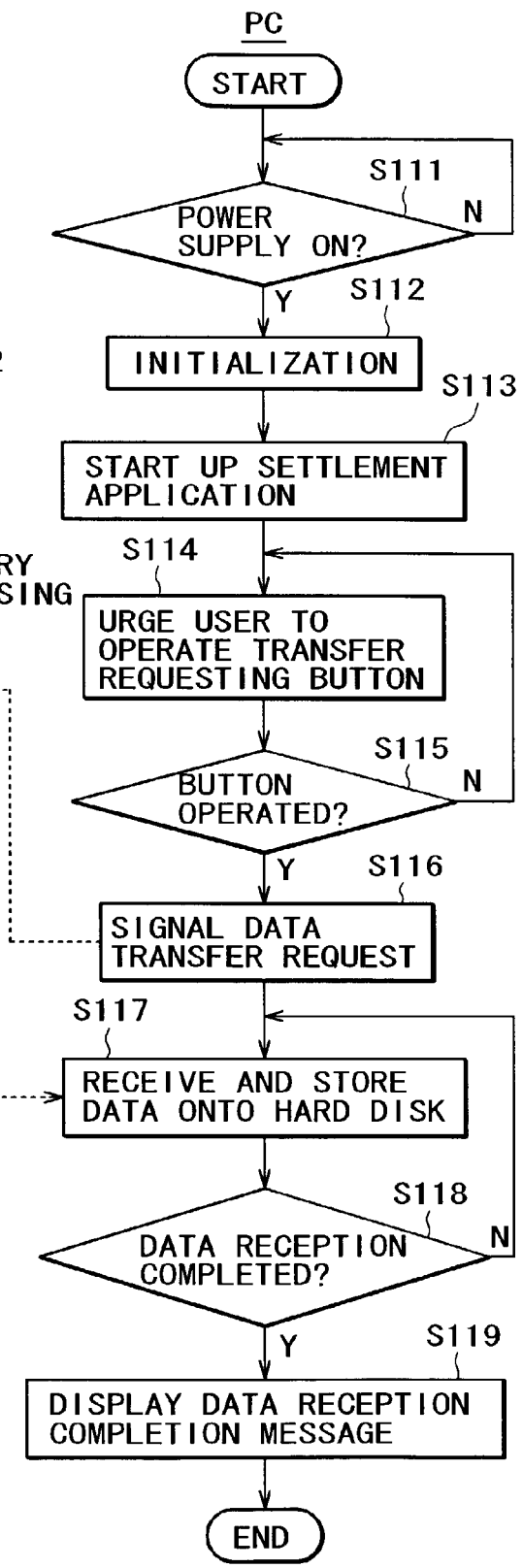

F I G. 3 6
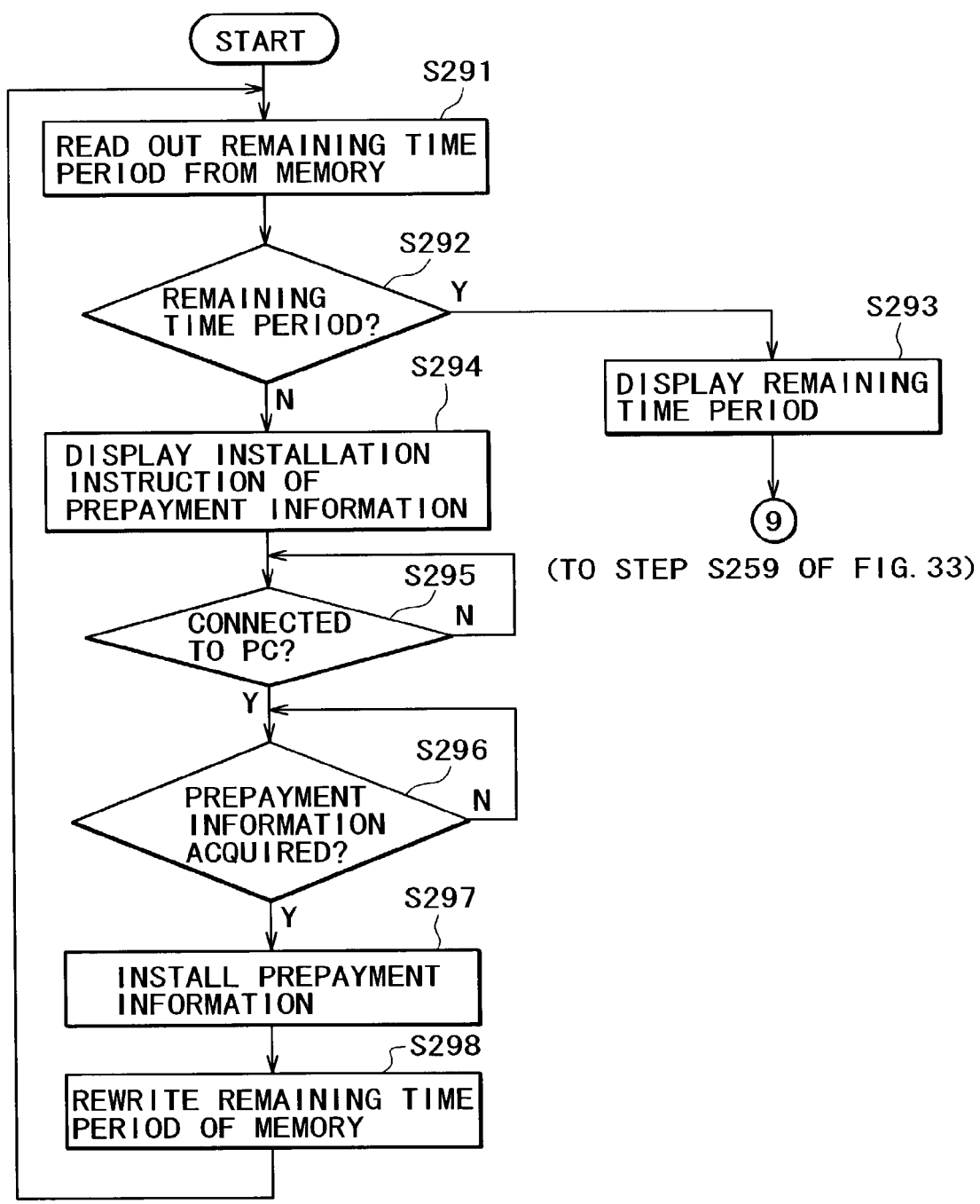
(TO STEP S259 OF FIG. 33)

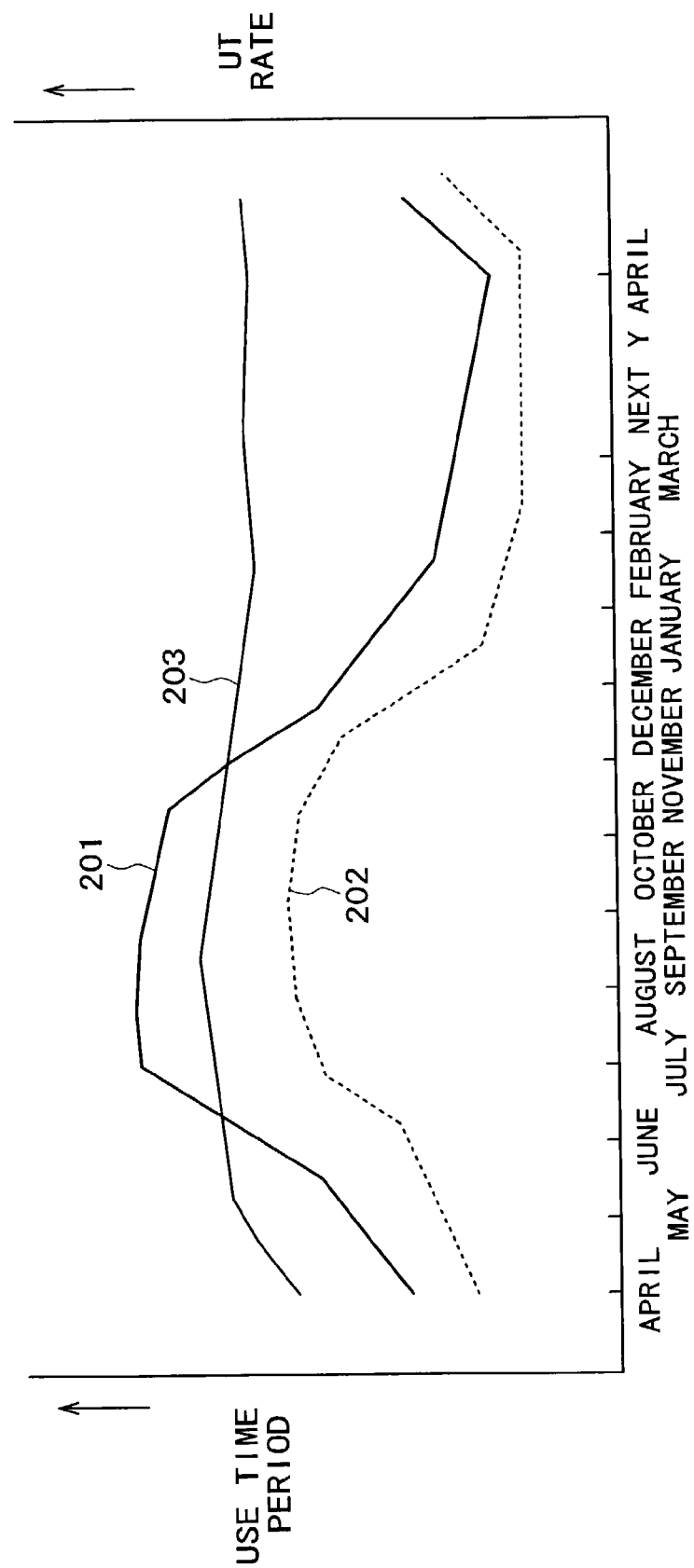

F I G. 4 3
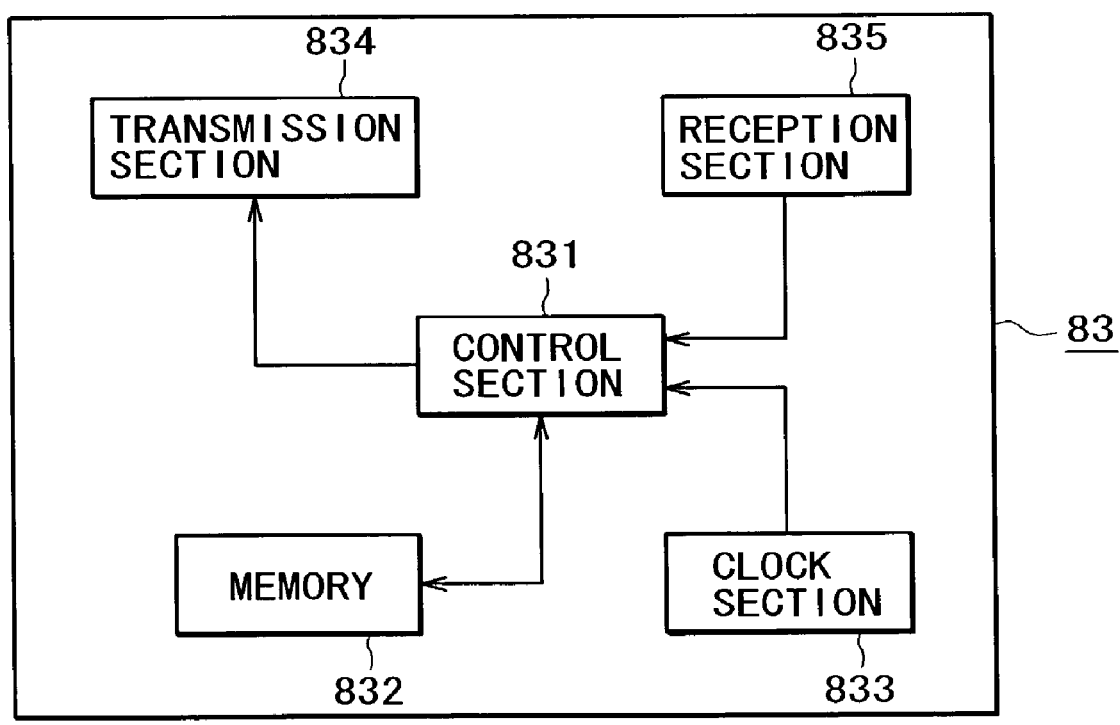

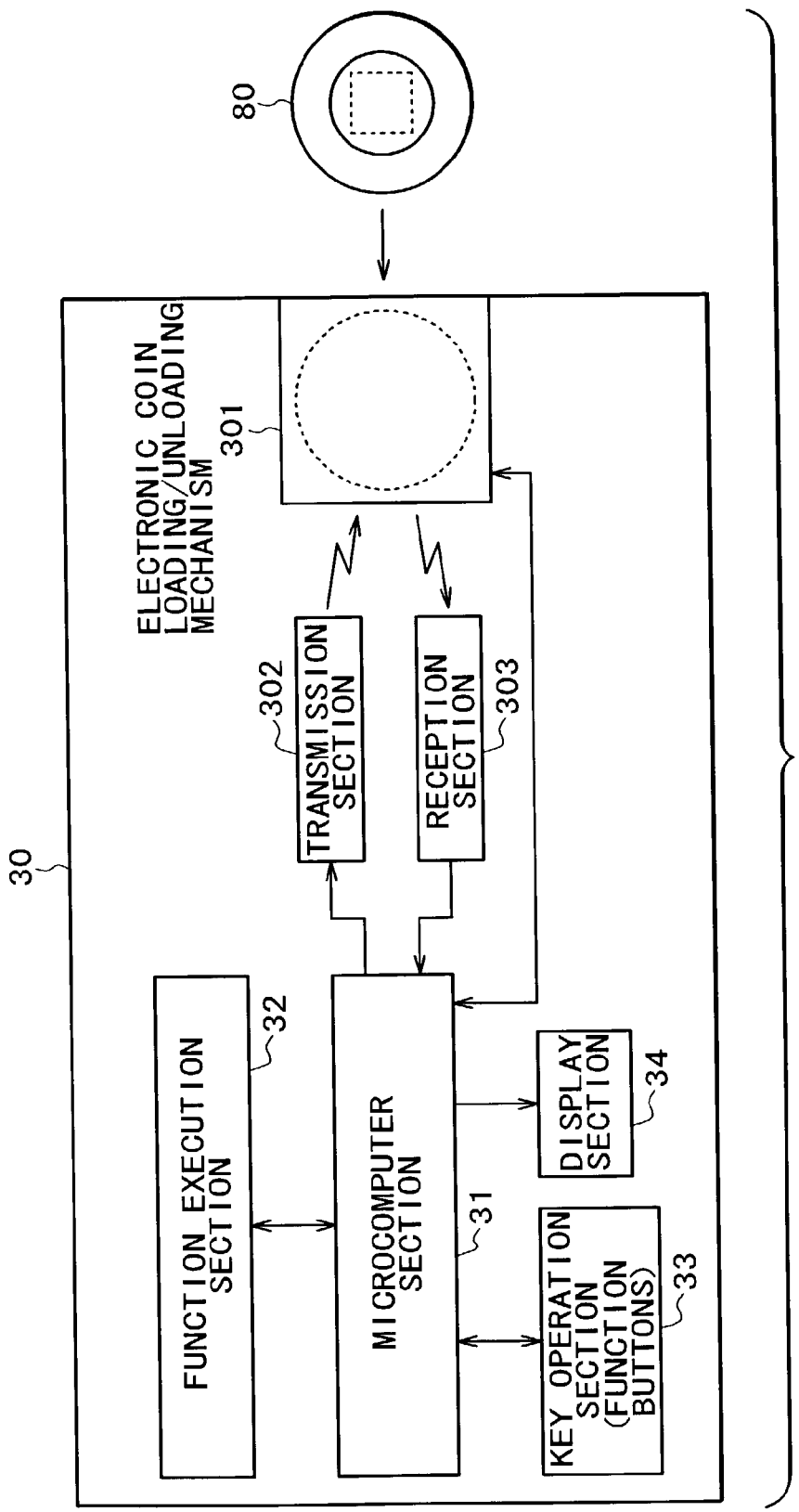

F I G. 5 9
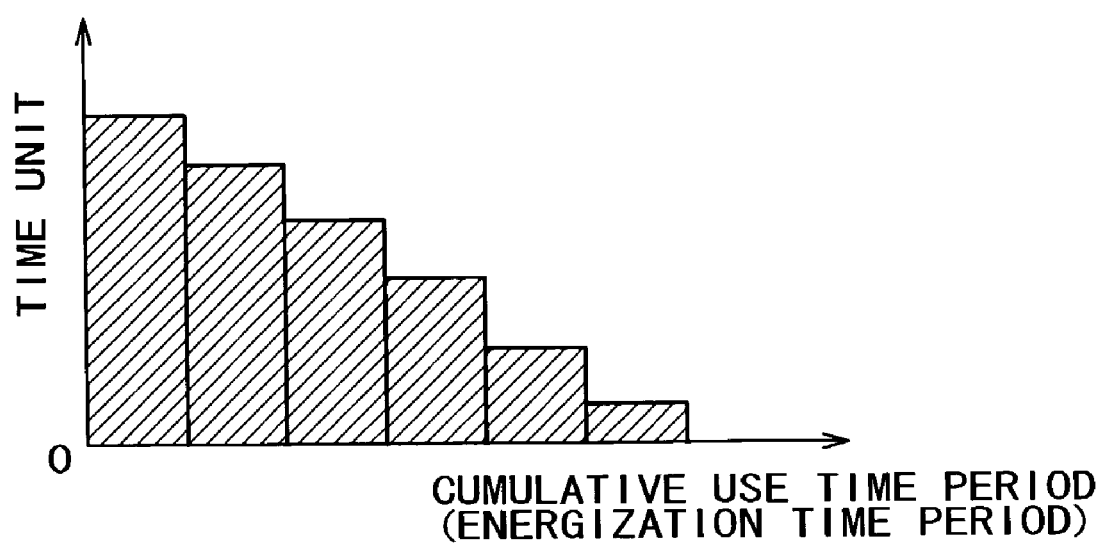

ELECTRONIC APPARATUS, TIME PERIOD CHARGING SYSTEM, TIME PERIOD CHARGING METHOD, AND CHARGING MANAGEMENT SYSTEM FOR ELECTRONIC APPARATUS

BACKGROUND OF THE INVENTION

This invention relates to a system for and a method of imposing a charge for a substantial period of time of use of an apparatus and/or contents without selling the apparatus itself or the contents themselves and further to an electronic apparatus for use with the system and the method.

In the present specification, the term "contents" is used to signify contents which are stored or recorded in or on a storage medium or a recording medium and provided as such to a user or contents which are provided to a user through the Internet or a broadcast.

Meanwhile, contents data are used to include image data such as moving pictures and still pictures, sound data such as tunes, voices and environmental sound, text data of characters and symbols, graphic data, program data of games and so forth and accompanying data to the program data, and program data and incidental data of application programs.

Conventionally, a system commonly employed is that a user buys a product and pays the price as an equivalent for the product itself to acquire the proprietary right of the product.

According to the conventional system, a buyer of a product pays the price for the product irrespective of whether the product is used or not used. In other words, according to the conventional system, the buyer pays the price also for a period of time within which the product is not used merely because the product is owned by the buyer. Since the value of a product can be enjoyed originally when it is used, it is regarded that, for the product which has not been used after it was purchased, the unnecessary money was paid.

Further, the product cycle of high-technology products such as a computer in recent years is so short that, after a product is purchased, a new product is placed on the market before the product is used sufficiently. Therefore, a user who has bought an old product before a new product is on the market may feel unprofitable in that, when such a new product is on the market, the user has purchased the product too early.

Furthermore, a user who wants to have a product which has advanced functions will have to pay, every time a new product is on the market, the total amount of the price as an equivalent to the product, and this imposes a significant economical burden on the user.

Taking the foregoing into consideration, another system wherein an equivalent is paid for a substantial period of time of use of a product to eliminate the problems described above has been proposed by the applicant of the present patent application (Japanese Patent Laid-Open No. 2000-354953).

FIG. 58 shows a general configuration of an example of the charging system proposed priorly which is based on a substantial time period of use of a product. In the charging system shown, the charging object product is an electronic apparatus, and an equivalent for a use time period of the charging object product is paid later.

In the example, the amount of money to be paid by the user is set as of the depreciation type wherein, while the product is new, the time period unit price is high, and as the cumulative use time period increases, the time period unit price is set lower such that, after the cumulative use time period comes up to a predetermined time period, that is, after the cumulative paid amount of money comes to a predetermined level, the time period unit time is set to zero.

Meanwhile, the electronic apparatus of the charging object product, such as an Internet television receiver, incorporates a microcomputer system and can be connected to a digital communication network such as the Internet.

In the charging system of FIG. 58, a user 1 concludes a contract of use of an electronic apparatus 3 of a charging object product with an apparatus providing source 2. When the electronic apparatus 3 is used, it is connected to a digital communication network 4 such as the Internet. Also a charging management system 5 of the apparatus providing source 2 is connected to the digital communication network 4.

Since the contract in this instance is not a sales contract, the user 1 does not pay a price at a point of time when it receives the product, but pays a price based on a use time period of the electronic apparatus 3. Besides, in the charging system of FIG. 58, the user 1 pays the price for its use time period in the depreciation type.

When the contract is concluded, the user 1 makes an agreement with the apparatus providing source 2 on a method of settlement of the price for a period of time of use. While various settlement methods are applicable, description is given of a case wherein a bank or a credit company is utilized to make the settlement of the price.

The electronic apparatus 3 of the charging object product has a function of measuring a substantial operation time period as a time period of use and storing a cumulative time period of use into a built-in memory or an external memory as hereinafter described. In the charging system of FIG. 58, the time period within which the electronic apparatus 3 is energized after the power supply to it is made available is used as the substantial operation time period. In this instance, the time period is counted by incrementing a count value for each unit time period such as, for example, 1 minute.

The user 1 to whom the electronic apparatus 3 which is a charging object product from the apparatus providing source 2 is provided reports the cumulative time period of use stored in the memory of the electronic apparatus 3 to the apparatus providing source 2 over the digital communication network 4 for every settlement time determined in advance, for example, for each one month or in response to a settlement time coming notification from the apparatus providing source 2.

The charging management system 5 of the apparatus providing source 2 measures, based on the cumulative use time period reported thereto, the use time period from the last settlement time to the current settlement time as a time period of the charging object (in the following description, the time period of a charging object is referred to as chargeable time period). Then, the charging management system 5 determines a time period unit price for the current charging calculation based on the cumulative use time period reported thereto. Here, the time period unit price is a use price per the unit time period.

FIG. 59 illustrates a relationship between the cumulative use time period and the unit time price. In particular, as the cumulative use time period increases, the unit time price gradually decreases, and after the cumulative use time period reaches a predetermined time period, that is, after the amount of money paid comes to a certain amount, the unit time price becomes zero.

The charging management system 5 of the apparatus providing source 2 stores a unit time price table of the relationship illustrated in FIG. 59 and refers to the cumulative use time period reported thereto and the time period unit table to determine a time period unit price to be used for charging then. Then, the time period unit price is multiplied by the chargeable time period at the current settlement time to calculate a current use price and bills the user 1 to pay the calculated use price.

The user 1 pays the use price in response to the bill in accordance with the settlement method set in advance. Thus, the charging management system 5 of the apparatus providing source 2 confirms the payment of the use price. Then, if the payment of the use price is not confirmed till the settlement date, then the charging management system 5 sends a key for switching off the functions of the electronic apparatus 3 to the electronic apparatus 3. In response to the reception of the key for switching off the functions, the functions of the electronic apparatus 3 are switched off thereby to disable the electronic apparatus 3 or restrict operation of the electronic apparatus 3.

Then, if the charging management system 5 thereafter confirms payment of the use price from the user 1, then it sends a key for switching on the functions of the electronic apparatus 3 to the electronic apparatus 3. In response to reception of the key for switching on the functions, the electronic apparatus 3 switches on the functions thereof thereby to allow the use of the electronic apparatus 3 by the user 1 to be re-started.

FIG. 60 illustrates a flow of operation of the charging system described above before use of the electronic apparatus 3 is started where a bank or a credit company is utilized. Meanwhile, FIG. 61 illustrates communication among the user 1, the apparatus providing source 2 and a bank or credit company 6 when use of the electronic apparatus 3 is started.

Referring to FIG. 60, the user 1 first acquires the electronic apparatus 3 as a charging object product from the apparatus providing source 2. Thereupon, a product identifier (hereinafter referred to as production ID) is written into the memory of the electronic apparatus 3. The production ID may be written upon production of the product in advance or may alternatively be written into the memory when the product is provided.

Then, the production ID and a user identifier (hereinafter referred to as user ID) are registered in a coordinated relationship with each other as user management information into the charging management system 5 of the apparatus providing source 2 (step A).

Then, if the user does not have a bank account or a credit card, then the user performs a procedure for opening a bank account or an account of a credit company (step B). Then, the user registers a bank account number, a credit card number or a personal identification number into the memory of the electronic apparatus as a charging object product (step C).

Thereafter, the user 1 notifies the charging management system 5 of the apparatus providing source 2 of start of use of the electronic apparatus 3 as indicated as "(1) Communication of start of use" in FIG. 61 (step D). The information included in the communication information upon such start of use includes notification information of the start of use, the product ID, the name of the user, the bank account number, the credit card number (account number of the credit company) and a password such as the personal identification number.

After the setup of the electronic apparatus 3 is completed and the communication of start of use to the charging management system 5 is performed in this manner, the charging management system 5 confirms the user and the account of the user from the bank or credit company 6 using the name of the user, the account number or the card number in the communication information.

Then, if the user and the account are confirmed, then the charging management system 5 sends the key for switching on the functions to the electronic apparatus 3 as an approval of permission of the start of use as indicated as "(3) Approval" in FIG. 61. Consequently, the functions of the electronic apparatus 3 are permitted to operate and the user 1 can start use of the electronic apparatus 3.

FIG. 62 shows an example of a configuration of the electronic apparatus 3 in the management system of FIG. 58. Referring to FIG. 62, the electronic apparatus 3 shown includes a control section 11 for controlling the entire electronic apparatus 3, a hardware section 12 for executing functioning actions of the electronic apparatus 3, a nonvolatile memory 13, and a network section 14 for establishing a connection to the digital communication network 4.

Though not shown, the control section 11 includes firmware for controlling the electronic apparatus 3, software for controlling the charging system, software for controlling on/off of functions and so forth. Further, the control section 11 includes a counter section 15 for measuring a unit time to be used as a unit for charging. Furthermore, the control section 11 includes a clock section 16 for managing a settlement time such as every one month.

The control section 11 uses the software for controlling on/off of functions to perform on/off control of the hardware section 12 based on the keys for switching on and off functions acquired from the charging management system 5 through the network section 14.

The nonvolatile memory 13 stores the product ID and the bank account number, credit card number or personal identification number as described hereinabove. Further, the nonvolatile memory 13 stores a cumulative value of a time period of use (cumulative time period of use) as a substantial operation time period measured by the charging system controlling software of the control section 11.

The counter section 15 of the control section 11 measures the time period within which the electronic apparatus 3 remains energized after the power supply to the electronic apparatus 3 is made available, and issues a unit time period lapse output signal such as a carry signal when the measured time reaches the unit time.

The charging system controlling software of the control section 11 reads out the cumulative use time period from the nonvolatile memory 13 when the unit time period lapse output signal is outputted from the counter section 15, and increments the cumulative use time period by "1". Then, the charging system controlling software writes the incremented cumulative use time period back into the nonvolatile memory 13. Consequently, the cumulative use time period is always stored in the nonvolatile memory 13.

Further, if the charging system controlling software of the control section 11 discriminates based on the clock information from the clock section 16 that a settlement time comes, then it reads out data including information of the cumulative use time period and information of the product ID and the user ID from the nonvolatile memory 13 and signals the data into the digital communication network 4 through the network section 14 designating the charging management system 5 of the apparatus providing source 2 as a destination.

In response to transmission of the cumulative time period of use and so forth at the settlement time, a bill for the price for the present time period of use is transmitted from the charging management system 5 to the electronic apparatus 3. Consequently, the control section 11 of the electronic apparatus 3 displays the price on a screen of a display unit 17 which may be, for example, a liquid crystal display (LCD) unit. Thereupon, since also a due date is transmitted from the charging management system 5, the control section 11 displays it on the screen of the display unit 17.

If the user 1 does not pay the price even after the due date elapses, then the key for switching off the functions of the electronic apparatus 3 is sent from the charging management system 5 to the electronic apparatus 3. The control section 11 of the electronic apparatus 3 receives the key and thus switches off the hardware section 12 to disable the electronic apparatus 3. Thereafter, if the user 1 completes its payment of the price for the current use time period, then the key for switching the functions of the electronic apparatus 3 is sent from the charging management system 5 to the electronic apparatus 3. The control section 11 switches on the hardware section 12 to return the electronic apparatus 3 into a state wherein the electronic apparatus 3 can be used.

FIG. 63 illustrates a flow of charging in the charging system, and FIG. 64 illustrates a flow of payment of a price where a bank or a credit company is utilized.

Referring to FIG. 63, in the electronic apparatus 3 of the charging object product, the control section 11 consistently performs measurement of a cumulative use time period as described hereinabove (step S1). Then, the control section 11 of the electronic apparatus 3 uses the clock section 16 to supervise whether or not the electronic apparatus 3 is used for a fixed time period after the last payment, that is, whether or not a current settlement date comes (step S2). Then, if it is discriminated that the settlement date comes, then the control section 11 of the electronic apparatus 3 transmits information at least of the product ID and the cumulative use time period to the charging management system 5 of the apparatus providing source 2 over the digital communication network 4 (step S3 and "(1) Use time period" of FIG. 64).

The charging management system 5 specifies the user 1 using the product ID and the user management information (user ID) received from the electronic apparatus 3. Then, the charging management system 5 calculates the current use time period of the charging object from the difference between the cumulative use time period upon the last settlement and the currently received cumulative use time period. Further, the charging management system 5 determines the time period unit price to be used for the current charging calculation from the currently received cumulative use time period using such a table for the time period unit price of the depreciation type as shown in FIG. 59.

Then, the charging management system 5 calculates the price for the current use time period in accordance with the following expression:

current price=use time period of charging object×time period unit price (step S4). Then, the charging management system 5 notifies the electronic apparatus 3 of the calculated price for the current use time period over the digital communication network 4 (step S5 and "(2) Price" of FIG. 64).

The electronic apparatus 3 receives the notification of the current price and displays the price on the display unit thereof to notify the user 1 of the current price to bill the user 1 to pay the price (step S6).

In response to the bill for the payment of the price, the user 1 performs a procedure to transfer the price from the bank account or the account of the credit company thereof to the account of the apparatus providing source 2 in order to pay the price ("(3) Transfer instruction" of FIG. 64 and "(4) Transfer" of FIG. 64). The transfer procedure may be a procedure for automatic transfer from the bank account or the like.

The charging management system 5 supervises whether or not the billed price is paid (step S7), and if the price is not paid, then the charging management system 5 sends the key for switching off the functions of the electronic apparatus 3 to the electronic apparatus 3 over the digital communication network 4 (step S8).

Thereafter, if the charging management system 5 detects that the billed price is paid (step S7), then it sends the key for switching on the functions of the electronic apparatus 3 to the electronic apparatus 3 over the digital communication network 4 (step S9).

Then, the charging management system 5 discriminates whether or not the cumulative use time period of the electronic apparatus 3 reaches the prescribed time period with which the time period unit price is reduced to zero. If the charging management system 5 discriminates that the prescribed time period is not reached, then it performs a settlement process on the next settlement date. On the other hand, if the charging management system 5 discriminates that the prescribed time period with which the time period unit price is reduced to zero is reached, then though not illustrated in FIG. 64, the charging management system 5 notifies the electronic apparatus 3 that any succeeding settlement is unnecessary and then ends the charging. Upon reception of the notification, the electronic apparatus 3 displays the notification on the display unit 17 to notify the user and stops any later charging process described above. Accordingly, the user 1 can use the electronic apparatus 3 without a charge.

The proposal described above is directed to use of a product such as an electronic apparatus. However, this may be applied similarly to use of contents.

In particular, contents are conventionally stored on an optical disk or a magnetic tape or in a card type memory or the like and sold as a package medium, and a user pays an equivalent to the proprietary right of the contents by buying the package medium. Further, although contents are sometimes downloaded over the Internet or the like with a price imposed on a user, the user in this instance pays an equivalent to the proprietary right of the downloaded contents.

Then, the user utilizes the contents (including not only use of a game program or an application program but also reproduction of image data or sound data) using such an electronic apparatus as an image reproduction apparatus, an audio reproduction apparatus, a game machine or a personal computer.

However, once the user loses the interest in the contents after ending the utilization of the contents through use of the contents data, the user is placed into a state wherein merely owning the contents. Therefore, the user is likely to perform such an action as to sell the contents without permission of the copyright holder or the like or sell the contents to another user.

Such an action as described above possibly gives rise to a situation that the user infringes upon the right of the copyright holder of the contents or deteriorates the will of the copyright holder to produce a new work. As a result, there is the possibility that the environment wherein interesting contents are not created may increase, and to users, such interesting contents may not be acquired readily.

SUMMARY OF THE INVENTION

It is an object of the present invention to provide a charging system and method which eliminates various problems arising from a conventional charging method wherein an equivalent is paid to the proprietary right of contents.

It is another object of the present invention to provide a charging system and method by which, from the nature of contents that the contents are provided to a user substantially through use thereof on an electronic apparatus, both of a provider of the electronic apparatus or the contents and the user are satisfied through application thereof to a system wherein an equivalent is charged on a substantial use time period of an electronic apparatus.

According to the first aspect of the present invention, there is provided an electronic apparatus, including:

discrimination means for discriminating whether or not contents data are of the type wherein use thereof should be charged based on information representative of a time period within which the contents data are used;

contents data use time period measurement means for measuring a time period within which the contents data are used;

apparatus use time period measurement means for measuring a time period within which the electronic apparatus itself is used; and charging processing means for producing, when it is discriminated by the discrimination means that use of the contents data should be charged based on the information representative of the time period within which the contents data are used, information to be used for a charging process based on at least one of results of the measurement of the contents data use time period measurement means and the apparatus use time period measurement means but producing, when it is discriminated by the discrimination means that use of the contents data should not be charged based on the information representative of the time period within which the contents data are used, information to be used for the charging process based on the result of the measurement of the apparatus use time period measurement means.

According to the second aspect of the present invention, there is provided a time period charging system, including:

at least one electronic apparatus including discrimination means for discriminating whether or not contents data are of the type wherein use thereof should be charged based on information representative of a time period within which the contents data are used, contents data use time period measurement means for measuring a time period within which the contents data are used, apparatus use time period measurement means for measuring an operation time period of the electronic apparatus itself as a time period within which the electronic apparatus itself is used, charging processing means for producing, when it is discriminated by the discrimination means that use of the contents data should be charged based on the information representative of the time period within which the contents data are used, information to be used for a charging process based on at least one of results of the measurement of the contents data use time period measurement means and the apparatus use time period measurement means but producing, when it is discriminated by the discrimination means that use of the contents data should not be charged based on the information representative of the time period within which the contents data are used, information to be used for the charging process based on the result of the measurement of the apparatus use time period measurement means, and means for signaling the information produced by the charging processing means; and a management apparatus including information management means for managing identification information for identifying the electronic apparatus, user identification information for identifying a user who uses the electronic apparatus and information regarding a settlement method by the user of the electronic apparatus, and charge settlement means for performing a settlement process for the charge based on at least one of the identification information of the electronic apparatus and the user identification information signaled from the electronic apparatus and the information to be used for the charging process.

According to the third aspect of the present invention, there is provided a method of producing information to be used for a charging process, including the steps of:

discriminating whether or not contents data are of the type wherein use thereof should be charged based on information representative of a time period within which the contents data are used;

measuring at least one of a time period within which the contents data are used and a time period within which the electronic apparatus is used based on a result of the discrimination; and producing, when it is discriminated that use of the contents data should be charged based on the information representative of the time period within which the contents data are used, information to be used for the charging process based on at least one of the information representative of the time period within which the contents data are used and the information representative of the time period within which the electronic apparatus is used, but producing, when it is discriminated that use of the contents data should not be charged based on the information representative of the time period within which the contents data are used, information to be used for the charging process based on the information representative of the time period within which the electronic apparatus is used.

According to the fourth aspect of the present invention, there is provided a charging management apparatus for an electronic apparatus, including:

information management means for managing identification information of an electronic apparatus, user identification information, and information regarding a settlement method by a user of the electronic apparatus; and charge settlement means for performing a charge settlement process based on at least one of the identification information of the electronic apparatus and the user identification information signaled from the electronic apparatus and at least one of information representative of a time period within which contents data are used and information representative of a time According to the fifth aspect of the present invention, there is provided an electronic apparatus, including:

discrimination means for discriminating whether or not contents data are of the type wherein use thereof should be charged based on information representative of a time period within which the contents data are used;

operation inputting means for inputting a plurality of instructions including an instruction to use the contents data;

function execution means for executing one of the functions designated by the instruction inputted by the operation inputting means;

contents data use time period measurement means for measuring a time period within which the contents data are used based on information representative of a situation of use of the function executed by the function execution means; and charging processing means for producing, when it is discriminated by the discrimination means that use of the contents data should be charged based on the information representative of the time period within which the contents data are used, information to be used for a charging process based on a result of the measurement of the contents data use time period measurement means.

According to the sixth aspect of the present invention, there is provided a method of producing information of an object of charging based on a time period of use, including the steps of:

measuring a time period of use of an electronic apparatus, which has a plurality of functions including at least a function of reproducing contents data, for each of the functions;

calculating time period information of an object of charging of the contents data based on the information regarding the measured time periods of use of the individual functions; and performing settlement of charging in accordance with the calculated time period information.

According to the present invention, the user of the electronic apparatus pays an equivalent not to the proprietary right of the contents data but to the time period of use of the contents data, and/or the user pays an equivalent not to the proprietary right of the electronic apparatus but to the time period of use of the electronic apparatus. Consequently, the charging is satisfactory to the user. If a result of the charging is managed by a manager, then the charging result can be distributed readily also to a copyright holder in accordance with the time period of use of the contents data.

Further, where the electronic apparatus is an apparatus of the type wherein substantial use of the apparatus itself is equivalent to substantial use of contents data like a game machine, if one of the time period of use of the contents data and the time period of use of the electronic apparatus is measured, then both of measurement of the time period of use of the electronic apparatus and measurement of the time period of use of the contents data can be performed.

Where the electronic apparatus is, for example, an audio player, use of contents data is execution of a reproduction function of the electronic apparatus. However, in the audio player, also fast feeding or rewinding is a function which relates to use of the audio player. In this instance, use of the electronic apparatus does not involves use of contents data, and therefore, the charging processing means produces information to be used for the charging processing based on both of the results of the measurement of the contents data use time period measurement means and the apparatus use time period measurement means.

In summary, with the electronic apparatus, time period charging system and method and charging management apparatus described above, the user pays only an equivalent to use of the electronic apparatus and/or contents data, and consequently, the value of the electronic apparatus and/or the contents data to the user can be determined apparently. Further, since the time period of use is weighted for the individual functions of the electronic apparatus, the user can be satisfied with the charging. Further, the user can exchange the electronic apparatus and/or the contents data at a comparatively low cost every time a new product or new contents data are placed on the market, and therefore can advantageously use a new product or new contents at any time.

Further, the concept of sales of a commodity changes from assignment of the proprietary right or the time period within which the commodity is owned to an equivalent to a time period of use within which the commodity is used, and this eliminates the concept of possession of a product or contents data. Consequently, there is an advantage that recovery and recycled use of a product are facilitated and it becomes possible to realize a true cyclic society while the necessity for wasteful possession of contents data is eliminated.

Further, since a situation of use of contents data is managed, distribution of a use price to a copyright holder can be performed with certainty. Further, since contents data can be acquired without a charge, there is an advantage to the user that no charge is imposed, for example, for a delivery miss caused by a trouble upon downloading of the contents data.

Furthermore, while conventional contents data are usually ranked with the sold quantity thereof, according to the present invention, contents data can be ranked with the time period of use of the contents data such as a period of time within which the contents data are enjoyed. Consequently, since the frequency or the time period of use of a superior tune, movie or the like increases and this result is reflected on the ranking, augmentation of the will of an author for creation is anticipated and creation of a further superior work can be anticipated. Consequently, true protection of an author which is essentially required in the future can be anticipated.

Further, since the number of times by which contents data can be used can be limited and the thus limited number of times can be canceled later, contents data can be charged such that they can be used without a charge by a predetermined number of times and then use thereof can be charged with regard to a time period to recover the price. In this instance, there is an advantage that the contents data require only one time of delivery.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 4 is a diagrammatic view illustrating an example of contents used in the first embodiment;

FIGS. 5 and 6 are flow charts illustrating a flow of processes by the electronic apparatus used in the first embodiment;

FIGS. 7 and 8 are flow charts illustrating a process for time period charging by the electronic apparatus in the first embodiment;

FIGS. 13A and 13B are flow charts illustrating data transfer processes involved in the settlement process in the time period charging system of the first embodiment and performed by the electronic apparatus and a personal computer, respectively;

FIG. 36 is a flow chart illustrating a process for time period charging of an electronic apparatus used in the sixth embodiment;

FIG. 41 is a diagram illustrating a variation of the equivalent for a use time period in the eighth embodiment;

FIG. 43 is a block diagram showing a configuration of an example of an electronic apparatus built in the electronic coin used in the eighth embodiment;

FIG. 46 is a block diagram showing an example of a configuration of an electronic apparatus used in the eighth embodiment;

FIG. 59 is a diagram illustrating a relationship between a cumulative use time period and a time unit used in the time period charging system of FIG. 58;

DETAILED DESCRIPTION OF THE PREFERRED EMBODIMENTS

First Embodiment

A first embodiment of the present invention is described first. In the first embodiment, the charging object product is an electronic apparatus which can use contents, and an equivalent for a substantial use time period of a charging object product and/or a substantial use time period of contents is paid later.

[Outline of the Time Period Charging System]

Figure 1:
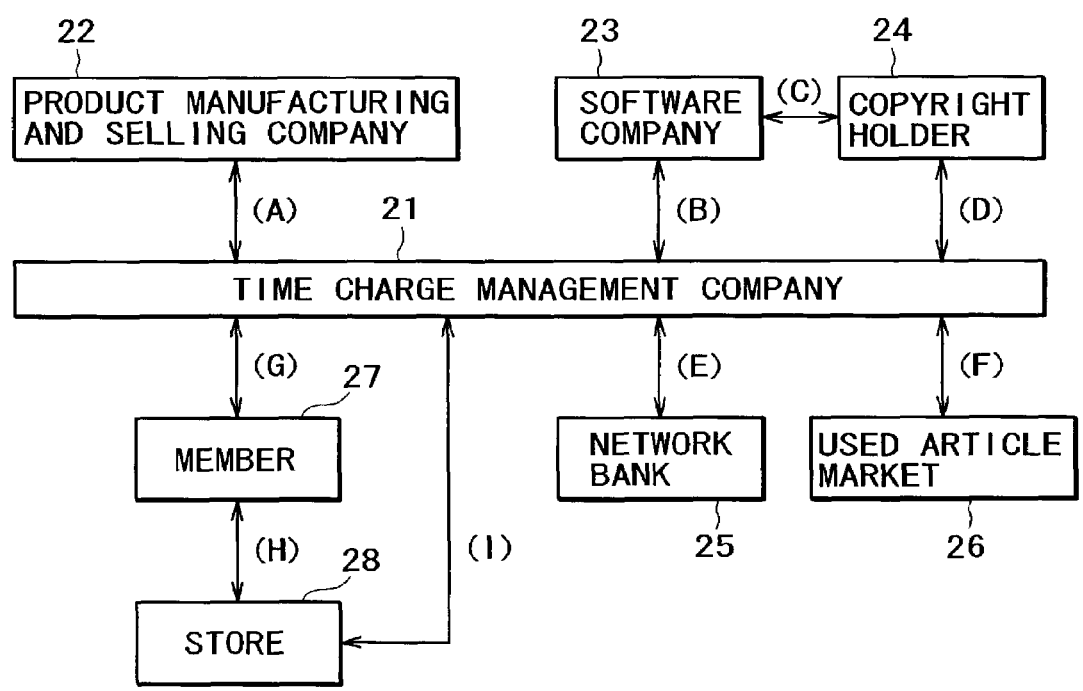
FIG. 1 is a diagrammatic view showing an outline of a time period charging system according to a first embodiment of the present invention.
Figure 2:
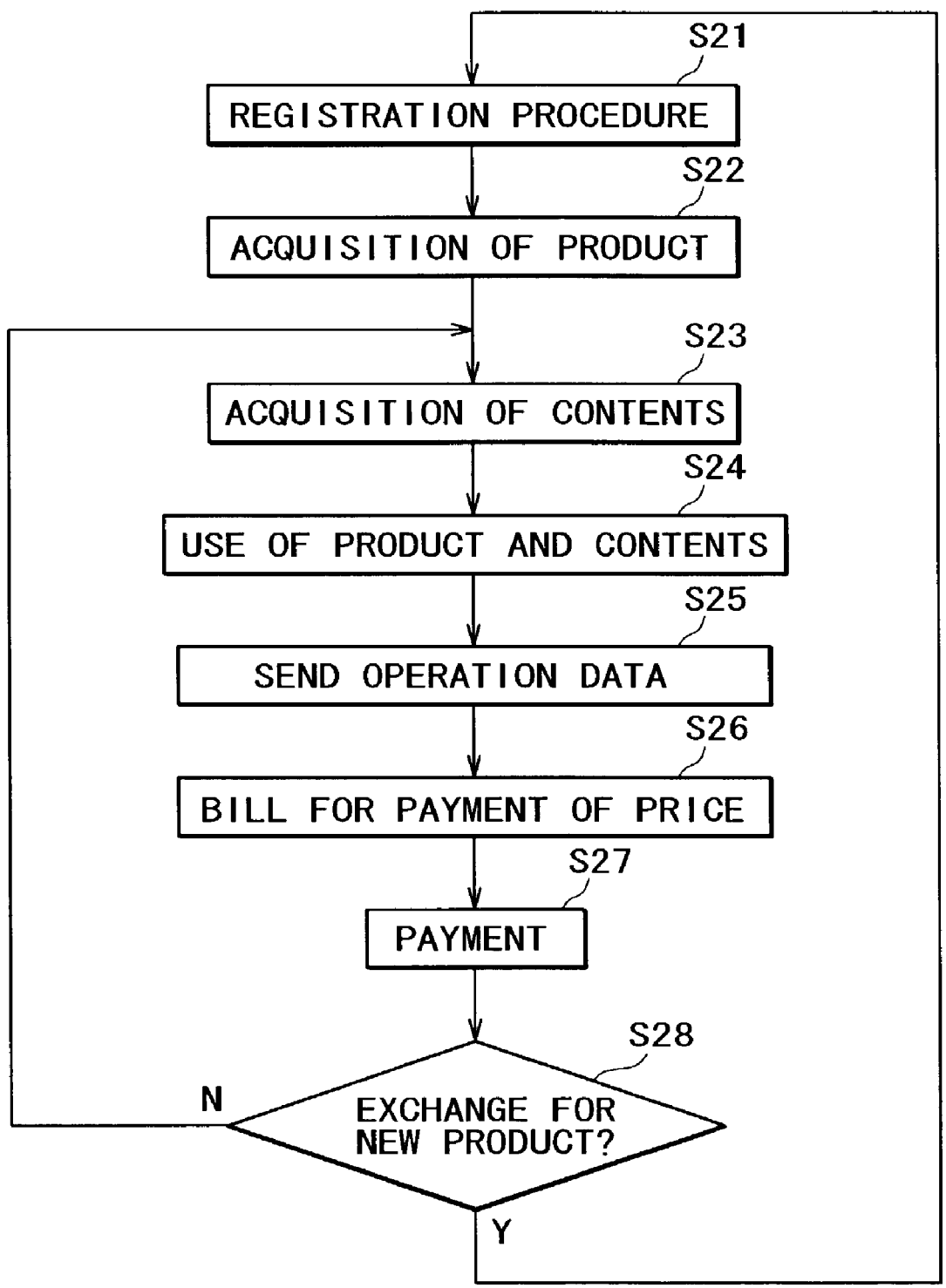
FIG. 2 is a flow chart illustrating a general flow of operation of the time period charging system of the first embodiment.

FIG. 1 shows an outline of an entire business model of the system of the first embodiment wherein charging is based on a use time period and illustrates a relationship of a time charge management company 21, which manages charging based on a substantial use time period of a charging object product and a substantial use time period of contents, to various organizations and clients. Meanwhile, FIG. 2 illustrates a general flow of operation of the system of the first embodiment.

Referring first to FIG. 1, in the system of the first embodiment shown, the time charge management company 21 has a relationship to a product manufacturing and selling company 22 that "it consigns the product manufacturing and selling company 22 with development and manufacture of products and purchases the manufactured products as objects of charging by a use time period from the product manufacturing and selling company 22" ((A) of FIG. 1).

The purchase contract of manufactured products in this instance may take various forms including a form wherein it includes only a sales contract of the products between the time charge management company 21 and the product manufacturing and selling company 22 (the proprietary right of the products is possessed by the time charge management company 21), another form wherein it includes both of a sales contract of the products (the proprietary right of the products is possessed by the time charge management company 21) and a partial distribution contract of the price paid in accordance with the use time period hereinafter described, and a further form wherein it does not include a sales contract of the products (the proprietary right of the products is owned by the product manufacturing and selling company 22) but includes a partial distribution contract of the price paid in accordance with the use time period.

A software company 23 has a relationship to a copyright holder 24 that "it buys software from the copyright holder 24 and consigns the copyright holder 24 with production of software ((C) of FIG. 1). Further, the software company 23 has a relationship of "supplying software" to the time charge management company 21 ((B) of FIG. 1). The time charge management company 21 has such direct relationships as consigning with production of software and purchasing of software to the copyright holder 24 ((D) of FIG. 1).

The time charge management company 21 has a relationship in settlement operation and funds to a network bank 25 ((E) of FIG. 1). Further, the time charge management company 21 has a relationship to a used article market 26 such as a network auction market as a destination of an exchanged article when a charging object product is exchanged by a new product ((F) of FIG. 1).

Furthermore, the time charge management company 21 has a relationship to a member 27 in supply of a product, data transfer of data of a time period of a charging object (the time period is hereinafter referred to as chargeable time period) and other data and so forth ((G) of FIG. 1). The member 27 has a relationship to a store 28 in payment ((H) of FIG. 1). The time charge management company 21 has a relationship to the store 28 in collection of the price from the member 27, delivery of a product and so forth ((I) of FIG. 1).

A customer becomes a member 27 by registering the customer itself into the time charge management company 21 to obtain the membership (step S21 of FIG. 2) and can acquire a desired charging object product, in the present example, an electronic apparatus (step S22 of FIG. 2).

The membership registration can be performed on the shop-front of the time charge management company 21. However, also electronic registration (Web registration) through the Internet can be used. Where the electronic registration is used, the charging object product is passed to the member 27 through the store 28 such as, for example, a convenience store or the like which has a contract with the time charge management company 21. Otherwise, the charging object product may be distributed from the time charge management company 21 to the member 27 by mail.

Upon the membership registration, a member identifier (which is used also as a user identifier; hereinafter referred to as member ID) is given to the member 27.

The time charge management company 21 includes a customer database in which, for each member such as the member 27, member information such as the member ID, name or corporate name, age, address, electronic mail address, term of contract, settlement method hereinafter described, and bank account number or credit card number of the member 27 is stored.

Meanwhile, not only a production identifier (hereinafter referred to as product ID), but also personal information of the member such as the member ID, address and name, and date and hour information are written into a memory of the electronic apparatus of the charging object product. The charging object product is delivered to the member 27 after such information as just mentioned is written into the memory.

Member IDs and product IDs of products to be used by the members are stored in a coordinated relationship with each other in the customer database of the time charge management company 21. It is to be noted that writing of a product ID into a charging object product may be performed by the time charge management company 21 or otherwise by the product manufacturing and selling company 22.

The charging object product to be used by the member 27 can be changed also within the term of contract. If the charging object product is changed, then rewriting of the memory of the charging object product and the product ID in the client database. Also the term of contract can be changed.

The member 27 registers also a settlement method thereof into the time charge management company 21. The time charge management company 21 adds the registered settlement method to the record regarding the member 27. As the settlement method, a method wherein a bank account of the member 27 is used, another method wherein an account of a credit card of the member 27 is used, a further method wherein money is remitted into an account of the time charge management company through a bank, a post office or a convenience store, a still further method wherein an electronic money settlement system constructed originally by a time charge management company 21 and so forth are available. The settlement method can be changed also within the term of contract.

Where the member 27 utilizes the method wherein a bank account is used or the method wherein an account of a credit card is used, the member 27 notifies the time charge management company 21 of the account number or credit card number, password and so forth. Such information is stored into the customer database as described hereinabove.

After the member 27 who has registered itself as a member and acquired an electronic apparatus of a charging object product in such a manner as described above now acquires contents to be used on the electronic apparatus (step S23 of FIG. 2). Such acquisition of contents is performed such that, where the contents data are in the form of a package medium such as a compact disk (CD) or a digital versatile disk (DVD) wherein the contents data are stored on a storage medium, the package medium is received by the member 27 at the time charge management company 21, the store 28 such as a convenience store which has a contract with the time charge management company 21, or some other suitable place. Further, the Internet may be used to download contents data of desired contents from a contents providing system of the time charge management company 21 having a function as a Web server to acquire the desired contents.

The member 27 having acquired the contents in this manner now uses the contents and the electronic apparatus (step S24 of FIG. 2). Then, the member 27 sends operation information with regard to a period (chargeable period) from the last settlement time to the current settlement time to the time charge management company 21 for each settlement time determined in advance or in accordance a settlement request from the electronic apparatus itself which is the charging object product or else in accordance with a settlement time coming notification from the time charge management company 21 (step S25 of FIG. 2).

The operation data here include the number of times of on/off operations of the power supply, operation information of each function of the electronic apparatus, media information, television channel information, music information, video information and failure information as hereinafter described. The operation information of each function of the electronic apparatus includes on/off information of function buttons, operation time period information of each function and so forth. The use time period of contents can be measured from the operation time information of the functions.

The time charge management company 21 calculates the price based on a substantial use time period of a charging object product and a substantial use time period of contents of each member such as the member 27 based on the operation information sent from the member 27 and issues a bill for the charge to the member 27 (step S26 of FIG. 2). The member 27 will pay the charged price in accordance with the registered settlement method (step S27 of FIG. 2).

If a new product having an improved function is made available, then the time charge management company 21 notifies the member 27 of the fact on the Web of the Internet or through facsimile communication or the like. If the member 27 wants to exchangeably acquire the new product, it can perform re-registration at the time charge management company 21, the store 28 or the like or perform registration operation on the Web to exchangeably acquire the new product (step S28 of FIG. 2).

It is to be noted that the product exchanged for the new product is returned to the time charge management company 21 and may be dealt on the used article market 26 such as a network auction. Or the product may be renewed and provided as a used article at a discounted use price.

[Configuration of an Electronic Apparatus as a Charging Object Product]

In the first embodiment, an electronic apparatus which has a plurality of functions like, for example, a recording and/or reproduction apparatus which has a reproduction function, a recording function, a fast feeding function, a rewinding function, a temporary stopping function and a stopping function is used as an electronic apparatus as a charging object product. Further, a use time period of each function of the electronic apparatus is not used as it is as a use time period (chargeable time period) of an object of charging, but it is multiplied by a pertaining one of weighting coefficients set in advance for the individual functions to calculate a chargeable time period.

The weighting coefficients for the functions are set such that, for example, a high weighting coefficient is set for a function which participates directly in a use condition of the user while a low weighting coefficient is set for another function which does not directly participate in a substantial use condition. Further, such a weighting method that a comparatively high weighting coefficient is applied, for example, to a function for which a comparatively high cost for development has been required or a like weighting method may be used.

For example, for a video apparatus or an audio apparatus, a reproduction button (reproduction function) is used as a reference function, and the weighting coefficient for it is set to "1". Further, other weighting coefficients are set in advance such that the weighting coefficient for a stop button (stopping function) or a rewinding button (rewinding function) is "0"; the weighting coefficient for a fast feeding button (fast feeding function) is "0.5"; the weighting coefficient for a recording button (recording function) is "1.2"; and the weighting coefficient for an effect button (effect function) is "2".

Further, in the first embodiment, the weighting coefficient when a chargeable time period is calculated from a use time period is varied depending upon the type of the electronic apparatus. In particular, different weighting coefficients are set for different types of electronic apparatus such that, for example, where the weighting coefficient for an apparatus for music is set to "1", the weighting coefficient for a video apparatus is set to "1.5" taking it into consideration that the apparatus also involves reproduction of audio information while the weighting coefficient for an apparatus for characters is set to "0.8" because the apparatus has comparatively simple functions.

It is to be noted that the weighting coefficient may be further varied depending upon media such as a CD (Compact Disc), an MD (Mini Disc), a DVD (Digital Versatile Disc), a television set and a radio set.

In the foregoing description of the first embodiment, both of weighting based on the type of an electronic apparatus and weighting based on the function is used. The weighting for each function is based on a load factor P of the CPU of a microcomputer section of the electronic apparatus. The load factor P of the CPU is a rate of a time period within which the CPU continuously operates from within a time period which includes a sleep time period and has a rate corresponding to each function.

Further, in the first embodiment, the substantial use time period of contents as a chargeable time period of a charging object is a time period for which contents data of the contents are substantially used.

For example, in the case of audio contents of a tune or video contents of a movie, a time period within which the contents are reproduced by an electronic apparatus and contents data of the contents are read out from a storage medium (recording medium) and decoded and then signaled to a speaker or a display unit is determined as a time period within which the contents are substantially used and is used as a chargeable time period.

In other words, in the case of audio contents of a tune or video contents of a movie, the substantial use time period is a time period within which the reproduction function is executed in the electronic apparatus. It is to be noted that the reproduction function includes not only reproduction at a normal reproduction speed but also high speed reproduction and slow reproduction as well as still reproduction. Since mere rewinding or fast feeding does not involve reading out or decoding of contents data, it is not regarded as substantial use of the contents.

In this instance, however, it is otherwise possible to apply different weights to charging on the use time period of contents among normal reproduction, high speed reproduction, slow reproduction and still reproduction.

On the other hand, where the contents are computer game software or an application program for a computer, the time period within which the computer game software or the application program is actually executed on a computer as an electronic apparatus is determined as a use time period of a charging object, that is, a chargeable time period. In this instance, it is possible to weight the use time period of the contents depending upon the load factor of the CPU as described hereinabove.

In this manner, the substantial use time period of contents is measured from an execution time period of a particular function or functions of an electronic apparatus which uses the contents data or, when necessary, from an execution history of the function or functions. For example, in the case of video or audio contents, the substantial use time period of contents is measured as a reproduction time period of the contents, but in the case of a program, the substantial use time period of contents is measured as a use time period represented by a utilization history of the program. Upon such measurement, weighting in accordance with a function or functions of an electronic apparatus which is used to use the contents may be performed to measure the use time period.

Figure 3:
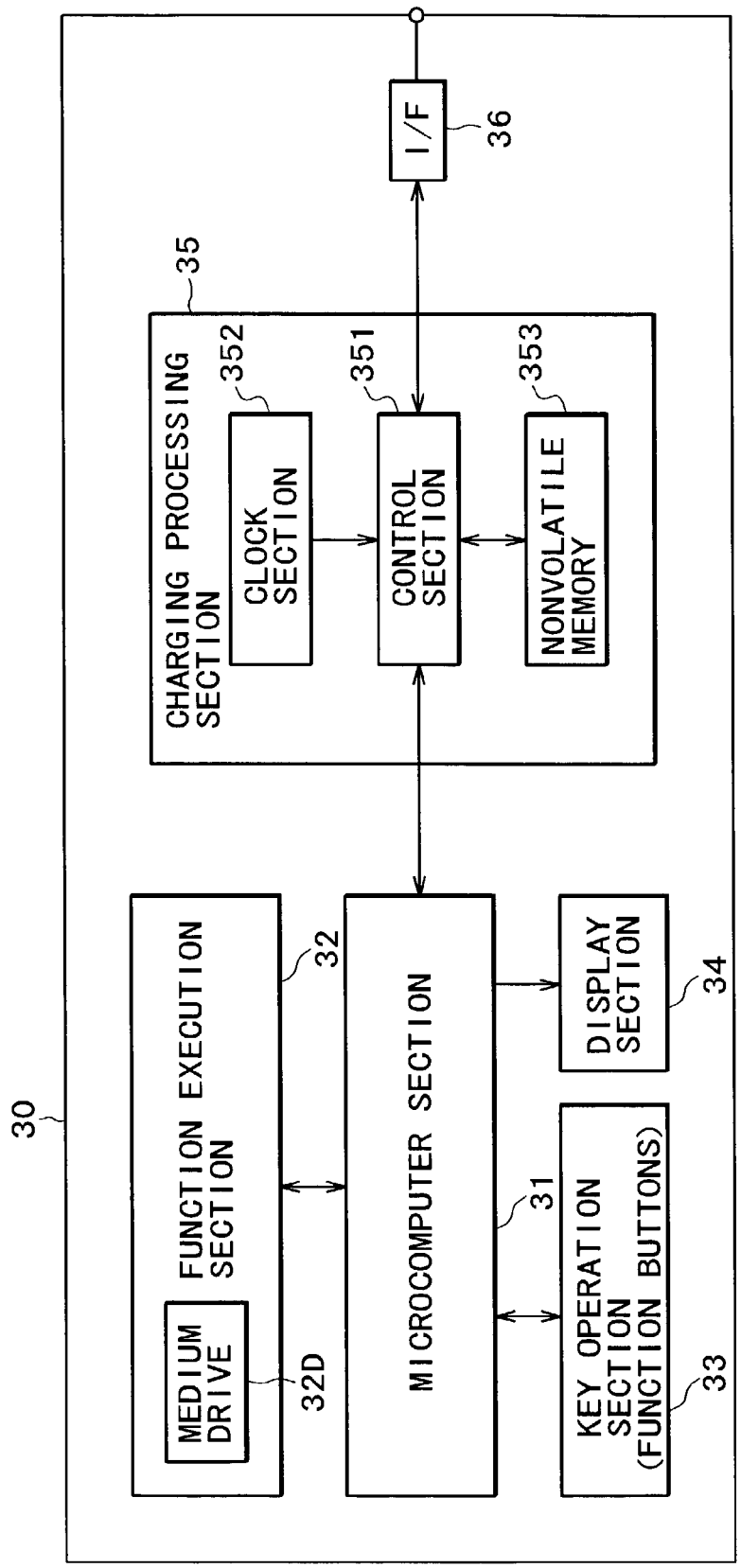
FIG. 3 is a block diagram showing an example of a configuration of an electronic apparatus used in the first embodiment.

FIG. 3 shows an example of a configuration of an electronic apparatus 30 used in the time period charging system of the first embodiment and formed as a disk reproduction apparatus such as, for example, a CD player or a DVD player. Referring to FIG. 3, the electronic apparatus 30 shown includes a microcomputer section 31 which serves as a control section for controlling the entire electronic apparatus 30, a function execution section 32 including a medium drive 32D including a loading section for a disk medium as a storage medium, a digital signal processing section (not shown), an analog signal processing section (not shown) and so forth, a key operation section 33 including a plurality of function buttons, a display section 34 which may be, for example, a liquid crystal display unit, a charging processing section 35, and an interface section 36 for interfacing with a personal computer.

The charging processing section 35 includes a control section 351 formed from a microcomputer, a clock section 352 for measuring the time, and a nonvolatile memory 353. The charging processing section 35 may be formed as a one-chip IC which has the nonvolatile memory 353 externally connected thereto or another one-chip IC which includes also the nonvolatile memory 353.

The microcomputer section 31 discriminates, when an inputting operation for the key operation section 33 is performed by a user, which one of the function buttons is operated, and controls the function execution section 32 so that a function based on a result of the discrimination may be executed. Further, the microcomputer section 31 sends information of the operated function button to the control section 351 of the charging processing section 35.

The control section 351 of the charging processing section 35 recognizes from the information of the operated function button from the microcomputer section 31 that a particular function corresponding to the function button has been selected and is being executed, and stores it as function execution history information into the nonvolatile memory 353. Then, the control section 351 refers to time information from the clock section 352 to measure a time period of execution of the function, that is, the use time period of the function, calculates a chargeable time period in such a manner as described above from the measured use time period and stores the calculated chargeable time period into the nonvolatile memory 353.

It is to be noted that the clock signal of the clock section 352 is suitably corrected in accordance with correction information received from the time charge management company serving as a host server over a digital communication network so that it normally is an accurate clock signal.

The nonvolatile memory 353 stores, in addition to the information described above, a product ID of the electronic apparatus 30, a member ID and a password of a member who is a user of the electronic apparatus 30, identification information of a disk medium or disk media loaded in the electronic apparatus 30 in the past, and so forth.

[Contents to be Used on an Electronic Apparatus]

In the first embodiment, on a disk medium as a package medium provided from the time charge management company 21, contents time period charging information representing that contents data written on the disk medium are contents data of use time period chargeable contents with which a substantial use time period is charged is written together with the contents data.

FIG. 4 shows an outline of a configuration of data stored (recorded) on a disk medium used in the first embodiment. Referring to FIG. 4, a disk medium 100 of the type shown has a lead-in part 101 provided on the innermost circumference side, a lead-out part 103 provided on the outermost circumference side, and a program area 102 interposed between the lead-in part 101 and the lead-out part 103. Contents data are recorded into the program area 102.

Information called TOC (Table Of Contents) including contents table information of the contents recorded on the disk medium 100 is written in the lead-in part 101. In the first embodiment, contents time period charging information 106 is written in the lead-in part 101 separately from the TOC 105 as seen in FIG. 4. When contents written on the disk medium 100 are not use time period chargeable contents, the contents time period charging information 106 is not provided in the lead-in part 101.

The contents time period charging information 106 includes identification information 107 including an identifier of the disk medium 100 (in the following description, an identifier of a disk medium is referred to as medium ID) and an identifier of contents written on the disk medium 100 (in the following description, an identifier of contents is referred to as contents ID), price information 108 including a use price (hereinafter referred to as contents user price) of the contents per unit time period, time number limitation information 109 including a number of times of use permission of the contents, and other necessary information.

The contents use price of the price information 108 includes a free use price (no charge). As the time number limitation information 109, where there is no limitation in the number of times of use, data representative of the infinity is written as the use permission time number. On the other hand, where there is some limitation, data representative of a finite time number value N (N is an integer equal to or greater than 0 (N $\square$ 0)) is written as the time number limitation information 109.

The electronic apparatus 30 reads the TOC 105 and the contents time period charging information 106 of the lead-in part 101 in prior to use of contents data. However, if the lead-in part 101 does not include the contents time period charging information 106, then the electronic apparatus 30 interprets that an equivalent has been paid for the proprietary right of contents written on the disk medium loaded and does not perform a process of charging with regard to use of the contents.

On the other hand, if the contents time period charging information 106 is read out from the disk medium 100, then the electronic apparatus 30 analyzes contents of the information, and performs a process for charging based on the price information 108 and permits use of the disk medium 100 by a use permission time number in accordance with the time number limitation information 109.

It is to be noted that the contents time period charging information 106 may otherwise be written not separately from the TOC 105 but as information included in the TOC 105. Further, the contents time period charging information 106 may otherwise be written in the lead-out part 103. Furthermore, where the disk medium 100 is of the type in which an IC memory is embedded, the contents time period charging information may be written into the IC memory.

On other hand, where the disk medium is a diskette or of the type wherein it is accommodated in a cartridge and includes a memory provided in the diskette or the cartridge, the contents time period charging information may be written into the memory.

It is to be noted that the contents time period charging information 106 may include a flag of 1 bit representing whether or not the contents are time period chargeable contents. In this instance, where the contents are not time period chargeable contents, dummy data may be written as the price information or the time number limitation information or alternatively no such price information or time number limitation information may be written.

[Contents Using Operation with an Electronic Apparatus]

Figure 6:
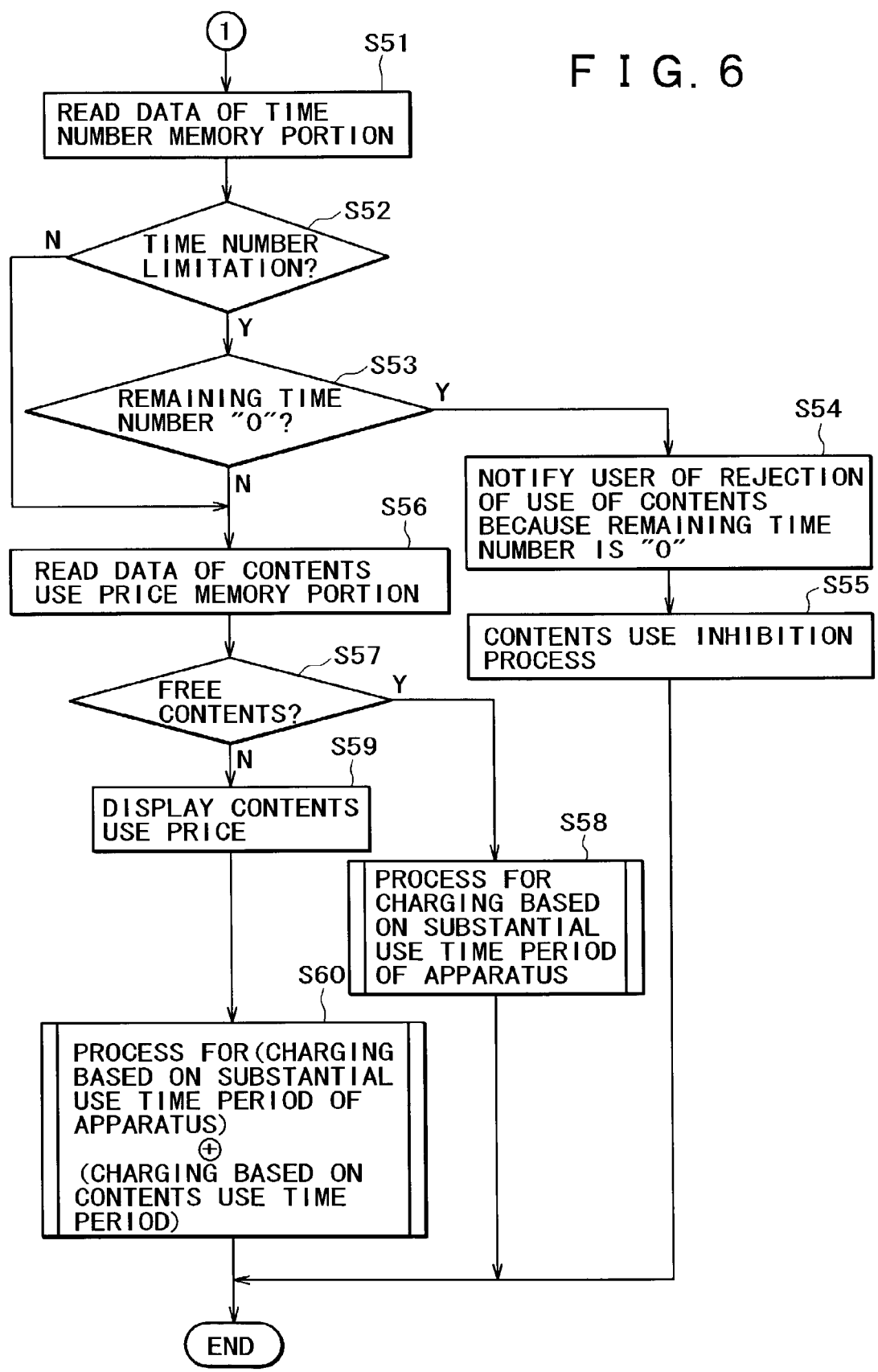

FIGS. 5 and 6 illustrate a process for calculation of a chargeable time period for each function of the electronic apparatus 30 (in the present specification, the use period of time of a charging object is referred to as chargeable time period) and charging.

After the power supply to the electronic apparatus 30 is switched on, the electronic apparatus 30 starts its process illustrated in FIGS. 5 and 6 and first waits that a disk medium is loaded into it (step S31). After the microcomputer section 31 confirms that a disk medium is loaded, it reads out the TOC 105 and the contents time period charging information 106 of the lead-in part 101 of the disk medium (step S32).

Then, the microcomputer section 31 discriminates whether or not contents of the disk medium are use time period chargeable contents (step S33). If the microcomputer section 31 discriminates that the contents are not use time period chargeable contents, then it does not perform a process for charging based on substantial use of the contents but performs, in the process illustrated in FIG. 5, only a process for charging based on substantial use of the electronic apparatus 30 (step S34), whereafter it ends the processing routine.

On the other hand, if the microcomputer section 31 discriminates at step S33 that the contents of the disk medium are use time period chargeable contents, then it refers to the identification information 107 included in the contents time period charging information 106 read out at step S32 and identification information of disk media loaded in the electronic apparatus 30 in the past stored in the nonvolatile memory 353 of the charging processing section 35 to discriminate whether or not the pertaining disk medium has been loaded in the electronic apparatus 30 in the past and the contents time period charging information of the disk medium has been fetched already (step S35).

If the microcomputer section 31 discriminates at step S35 that the pertaining disk medium is loaded for the first time in the electronic apparatus 30 and the contents time period charging information of the disk medium has not been fetched as yet, then it stores the identification information 107 of the disk medium into the nonvolatile memory 353 of the charging processing section 35 (step S36) and interprets detailed information of the contents time period charging information 106 fetched at step S32 to discriminate whether or not the use permission time number indicated by the time number limitation information 109 indicates some limitation (step S37).

Then, if the microcomputer section 31 discriminates at step S37 that the use permission time number indicates some limitation, that is, the use permission time number is not the infinity, then it stores the value N of the use permission time number into a time number memory portion, which is part of the memory area of the nonvolatile memory 353 of the charging processing section 35, as use permission time number of the contents of the medium indicated by the stored identification information 107 in a coordinated relationship with the identification information 107 (step S38).

On the other hand, if the microcomputer section 31 discriminates at step S37 that the use permission time number is the infinity and indicates no use time number limitation, then it stores information representative of "no time number limitation" into a time number memory portion of the nonvolatile memory 353 in a coordinated relationship with the identification information 107 (step S39).

After the storage of the information relating to the use permission time number into the time number memory portion of the nonvolatile memory 353 at step S38 or S39, the microcomputer section 31 checks the price information 108 to discriminate whether or not use of the contents should be charged (step S40). If use of the contents should be charged, then the microcomputer section 31 writes the use price per unit time period into a contents use price memory portion, which is part of the memory area of the nonvolatile memory 353 of the charging processing section 35, in a coordinated relationship with the identification information 107 (step S41). On the other hand, if use of the contents should not be charged at step S40, then the microcomputer section 31 stores information representative of "no charge" into the contents use price memory portion of the nonvolatile memory 353 in a coordinated relationship to the identification information 107 (step S42).

After the storage of information regarding the contents use price into the contents use price memory portion of the nonvolatile memory 353 at step S41 or S42 comes to an end, the microcomputer section 31 reads out data from the time number memory portion of the nonvolatile memory 353 regarding the disk medium represented by the identification information 107 and the contents of the disk medium (step S51 of FIG. 6). Also when it is discriminated at step S35 that contents time period charging information has been fetched, the processing advances to step S51, at which time number limitation data regarding the disk medium represented by the identification information 107 and the contents of the disk medium is read out from the time number memory portion of the nonvolatile memory 353.

Then, the microcomputer section 31 discriminates whether or not there is some use number limitation (step S52). If there is some use number limitation, then the microcomputer section 31 confirms whether or not the remaining number of the use permission time number is "0" (step S53). If the remaining number of the use permission time number is "0", then the microcomputer section 31 controls the display section 34 to display on the screen a message that "use of contents is not permitted because the remaining number of the use permission time number is '0'" to notify the user of the fact (step S54). Then, the microcomputer section 31 disables the function or functions regarding use of contents from among a plurality of functions of the function execution section 32 (step S55), thereby ending the processing routine.

When it is discriminated at step S52 that there is no use time number limitation or when it is discriminated at step S53 that the remaining number of the use permission time number is not "0", the microcomputer section 31 reads out data of the contents use price memory portion of the nonvolatile memory 353 in which a disk medium represented by the identification information 107 and contents of the disk medium are stored (step S56).

Then, the microcomputer section 31 discriminates whether or not the contents use price is zero or free (step S57). If the contents use price is zero, then the microcomputer section 31 performs a process for charging based only on the substantial use time period of the electronic apparatus 30 (step S58). On the other hand, if the contents use price is not zero, then the microcomputer section 31 controls the display section 34 to display the use price on the screen to notify the user that the contents should be charged (step S59). Then, the microcomputer section 31 performs a process for charging based on the substantial use time period of the electronic apparatus 30 and further performs a process for charging based on the use time period of the contents (step S60). The processing routine is ended therewith.

The processing at steps S58 and S60 is performed through cooperation of the control section 351 of the charging processing section 35 with the microcomputer section 31. More detailed operation of the processing at steps S58 and S60 is described below with reference to FIGS. 7 and 8.

Referring first to FIG. 7, the microcomputer section 31 first discriminates whether or not a function button is operated and turned on (step S61). If the microcomputer section 31 discriminates that a function button is turned on, then it recognizes what the function button turned on is (step S62).

Information of the recognized function button is sent from the microcomputer section 31 to the control section 351 of the charging processing section 35. Consequently, the control section 351 recognizes what the function button turned on is, and stores button type information representative of the recognized function button into the nonvolatile memory 353 in a coordinated relationship with the identification information 107 described hereinabove (step S63).

Further, the control section 351 measures a time period of execution of the function tuned on, that is, a use time period T1 of the turned on function, using information of the clock section 352 (step S64). The use time period T1 includes a sleep time period within which the CPU of the microcomputer section 31 is in a sleeping state.

Then, the control section 351 measures an arithmetic operation processing time period which is a time period within which the CPU of the microcomputer section 31 continuously operates, that is, a time period T2 except the sleeping time period, and calculates a load factor P of the CPU of the microcomputer section 31 (step S65).

For the calculation of the load factor P, the following expression is used:

$$P=(T2/T1) \times K$$

where K is a coefficient of variation which depends upon a video apparatus, an audio apparatus, a television receiver, a medium type and so forth. Since the coefficient K depends upon the type of the pertaining apparatus, it can be referred to as a type-dependent coefficient of the apparatus.

The operations at step S64 for the measurement of the use time period T1 and step S65 for the measurement of the time period T2 and the CPU load factor P are repeated until the operation of the function being executed comes to an end (step S66). It is to be noted that, although, in the foregoing description, the CPU load factor P is arithmetically operated repetitively during execution of the function, the CPU load factor P may otherwise be arithmetically operated at a point of time when the execution of the function comes to an end.

Then, when the control section 351 of the charging processing section 35 discriminates based on the information from the microcomputer section 31 that the operation of the function being executed comes to an end, it discriminates whether or not the function ended is a function which uses contents data (step S67). If it is discriminated that the function ended is a function which does not use contents data, then the control section 351 calculates only a chargeable time period Dt with regard to the use of the electronic apparatus 30 (step S68).

At this time, the control section 351 of the charging processing section 35 calculates the chargeable time period Dt with regard to the use of the electronic apparatus 30 using the following calculation expression:

$$\text{chargeable time period } Dt = \text{use time period } T1 \times \text{CPU load factor } P$$

Then, the control section 351 stores the information of the chargeable time period Dt of a result of the calculation into the nonvolatile memory 353 (step S69). Here, since the chargeable time period Dt is Dt=T2×K from the expression above, only the arithmetic operation processing time period T2 may be measured without measuring the use time period T1.

Figure 8:
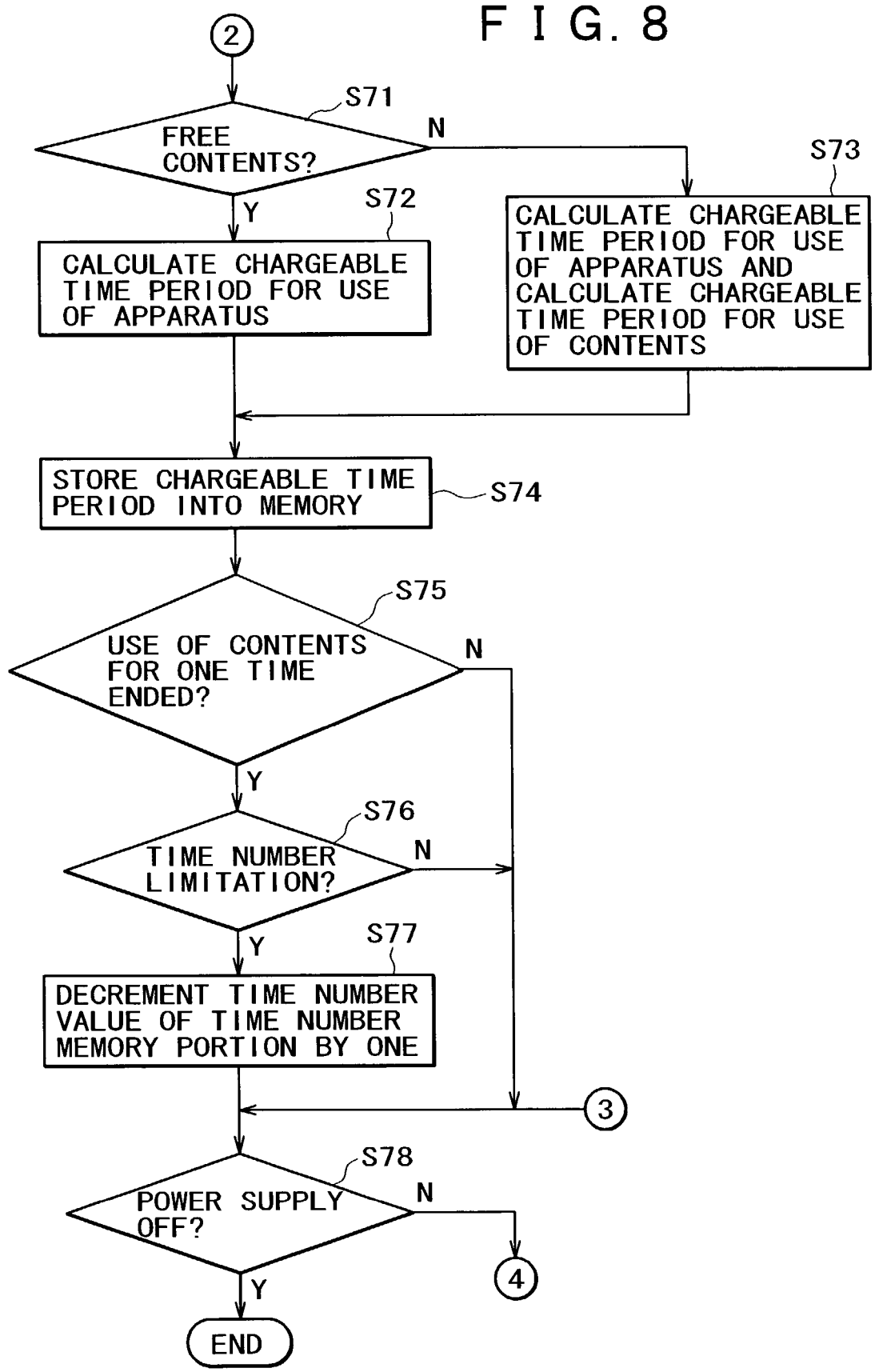

On the other hand, if the control section 351 discriminates at step S67 that the function ended is a function which uses contents data, then it discriminates from the stored contents of the nonvolatile memory 353 whether or not the used contents are free contents (step S71 of FIG. 8).

Then, if the control section 351 discriminates at step S71 that the used contents are free contents, then it calculates only a chargeable time period Dt with regard to the use of the electronic apparatus 30 in a similar manner as at step S69 (step S72). On the other hand, if the control section 351 discriminates at step S71 that the used contents are not free contents, then it calculates a chargeable time period Dt with regard to the use of the electronic apparatus 30 and further calculates a chargeable time period Ct with regard to the use of the contents (step S73).

At this time, the control section 351 of the charging processing section 35 calculates the chargeable time period Ct with regard to the use of the contents using the following calculation expression:

$$\text{chargeable time period } Ct = \text{use time period } T1 \times \text{contents price normalization coefficient } W$$

The contents price normalization coefficient W here is a normalization coefficient value for a contents use price with respect to a standard price per unit use time period determined in advance (that is, a use price of contents per unit use time period) and is determined using the following expression:

$$W = (\text{contents use price})/(\text{standard price per unit use time period})$$

Where the contents price normalization coefficient W is used, when it is tried to calculate an actual price for payment, this can be calculated readily by multiplying the chargeable time period Ct by the standard price per unit time period irrespective of the use prices of the individual contents.

The control section 351 of the charging processing section 35 stores the information of the chargeable time period Dt with regard to the use of the electronic apparatus and the information of the chargeable time period Ct with regard to the use of the contents calculated in such a manner as described above into the nonvolatile memory 353 (step S74).

Then, the control section 351 discriminates based on the information from the microcomputer section 31 whether or not the end of operation described above is an end of use of the contents for one time (step S75). If the control section 351 discriminates that the end of operation is not an end of use of the contents for one time, then it discriminates whether or not the contents have some use time number limitation (step S76). If the contents have some use time number limitation, then the control section 351 decrements the use permission time number for the corresponding contents in the time number memory portion of the nonvolatile memory 353 by one (step S77).

Then, the control section 351 discriminates whether or not the power supply is off (step S78). If the power supply is not off, then the processing returns to step S61 of FIG. 7, at which the control section 351 waits for subsequent turning on of a function button. On the other hand, if the control section 351 discriminates that the power supply is off, then it ends the processing routine. On the other hand, when it is discriminated at step S75 that the end of operation is not an end of use of the contents for one time or when it is discriminated at step S76 that the contents have no time number limitation, the processing advances to step S78, at which the control section 351 discriminates whether or not the power supply is off. Then, if the power supply is not off, the processing returns to step S61 of FIG. 7, at which the control section 351 waits for subsequent turning on of a function button. However, if the power supply is off at step S78, then the control section 351 ends the processing routine.

[Example of Stored Contents of the Nonvolatile Memory 353]

Figure 9:
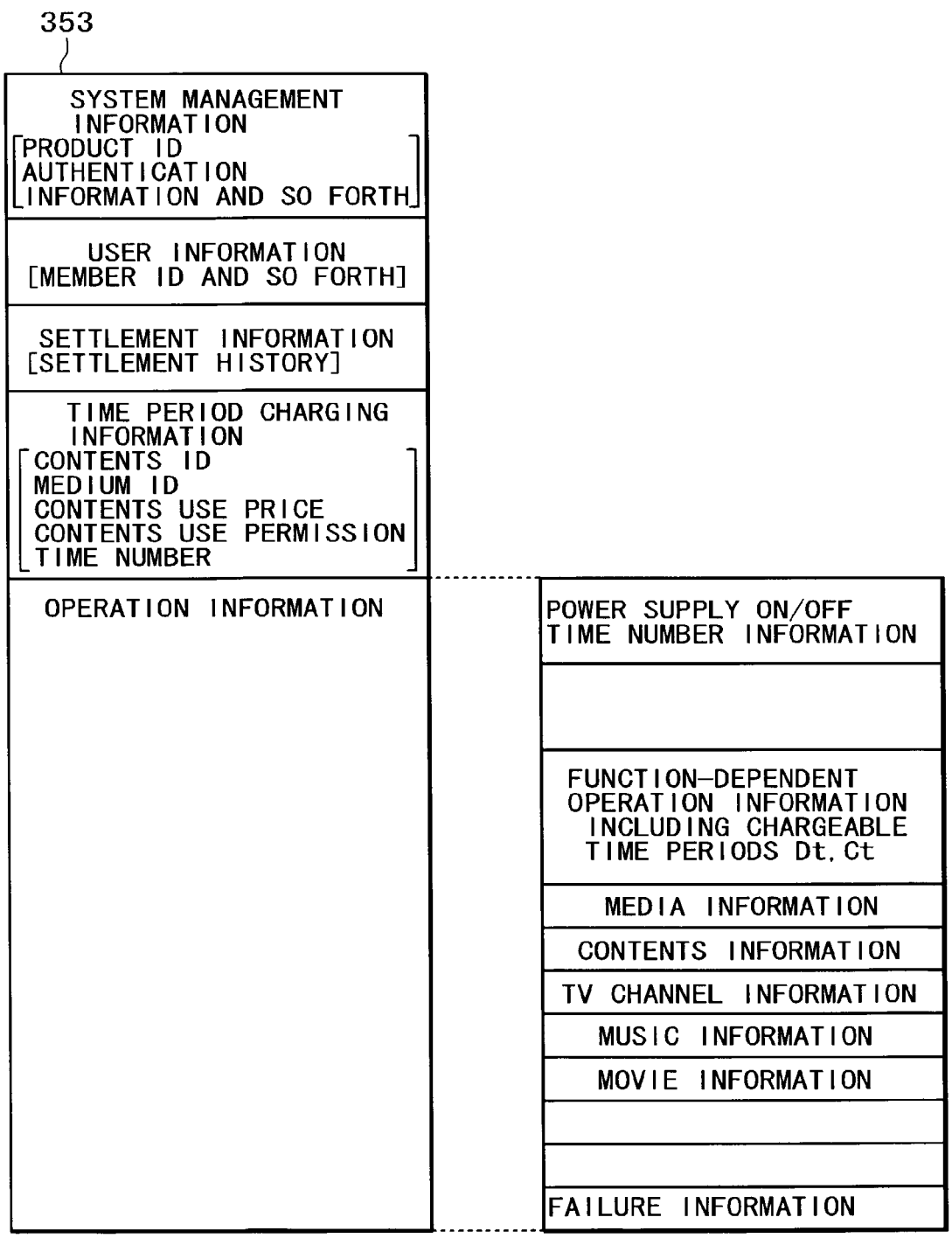
FIG. 9 is a diagrammatic view illustrating stored contents of a memory provided in the electronic apparatus used in the first embodiment.

FIG. 9 illustrates an example of stored contents of the nonvolatile memory 353 of the charging processing section 35. Referring to FIG. 9, data are classified into system management information, user information, contents information, settlement information and operation information and stored at predetermined addresses in the nonvolatile memory 353.

As the system management information, product IDs, use time limitation setting information of a product where, for example, the use time period of the product is limited based on a contract or the like, authentication information and so forth are registered. As the user information, member IDs and personal information such as the name, age, bank account or credit card number and so forth of each user are registered. As the settlement information, the number of times of settlement, location and date information and so forth are recorded.

As the operation information, information of the number of times of switching on and off of the power supply, function-dependent operation information including information of function-dependent chargeable time periods Dt and Ct, medium information of a CD, an MD or a DVD, contents information including contents names, contents IDs and so forth, television (TV) channel information including information of for what time period what channel is enjoyed, music information including information of what tune of what artist is reproduced, movie information including information of the title of a movie enjoyed, failure information, download time period information where the electronic apparatus has a downloading function, and so forth are stored.

The operation information is sent to the time charge management company 21, by which a price is calculated in accordance with conditions of a contract based on the information and is imposed on the member 27.

[Cancellation of the Use Time Number Limitation to Contents]

As described above, in the first embodiment, the use time number of contents is limited with time number limitation information included in contents time period charging information. However, if a member of a user wants to use contents by a number of times greater than a limit time number, then it is preferable to permit such use by the member taking such a countermeasure as to change the use price. This can achieve such a service that, whereas use of contents up to a predetermined time number is regarded as trial use and permitted at a discount use price, if the user wants to continue its use, the use of the contents is permitted at a normal use price not discounted.

Incidentally, in the first embodiment, the electronic apparatus 30 issues a notification of information of the chargeable time periods Dt and Ct measured and stored in the nonvolatile memory 353 in such a manner as described above to a charging management system 210 of the time charge management company 21 to effect settlement of the chargeable price.

Figure 10:
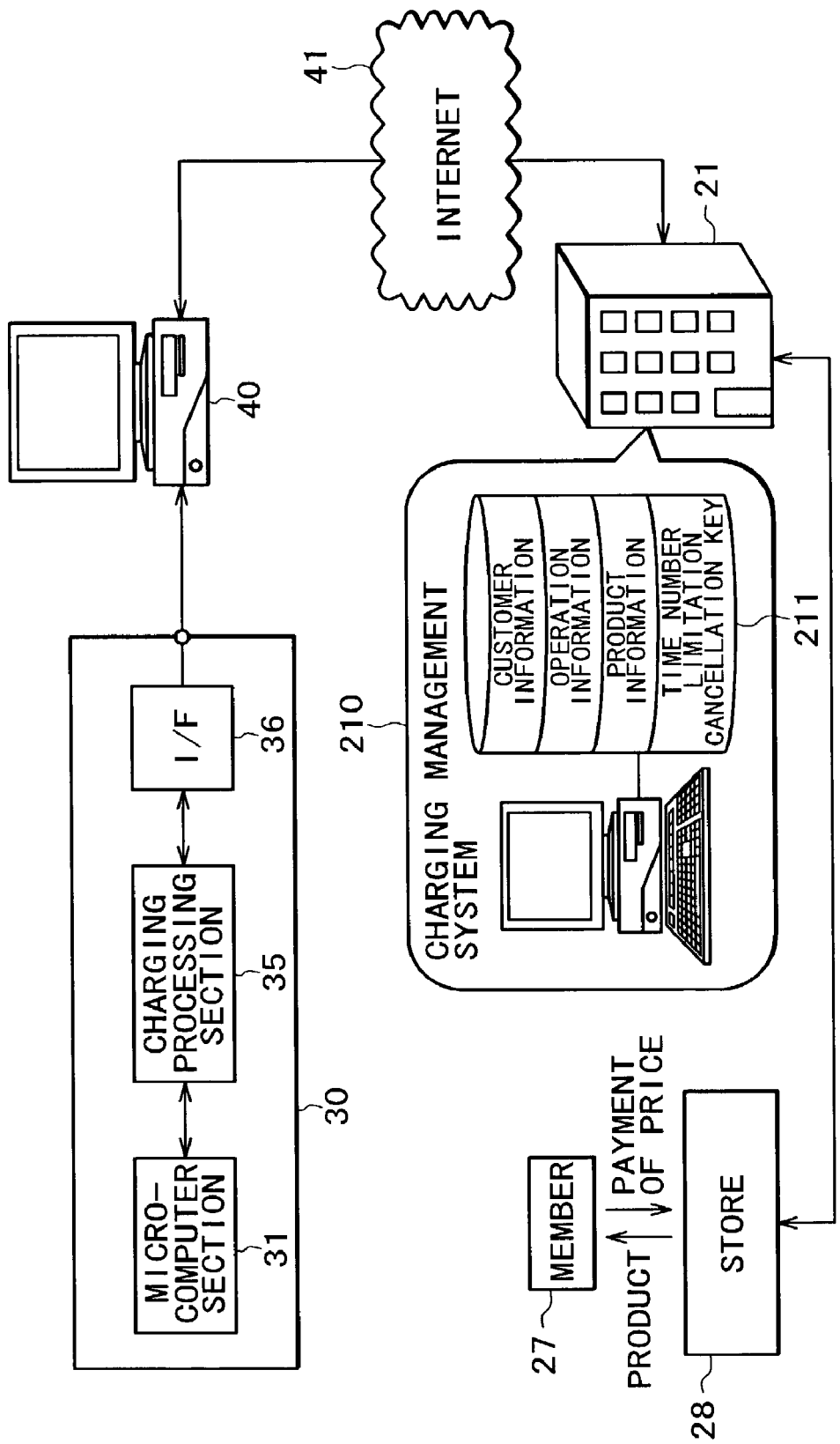
FIG. 10 is a block diagram illustrating a settlement process in the time period charging system of the first embodiment.

To this end, the electronic apparatus 30 in the first embodiment is connected to a personal computer 40 through the interface section 36 as seen in FIG. 10. The personal computer 40 is connected to a charging management system 210 of the time charge management company 21 having a function of a Web server over a digital communication network 41 such as the Internet. When a settlement time is approaching, the charging management system 210 notifies the personal computer 40 that the settlement time is approaching using an electronic mail or the like to urge the personal computer 40 to transfer the operation information and so forth of the electronic apparatus to the charging management system 210. To a user with whom an electronic mail is not available, an ordinary postal system is used to send a mail to notify the user that the settlement time is approaching.

In response to the notification, the user connects the electronic apparatus 30 to the personal computer 40 and performs operation for transferring the data to send the operation information and so forth of the electronic apparatus 30 to the charging management system 210.

Since, in the first embodiment, such a network as shown in FIG. 10 can be configured such that the electronic apparatus 30 and the charging management system 210 of the time charge management company 21 are connected to each other in this manner, this mechanism is utilized in the first embodiment such that the time charge management company 21 permits use of contents by more than a limit use time number represented by the time number limitation information 109 of the time period charging information 106 in response to a request of a user. It is to be noted that an application for issuing a request for such use permission is provided from the time charge management company 21 together with a settlement application hereinafter described and so forth and is installed already in a personal computer 40 of each member.

Figure 11:
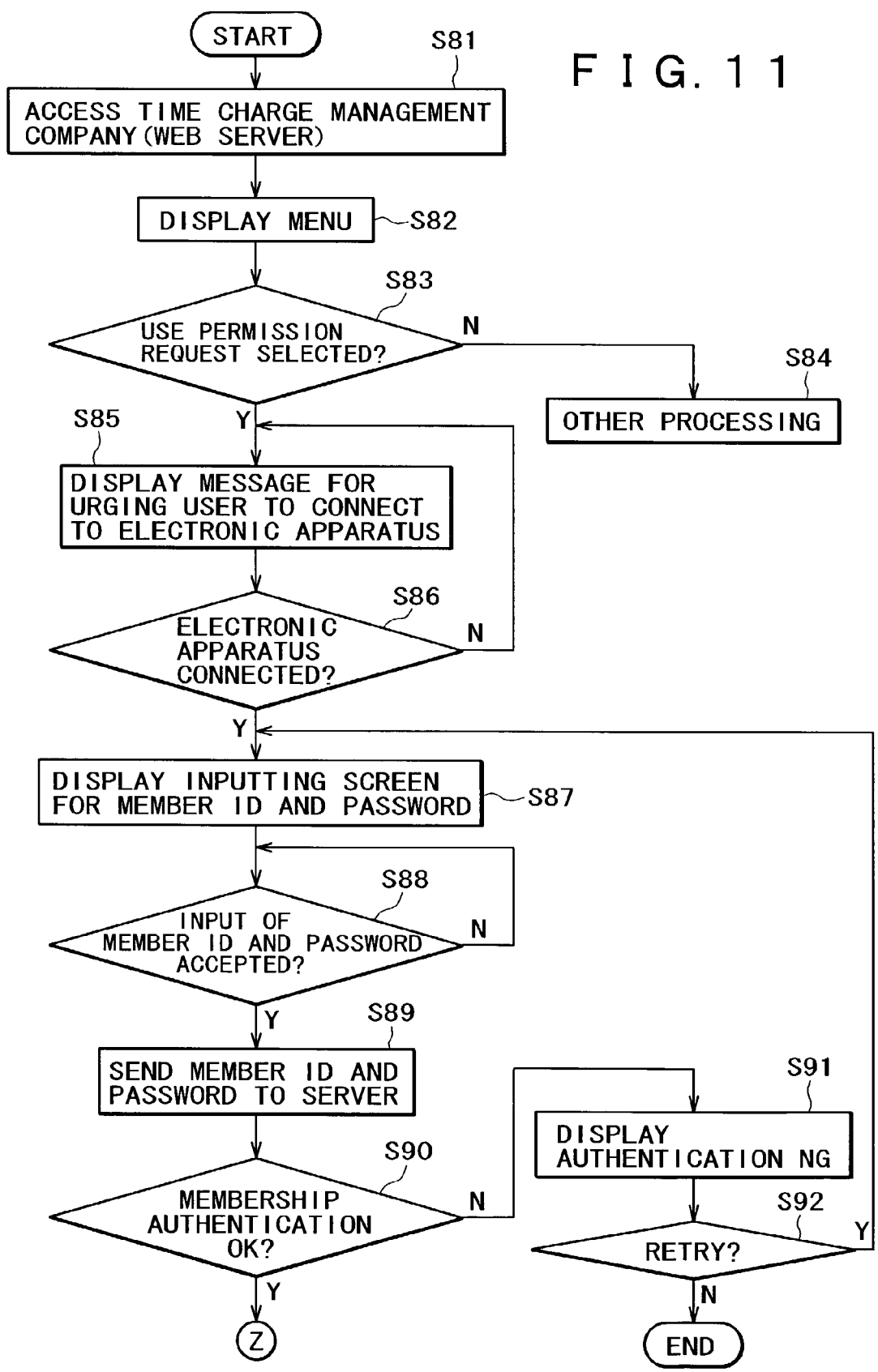
FIGS. 11 and 12 are flow charts illustrating an example in the first embodiment of a method of canceling a use limitation to contents whose use time number is limited.
Figure 12:
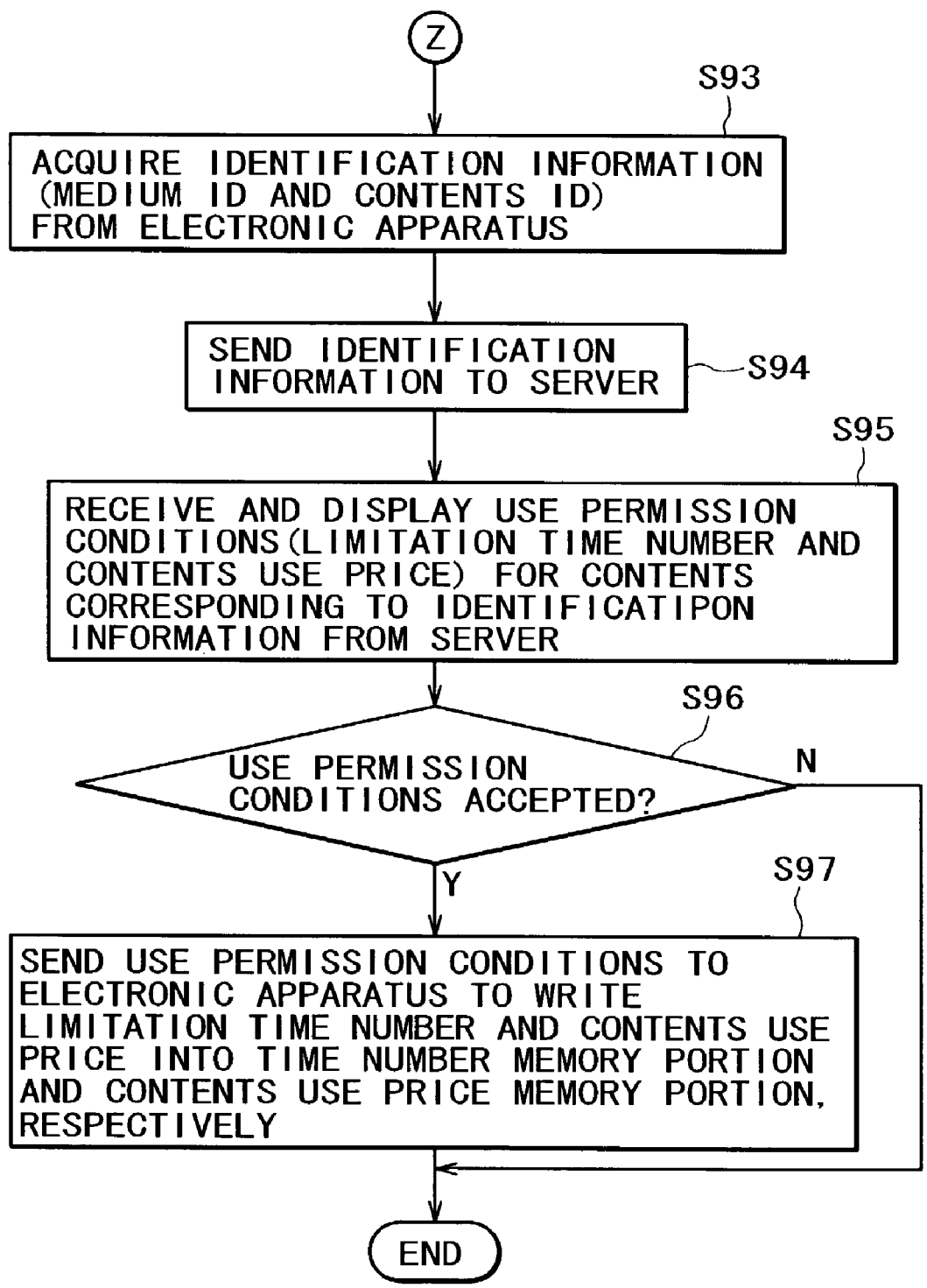

FIGS. 11 and 12 illustrate a processing procedure for canceling use time number limitation. The processing of FIGS. 11 and 12 principally describes processing operations of a controlling CPU (Central Processing Unit) of the personal computer 40.

Referring first to FIG. 11, a member who wants to cancel a use limitation time number first issues a connection request from its personal computer 40 to the time charge management company 21 (Web server) over a digital communication network 41 to connect the personal computer 40 to the charging management system 210 of the time charge management company 21 (step S81).

After the personal computer 40 is connected to the charging management system 210, an application menu is sent from the charging management system 210 serving as a Web server, and therefore, the personal computer 40 receives and displays the application menu (step S82). Then, the personal computer 40 discriminates whether or not a request for use permission of contents whose use permission time number is "0" and whose use is not permitted any more is selected from within the menu by the user (step S83).

If the personal computer 40 discriminates at step S83 that any other than the use permission request is selected from within the menu, then it executes the selected process (step S84). On the other hand, if the personal computer 40 discriminates at step S83 that the use permission request is selected, then since a message screen for urging the user to connect to an electronic apparatus is sent from the charging management system 210, the personal computer 40 receives and displays the message screen on the display unit (step S85).

Then, the personal computer 40 discriminates whether or not an electronic apparatus 30 is connected thereto (step S86). If no electronic apparatus 30 is connected, then the personal computer 40 continues to display the message screen for urging the user to connect to an electronic apparatus at step S85.

If connection of an electronic apparatus 30 is confirmed, then since a screen for urging the user to input a member ID and a password is sent from the charging management system 210, the personal computer 40 receives and displays the screen on the display unit (step S87). Then, the personal computer 40 waits for inputting of a member ID and a password by the user (step S88). Then, after the user inputs a member ID and a password thereof the personal computer 40 sends the inputted member ID and password to the charging management system 210 over the digital communication network 41 (step S89).

The charging management system 210 discriminates whether or not the user specified with the member ID and password sent thereto is a member stored in a member registration information memory of the charging management system 210 and refers to payment information for charges stored in the charging management memory to discriminate whether or not the user is a member who has completed its payment for imposed charges in the past thereby to discriminate whether or not the use permission request of the user may be accepted (step S90).

Then, if the charging management system 210 discriminates that the use permission request of the user should not be accepted, then it sends back information of an authentication NG screen to the personal computer 40 of the user, and therefore, the personal computer 40 receives and displays the authentication NG screen (step S91). The authentication NG screen includes, for example, a display of a selection button for selecting whether or not re-inputting of a user ID and a password should be performed.

The personal computer 40 discriminates whether or not the user operates the selection button to issue a selection instruction to perform re-inputting (step S92). If the personal computer 40 discriminates that the user issues a selection instruction to perform re-inputting, then it sends a re-inputting request to the charging management system 210 and receives an inputting screen for urging the user to input a user ID and a password sent from the charging management system 210 in response to the re-inputting request (step S87), whereafter the personal computer 40 repeats the succeeding processing steps.

If the personal computer 40 discriminates at step S92 that the user issues a selection instruction not to perform re-inputting through the selection button, then it sends a use permission requesting process stopping request to the charging management system 210 and then ends the use permission requesting routine.

If it is discriminated at step S90 that the authentication of the member results in success, then the personal computer 40 acquires identification information (a medium ID and a contents ID) for specifying contents of an object of a use permission request from the electronic apparatus 30 based on a designation of the user (step S93). Then, the personal computer 40 sends the acquired identification information as use permission request contents information to the charging management system 210 (step S94).

In response to the identification information, use permission conditions regarding the contents specified with the identification information are sent from the charging management system 210. Consequently, the personal computer 40 receives and displays the user permission conditions on the display unit (step S95). The use permission conditions may include information of a new contents use price and a new limitation time number.

If the user accepts the use permission conditions, then the user will operate, for example, an OK button icon on the screen, but if the user rejects the use permission conditions, then the user will operate, for example, a cancel button icon. The personal computer 40 thus discriminates whether or not the user accepts the use permission conditions (step S96). Then, if the personal computer 40 discriminates that the user does not accept the use permission conditions, then it ends the use permission request processing routine.

On the other hand, if the personal computer 40 discriminates that the user accepts the use permission conditions, then it sends the new use permission time number and the new contents use price included in the use permission conditions to the electronic apparatus 30 and instructs the electronic apparatus 30 to cause the control section 351 thereof to rewrite the stored data of the time number memory portion and the contents use price memory portion of the nonvolatile memory 353 (step S97). In response to the received information and instruction, the control section 351 of the electronic apparatus 30 executes rewriting of the stored data of the time number memory portion and the contents use price memory portion of the nonvolatile memory 353.

Through the processing described above, the use permission time number of the time number memory portion of the nonvolatile memory 353 is changed to a value different from "0", and consequently, further use of the contents by the user becomes possible. Then, the chargeable price upon such use is based on the new contents use price.

It is to be noted that, in the foregoing description, the electronic apparatus 30 and the charging management system 210 are connected to each other through the personal computer 40, and the time number limitation information and the price information in the time number memory portion and the contents use price memory portion respectively of the nonvolatile memory 353 of the electronic apparatus 30 are rewritten to cancel the use limitation. However, the method for cancellation of the use limitation is not limited to the specific method described.

For example, the charging management system 210 may not send use permission conditions, but may send a time number limitation cancellation key stored in a database 211 as seen in FIG. 10 to the electronic apparatus 30. In this instance, when the time number limitation cancellation key is given to the electronic apparatus 30, the electronic apparatus 30 sets the use permission time number of the time number memory portion to a value determined in advance or the infinity while a price determined in advance is set to the contents use price memory portion.

Alternatively, information of a use permission time number and a contents use price after cancellation of the time number limitation may be included in and recorded together with the time period charging information 106 onto a disk medium and then set, when the time number limitation cancellation key is received, as a use permission time number of the time number memory portion and a use price of the contents use price memory portion, respectively.

The time number limitation cancellation key may be sent not directly to the electronic apparatus 30 over the digital communication network 41 using the personal computer 40 as in the example described above but indirectly through the member 27. In this instance, for example, the member 27 may go to the time charge management company or originate a telephone call to request the time charge management company for use permission.

In response to the use permission request, the time charge management company 21 performs membership authentication, and if the membership authentication results in success, then the time charge management company 21 forwards a document or uses suitable communication means such as a portable telephone set to provide the time number limitation cancellation key from the charging management system 210 to the member 27. Alternatively, an ordinary postal system may be used to provide the time number limitation cancellation key from the charging management system 210 to the member 27.

Upon reception of the time number limitation cancellation key, the member 27 will input the time number limitation cancellation key to the electronic apparatus 30 through the operation section 34 of the electronic apparatus 30. When the time number limitation cancellation key is inputted, the electronic apparatus 30 sets the use permission time number of the time number memory portion to the value determined in advance or the infinity and places the price determined in advance into the contents use price memory portion as described hereinabove.

It is to be noted that, for example, if it is intended to apply no use time number limitation any more after the use time number limitation is cancelled, the use permission conditions may include only the contents use price.

[Notification of Information of a Chargeable Time Period from an Electronic Apparatus]

Now, notification of chargeable time period information from an electronic apparatus 30 to the charging management system 210 using the system shown in FIG. 10 is described.

As described hereinabove, the charging management system 210 of the time charge management company 21 notifies, when a settlement time approaches, the personal computer 40 of the fact that a settlement time is approaching using an electronic mail or the like to urge the user to transfer operation information of the electronic apparatus 30 and so forth to the personal computer 40.

Thus, the user will connect the electronic apparatus 30 to the personal computer 40 and perform operation for data transfer. When the electronic apparatus 30 receives a data transfer request from the personal computer 40, it reads out product ID information and member ID information as well as operation information including information of the chargeable time periods Dt and Ct stored in the memory 353 and transfers the read out information to a storage section such as a hard disk of the personal computer 40. At the settlement time, the personal computer 40 sends the stored information to the charging management system 210.

FIGS. 13A and 13B illustrate flows of the transferring operation, and particularly FIG. 13A illustrates processing by the electronic apparatus 30 while FIG. 13B illustrates processing by the personal computer 40.

Referring first to FIG. 13A, when the power supply to the electronic apparatus 30 is switched on (step S101), the electronic apparatus 30 is initialized (step S102). Then, the electronic apparatus 30 discriminates whether or not it is connected to the personal computer 40 (step S103). If the electronic apparatus 30 discriminates that it is connected to the personal computer 40, then it waits for arrival of a data transfer request from the personal computer 40 (step S104).

Then, when a data transfer request from the personal computer 40 is received, the electronic apparatus 30 transfers the operation information and the information of product IDs and member IDs stored in the memory 353 (step S105). After the transfer of the data comes to an end (step S106), the electronic apparatus 30 deletes the data transferred upon the last settlement from the memory 353 (step S107), thereby ending the processing.

The reason why the data in the present operation cycle are left stored also after the transfer thereof whereas the data in the last operation cycle are erased is that, while the memory capacity is taken into consideration, when the data transfer results in failure, for example, because of a trouble on a transmission line, data transfer may be required once again in response to a request from the charging management system 210 side and that, since a request for data transfer once again from the charging management system 210 has not been received before the data transfer in the present operation cycle, there is no trouble even if the last data are erased.

It is to be noted that, where the memory capacity of the memory 353 is sufficiently great, not the last data but only the second or third last data may be left stored so that the data may be available for a time period as long as possible.

Referring now to FIG. 13B, on the personal computer 40, when the power supply is switched on (step S111), initialization is performed (step S112). Then, the personal computer 40 starts up a settlement application in response to an instruction of the user (step S113). The settlement application is supplied from the time charge management company 21 to the member 27 and installed in the personal computer 40 in advance.

Then, the personal computer 40 signals a message for urging the user to operate a transfer requesting button icon (step S114). If the user operates the transfer requesting button in response to the message (step S115), then the personal computer 40 signals a data transfer request to the electronic apparatus 30 (step S116).

In response to the data transfer request, data of operation information and so forth are transferred from the electronic apparatus 30 to the personal computer 40. The personal computer 40 thus receives and stores the data onto the hard disk (step S117). Then, when the personal computer 40 confirms completion of reception of the data from the electronic apparatus 30 (step S118), it displays a data reception completion message (step S119), thereby ending the processing routine.

Figure 14:
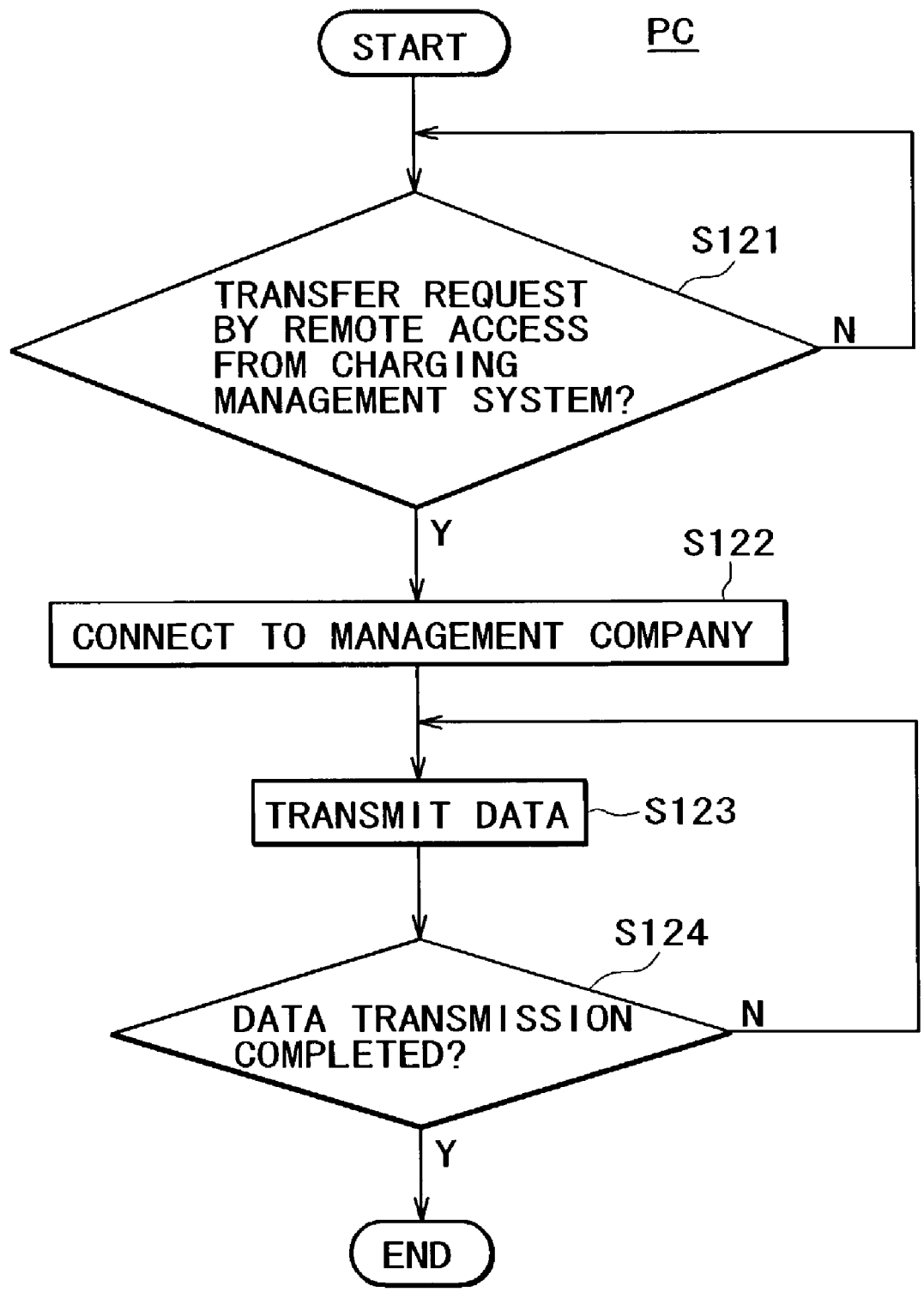
FIG. 14 is a flow chart illustrating a data transfer process involved in the settlement process in the time period charging system of the first embodiment and performed by the personal computer.

Referring now to FIG. 14, if the personal computer 40 receives a transfer request by remote accessing from the charging management system 210 of the time charge management company 21 (step S121), then it automatically enters a transfer mode and establishes a connection to the charging management system 210 of the time charge management company 21 (step S122). Then, the personal computer 40 transfers data of operation information and so forth stored on the hard disk thereof to the charging management system 210

(step S123). Then, when the personal computer 40 confirms completion of the data transfer (step S124), it ends the automatic transfer mode.

Figure 15:
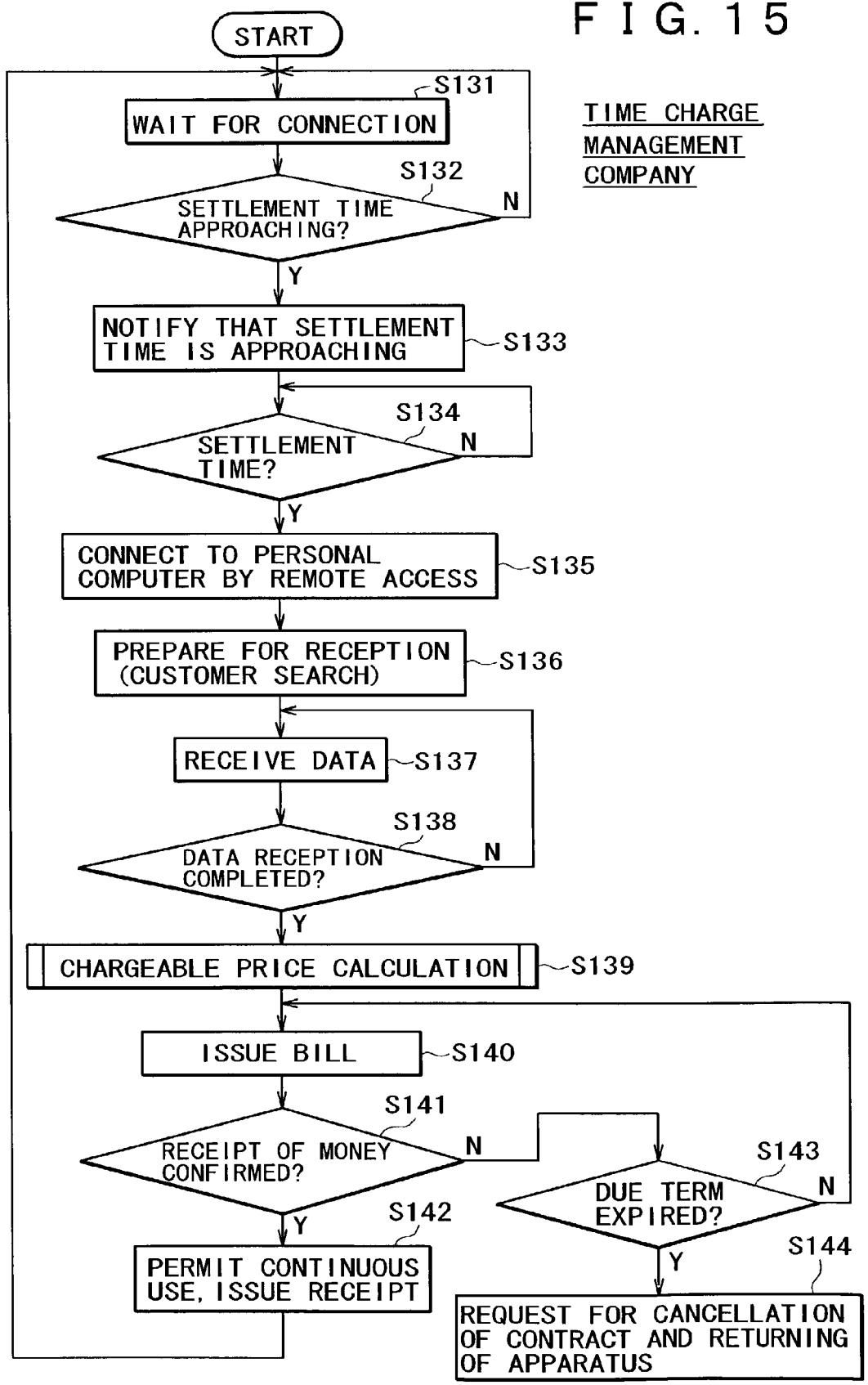
FIG. 15 is a flow chart illustrating a settlement process in the time period charging system of the first embodiment and performed by the time charge management company side.

Operation of the charging management system 210 of the time charge management company 21 in this instance is illustrated in FIG. 15.

Referring to FIG. 15, the charging management system 210 is in a standby state for connection to a personal computer of a member until a settlement time approaches (steps S131 and S132). Then, when the charging management system 210 detects that the settlement time approaches (step S132), it notifies the user side by an electronic mail or the like that the settlement time is approaching (step S133).

Then, when the settlement time comes (step S134), the charging management system 210 establishes a connection to the personal computer 40 by remote accessing (step S135) and makes preparations for reception of data (step S136). While the preparations for reception are proceeding, the personal computer 40 performs a customer research.

Thus, data are transferred from the personal computer 40 as described above. Therefore, the charging management system 210 receives all of the data (steps S137 and S138). After the reception of the data is completed, the charging management system 210 multiplies a chargeable time period Dt with regard to use of an apparatus and a chargeable time period Ct with regard to use of contents included in function-dependent operation information in the operation information by respective corresponding time unit prices to calculate a chargeable price which is a price for the use time periods at present (step S139).

In the present embodiment, for the chargeable time period Dt based on use of an apparatus, a fixed use price (time unit price) is set, and the use price is multiplied by the chargeable time period Dt to calculate the use price (chargeable price). Meanwhile, the chargeable time period Ct based on use of contents have been normalized to a use time period for a standard price as described above, and therefore, the standard time period unit price determined in advance is multiplied by the chargeable time period Ct to calculate the use price (chargeable price).

In other words, in the present embodiment, although the use prices of individual contents are different from one another, since, upon calculation of the chargeable time period Ct, the contents price normalization coefficient W is used to calculate the chargeable time period Ct as a chargeable time period with regard to a standard time period unit price, a contents use price (chargeable price) can be calculated only using the standard time period unit price in this manner. Accordingly, the charging management system 210 need not refer to the individual contents use prices in order to calculate a contents use price.

After the calculation of the chargeable price comes to an end, the charging management system 210 issues a bill to the user (member) (step S140). Also the bill may be issued by an electronic mail or a mail by an ordinary postal system. The user receiving the bill will pay the price through a store 28 such as a convenience store as seen in FIG. 10. Alternatively, the user may pay the price by automatic transfer from a bank account or an account of a credit company as described hereinabove.

Then, the charging management system 210 confirms receipt of money from the user (step S141). If the receipt of money is confirmed, then the charging management system 210 permits continued use of the electronic apparatus 30 and issues a receipt (step S142). On the other hand, if the charging management system 210 fails in the confirmation of the receipt of money from the user, then it waits for the reception till the due date (step S143). Then, if the due date expires, then the charging management system 210 issues a request for cancellation of the use contract and returning of the electronic apparatus 30. For example, the charging management system 210 transmits a returning requesting signal to the personal computer 40 of the member 27 (step S144).

Figure 16:
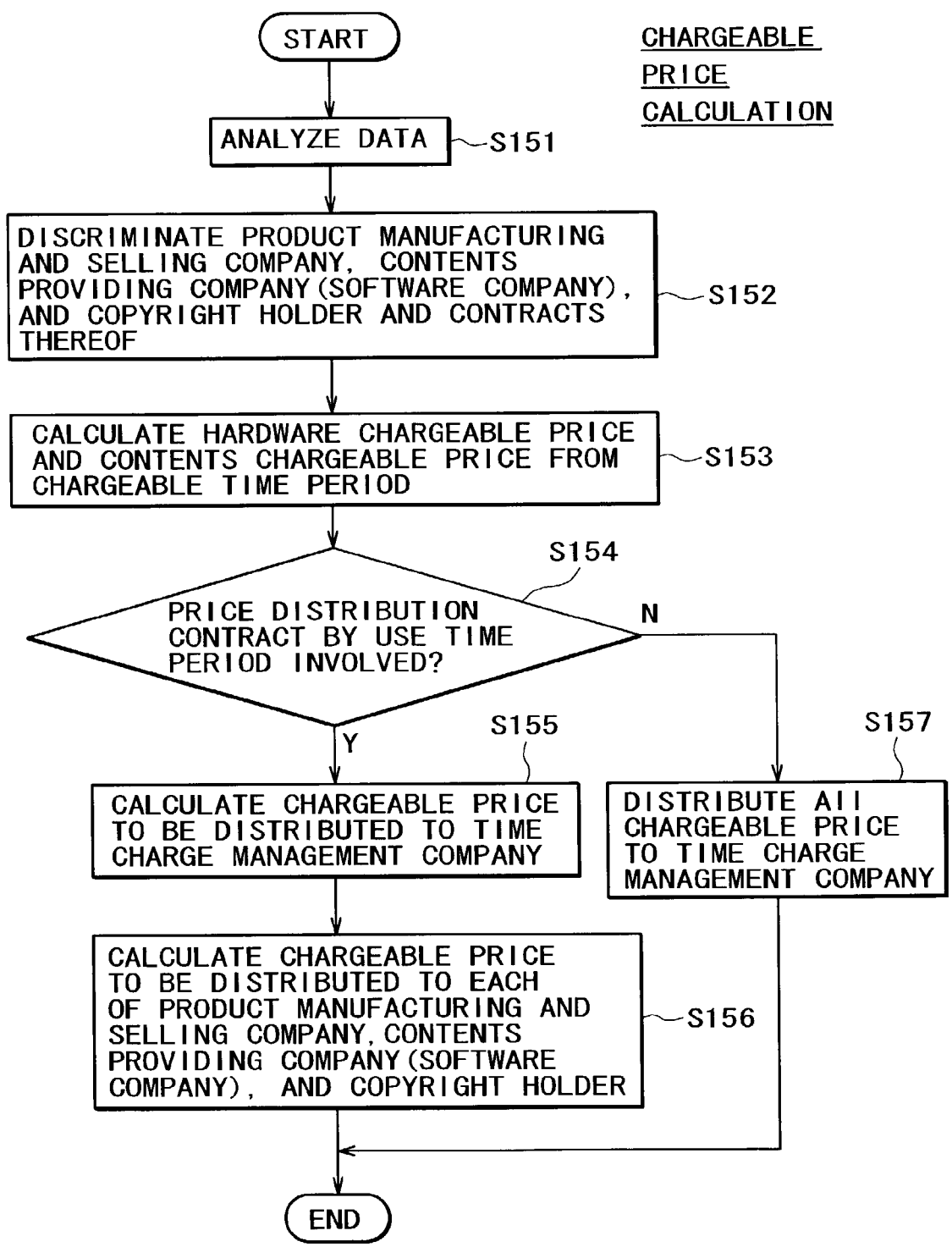
FIG. 16 is a flow chart illustrating detailed processing at step S139 of FIG. 15.

FIG. 16 illustrates a chargeable price calculation process at step S139 in the process of the charging management system 210 illustrated in FIG. 15. The chargeable price calculation process illustrated in FIG. 15 takes also contents of the contract concluded of the product manufacturing and selling company 22, the software company 23 and the copyright holder 24 with the time charge management company 21 into consideration.

A database 211 of the charging management system 210 of the time charge management company 21 stores not only customer information and operation information but also product information (including product IDs) and contents information (including contents IDs) so that it can be recognized, from a coordinated relationship between product IDs and product manufacturing and selling companies and a coordinated relationship of contents to software companies and copyright holders, what product has been produced by which product manufacturing and selling company, what contents have been supplied from which software company and who is the copyright holder of contents.

The database 211 also stores information of contract conditions regarding whether a contract regarding each of the product manufacturing and selling companies and a product of the product manufacturing and selling company is a contract only of sales or a contract which involves acceptance of distribution of a price based on a use time period (including a contract which involves only acceptance of distribution of a price based on a use time period) and regarding whether a contract between each of the software companies and contents is a contract only of sales or a contract which involves acceptance of distribution of a price based on a use time period (including a contract which involves only acceptance of distribution of a price based on a use time period).

Referring to FIG. 16, the charging management system 210 first analyzes reception data (step S151) and discriminates the product manufacturing and selling company of the electronic apparatus from the product ID and further discriminates the software company, which is a company providing the contents, and the copyright holder from the contents ID. The charging management system 210 further discriminates the contract conditions with the product manufacturing and selling company, software company and copyright holder (step S152). Then, the charging management system 210 uses information of the chargeable time periods Dt and Ct in the data to calculate a chargeable price in such a manner as described hereinabove (step S153).

Then, the charging management system 210 discriminates, from the contract conditions discriminated at step S152, whether or not the contract regarding the product and/or the contents involves acceptance of distribution of a price based on a use time period (step S154). If the contract involves such acceptance of distribution of a price, then the charging management system 210 calculates an amount of money to be distributed to the time charge management company from within the chargeable price determined at step S153 and stores the data of calculated amount into a dividend memory portion of the time charge management company 21 within the memory area provided in the charging management system 210 (step S155). Further, the charging management system 210 calculates amount of money to be distributed to the product manufacturing and selling company 22, software company 23 and copyright holder 24 from within the chargeable price determined at step S153 and stores data of the calculated amount into the dividend memory portions of the product manufacturing and selling company 22, software company 23 and copyright holder 24 (step S156).

If the charging management system 210 discriminates at step S154 that the contract regarding the product does not involve acceptance of distribution of a price based on a use time period, then it determines that all of the chargeable price determined is a dividend to the time charge management company 21 and stores the data of chargeable price into the dividend memory portion of the time charge management company 21 (step S157).

Also in the case of the electronic apparatus 30 which by itself cannot communicate directly with the charging management system 210 but transfers data through the personal computer 40 as in the present first embodiment, where the settlement time is a predetermined term such as every one month, the calendar function of the clock section 352 provided in the charging processing section 35 of the electronic apparatus 30 can be used to notify the user that a settlement date is approaching and urge the user to transfer data for the settlement process.

Figure 17:
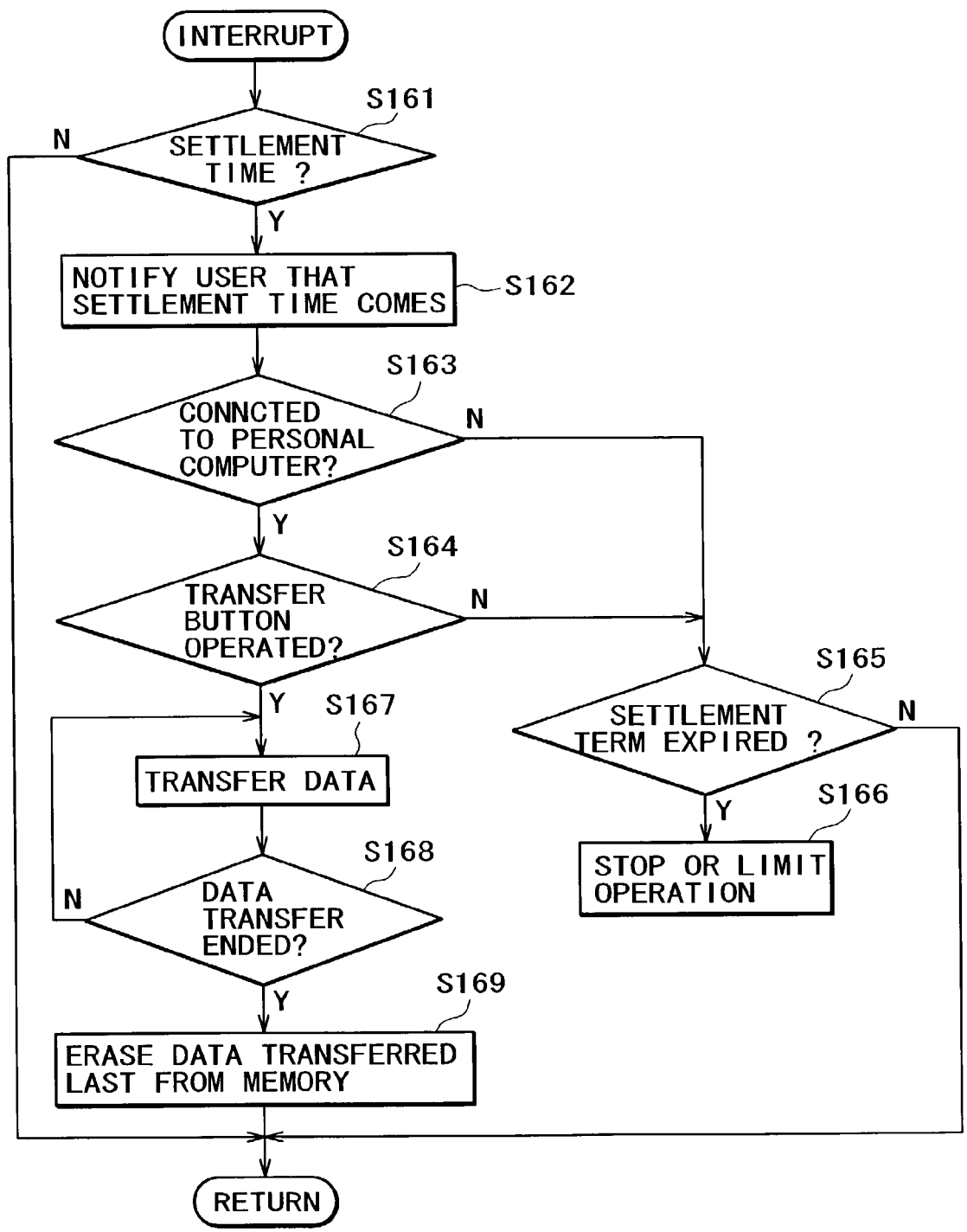
FIG. 17 is a flow chart illustrating a data transfer process in the settlement process performed by the electronic apparatus used in the time period charging system of the first embodiment.

FIG. 17 illustrates a processing routine regarding a settlement time and data transfer process of the electronic apparatus 30 in the case just described. The processing routine is rendered operative by interrupt after every fixed time period.

Referring to FIG. 17, after the processing routine is started up by interrupt, the charging processing section 35 first discriminates whether or not a settlement time comes or is approaching (step S161). If the settlement time does not come, then the processing routine is quitted. On the other hand, if the settlement time comes, then the charging processing section 35 requests the microcomputer section 31 to issue a message of arrival of the settlement time. The microcomputer section 31 displays the message of arrival of the settlement time on the display section 34 to notify the user (step S162) to urge the user to transfer data for the settlement process.

Then, the control section 351 discriminates whether or not the electronic apparatus 30 is connected to the personal computer 40 by the user in response to the message (step S163). If the electronic apparatus 30 is not connected to the personal computer 40, then the charging processing section 35 discriminates whether or not the settlement term has expired (step S165). If the charging processing section 35 discriminates that the settlement term has not expired, then the processing routine is quitted immediately.

On the other hand, if it is discriminated at step S165 that the settlement term has expired, then the charging processing section 35 issues a request to the microcomputer section 31 to stop or restrict operation of the electronic apparatus 30. Consequently, the electronic apparatus 30 is placed into a disabled or restricted operation condition (step S166).

If it is discriminated at step S163 that the electronic apparatus 30 is connected to the personal computer 40, then the microcomputer section 31 discriminates whether or not the data transfer button is on (step S164). If the microcomputer section 31 discriminates that the data transfer button is not on, then the control section 351 discriminates whether or not the settlement term has expired (step S165). If it is discriminated that the settlement term has not expired, then the processing routine is quitted immediately.

On the other hand, if the control section 351 discriminates that the settlement term has expired, then the charging processing section 35 issues a request to the microcomputer section 31 to stop or restrict operation of the electronic apparatus 30. Consequently, the electronic apparatus 30 is placed into a disabled or restricted operation condition (step S166).

On the other hand, if it is discriminated at step S164 that the transfer button is on, then operation information and information of products IDs and member IDs stored in the memory 353 are transferred (step S167). After the transfer of the data comes to an end (step S168), the data transferred upon the last settlement are erased from the memory 353 (step S169), whereafter the processing routine is quitted.

In the first embodiment, the charging management system 210 can collect and analyze operation information from the electronic apparatus 30 to examine a trend of use of the user. For example, the charging management system 210 can grasp which function has been used most and feed back the information for improvement in development of a next product or can remove a function which is not used.

Further, in the first embodiment, since an equivalent is paid also for a time period for which music software or video software is enjoyed, even if contents recorded on a recording medium reproduced by the electronic apparatus 30 are a copy, the price can be recovered. Accordingly, there is a merit to the copyright holder that the royalty for copyright can be acquired precisely.

While, in the description of the first embodiment, the weights for use for calculation of chargeable time periods for the individual functions are set depending upon the load factor of the CPU, it is otherwise possible to prepare a correspondence table of the weighting coefficients for the individual functions in the nonvolatile memory 353 of the charging processing section 35 and read out, for the individual functions, corresponding ones of the weighting coefficients from the nonvolatile memory 353 and then use the read out weighting coefficients for calculation of the chargeable periods of time.

Also it is possible to store the type-dependent coefficient of an apparatus in advance in the nonvolatile memory 353 corresponding to an electronic apparatus in which the charging processing section 35 is incorporated and use it in calculation of the chargeable time period.

Further, while, in the first embodiment described above, the chargeable time period is calculated by the charging processing section 35 built in the electronic apparatus 30, it is otherwise possible to transfer the use time period T1 and the operation information such as on/off information of a function button to the charging management system 210 side so that also the charging management system 210 side may perform calculation of the chargeable time period in a similar manner as in the process of the charging processing section 35 described above.

Further, while data transfer for settlement to the personal computer 40 is performed through remote accessing, data may naturally be transferred to the charging management system 210 through the personal computer 40 in response to a manual operation of the user.

Further, while data transfer from the electronic apparatus 30 to the personal computer 40 is performed by the electronic apparatus 30 in response to a data transfer request issued from the personal computer 40, it is otherwise possible to provide a data transfer button on the electronic apparatus 30 such that a data transfer request is sent from the electronic apparatus 30 side and operation information and other necessary information are transferred to the personal computer 40.

It is to be noted that, since member IDs and product IDs of electronic apparatus being used are stored in a coordinated relationship with each other in the customer database of the charging management system 210 of the time charge management company 21, if either one of a member ship ID or a product ID of an electronic apparatus being used is sent as the operation information for the charging process to the charging management system 210, then the charging management system 210 can execute a charging process for the member.

[Another Example of Contents Used by an Electronic Apparatus]

The example described above is directed to contents stored on a disk medium. However, the present invention can be applied also where contents are downloaded from the time charge management company 21, for example, through the Internet and used. In this instance, contents time period charging information is included in the header part of downloaded data.

Figure 18:
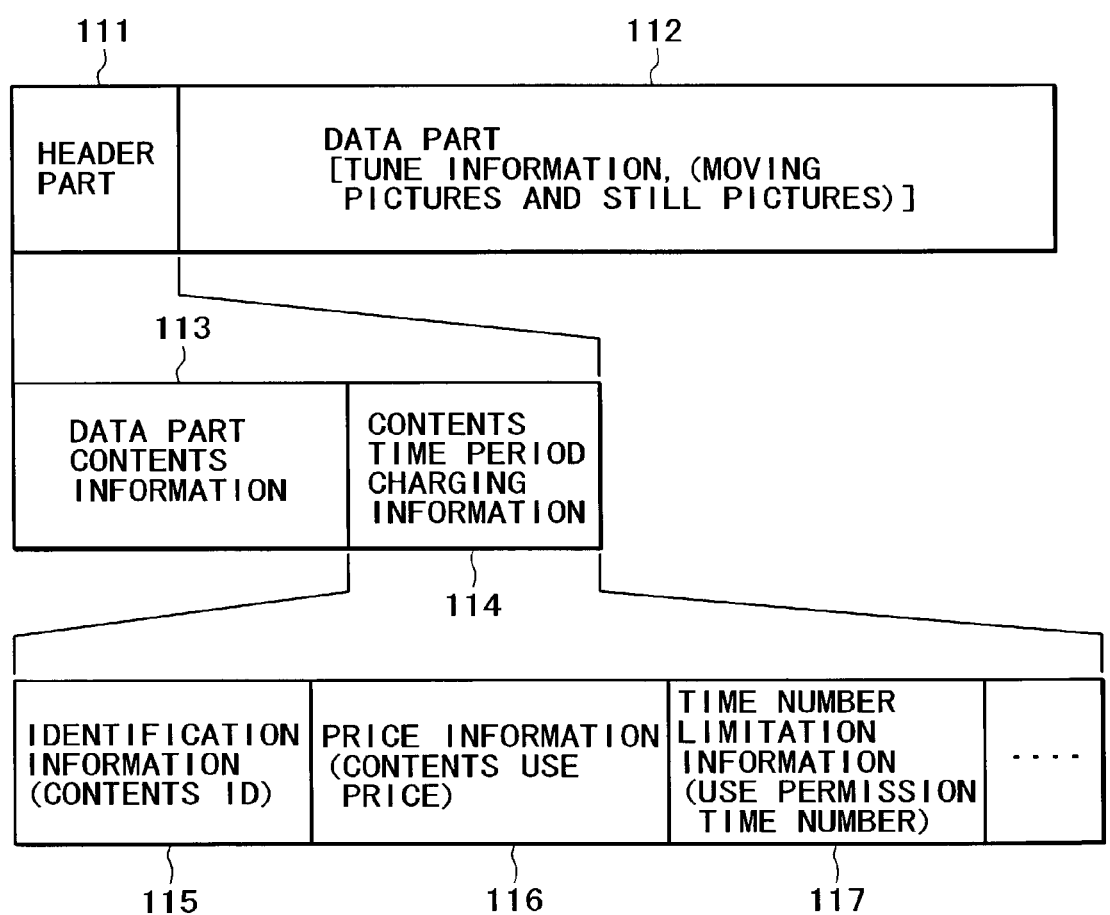
FIG. 18 is diagrammatic view illustrating another example of contents used in the first embodiment.

FIG. 18 shows a structure of such downloaded data as mentioned above. Referring to FIG. 18, the downloaded data include a header part 111 and a data part 112. In the data part 112, contents data not only of tune information and image information but also of text information and a program are stored.

The header part 111 includes data part contents information 113 representative of what contents are placed in the data part 112, and contents time period charging information 114 where the contents of the data part 112 are use time period chargeable contents. If the contents placed in the data part 112 are not use time period chargeable contents, then the contents time period charging information 114 is not provided in the header part 111.

The contents time period charging information 114 includes identification information 115 including an identifier (contents ID) of the contents written in the data part 112, price information 116 including a use price (contents use price) of the contents per unit time period, time number limitation information 117 including a use permission time number of the contents, and so forth similarly as in the case of the disk medium 100 described hereinabove.

Also where the downloaded contents are used through reproduction or the like, the contents time period charging information is read out prior to the use of the contents and such a charging process as described above is performed depending upon whether or not the contents are use time period chargeable contents in a similar manner as in the case of a package medium such as a disk medium described hereinabove.

It is to be noted that contents data stored on the disk medium 100 may otherwise have such a structure as described above with reference to FIG. 18. In this instance, time period charging information need not be written but may be written in the lead-in part.

Second Embodiment

The present second embodiment has a general configuration quite similar to that of the first embodiment described hereinabove with reference to FIGS. 1 and 2.

While the first embodiment described above uses a personal computer in order to transfer data for a settlement process, in the present second embodiment, a radio communication function is used to establish a connection to the charging management system 210 of the time charge management company 21 to directly perform data transfer of operation information.

Figure 19:
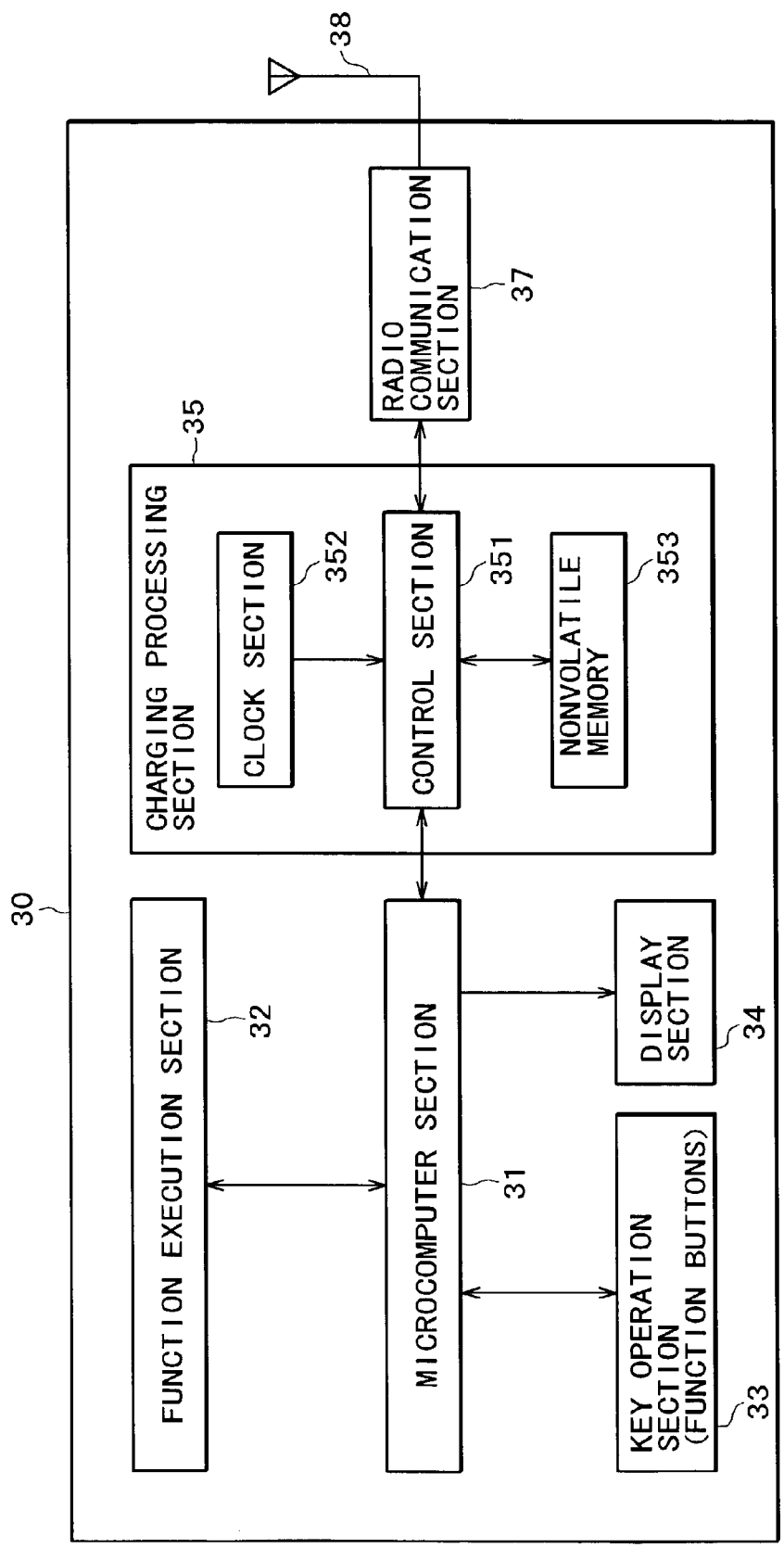
FIG. 19 is a block diagram showing an example of a configuration of an electronic apparatus used in a time period charging system according to a second embodiment of the present invention.

FIG. 19 shows an example of a configuration of the electronic apparatus 30 in the second embodiment. Referring to FIG. 19, the electronic apparatus 30 shown has a quite similar configuration to that of the electronic apparatus 30 in the first embodiment except that it includes a radio communication section 37 and a transmission/reception antenna 38 in place of the interface section 36 of the electronic apparatus 30 in the first embodiment.

Figure 20:
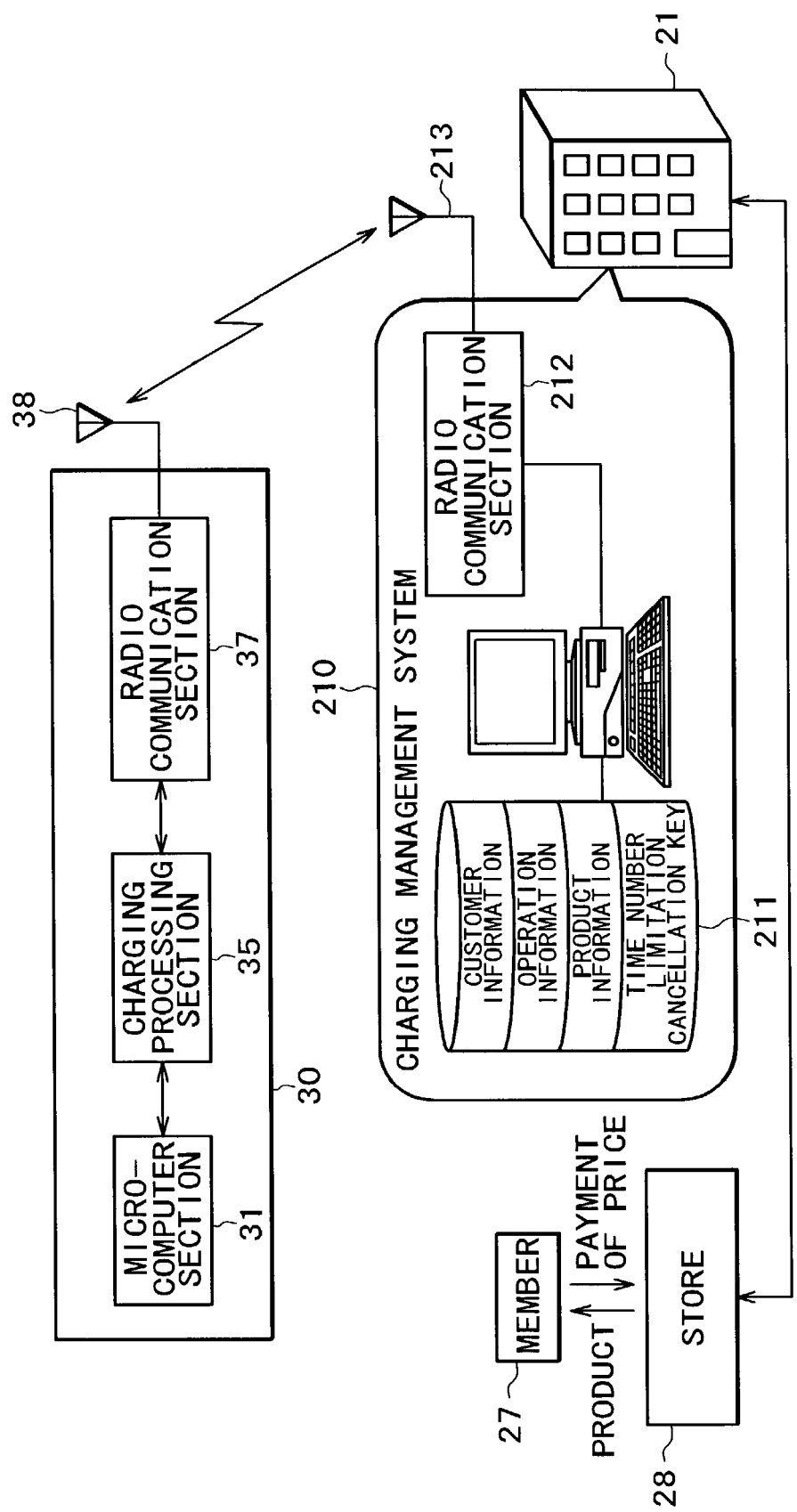
FIG. 20 is a block diagram illustrating a settlement process in the time period charging system of the second embodiment.

FIG. 20 shows an example of a configuration for transfer of operation information in the second embodiment. In the second embodiment, also the charging management system 210 of the time charge management company 21 includes a radio communication section 212 and an antenna 213 so that it can communicate various data with the electronic apparatus 30 over a radio channel.

Figure 21:
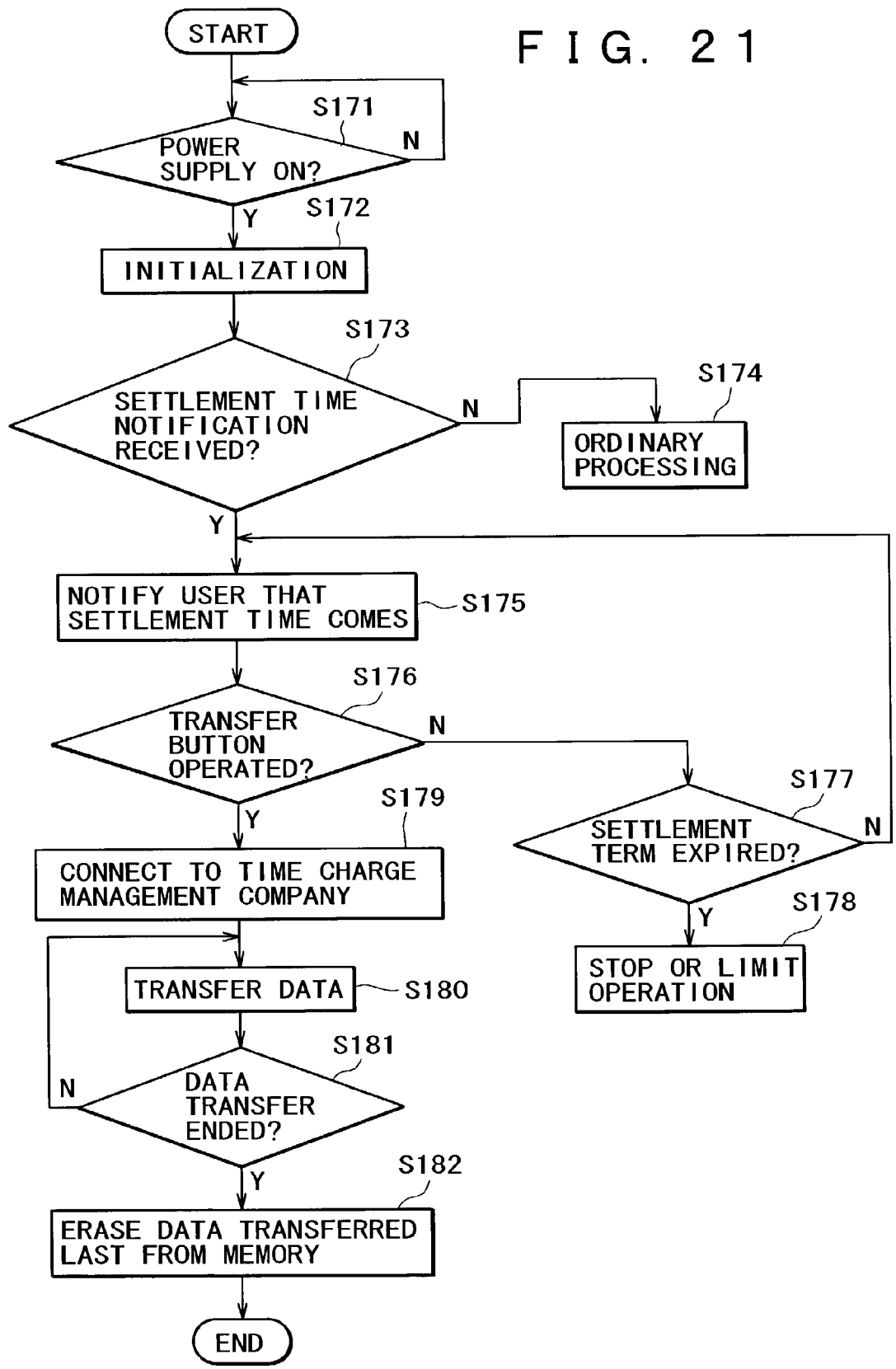
FIG. 21 is a flow chart illustrating a data transfer process involved in the settlement process in the time period charging system of the second embodiment.

FIG. 21 illustrates a flow of operation of a data transfer process for settlement of the electronic apparatus 30 in the second embodiment.

Referring to FIG. 21, when the power supply to the electronic apparatus 30 is switched on (step S171), it is initialized (step S172). Then, in the second embodiment, when a settlement time comes, a settlement time notification is sent from the charging management system 210 to the electronic apparatus 30 over a radio channel. The charging processing section 35 of the electronic apparatus 30 supervises arrival of the settlement time notification (step S173), and executes an ordinary process such as the calculation process for a use time period described hereinabove and so forth until after the settlement time notification is received (step S174).

Then, when arrival of the settlement time notification is detected, the charging processing section 35 requests the microcomputer section 31 to issue a message of the arrival of the settlement time. The microcomputer section 31 displays the message of the arrival of the settlement time on the display section 34 (step S175) to urge the user to transfer data for the settlement process.

Then, the charging processing section 35 supervises information regarding an operated function button from the microcomputer section 31 to supervise whether or not the transfer button is operated (step S176).

Then, the charging processing section 35 supervises whether or not the transfer button is operated within the settlement term (step S177). The charging processing section 35 starts up a timer thereof when it receives the settlement time notification to measure the period of the settlement term.

If it is discriminated at step S177 that an operation of the transfer button is not performed even after the settlement term expires, then the charging processing section 35 issues a request to the microcomputer section 31 to stop or restrict operation of the electronic apparatus 30. Consequently, the electronic apparatus 30 is placed into a disabled or restricted operation condition (step S178).

On the other hand, if it is discriminated at step S176 that the transfer button is on, then the charging processing section 35 establishes a connection to the charging management system 210 of the time charge management company 21 over a radio channel (step S179) and transfers the operation information and the information of the product IDs and the member IDs stored in the memory 353 (step S180). After the transfer of the data comes to an end (step S181), the charging processing section 35 deletes the data transferred upon the last settlement from the memory 353 (step S182), thereby ending the processing routine.

While, in the second embodiment described above, a radio channel is used to perform communication between the electronic apparatus 30 and the charging management system 210, quite similar processing to that described above can be performed also where the electronic apparatus 30 and the charging management system 210 of the time charge management company 21 communicate directly with each other over a public network such as a telephone network (an ADSL (Asymmetric Digital Subscriber Line), an ISDN (Integrated Services Digital Network), a portable telephone communication network, a PHS (Personal Handyphone System) telephone network, or the Internet), a privately leased line or a CATV communication network in place of the radio communication.

Third Embodiment

This third embodiment has a general configuration quite similar to that of the first embodiment described hereinabove with reference to FIGS. 1 and 2.

While, in the first and second embodiments described above, the charging processing section 35 is built in, in the present third embodiment, the charging processing section 35 is configured as a charging processing apparatus 50 which can be removably loaded into the electronic apparatus 30.

Figure 22:
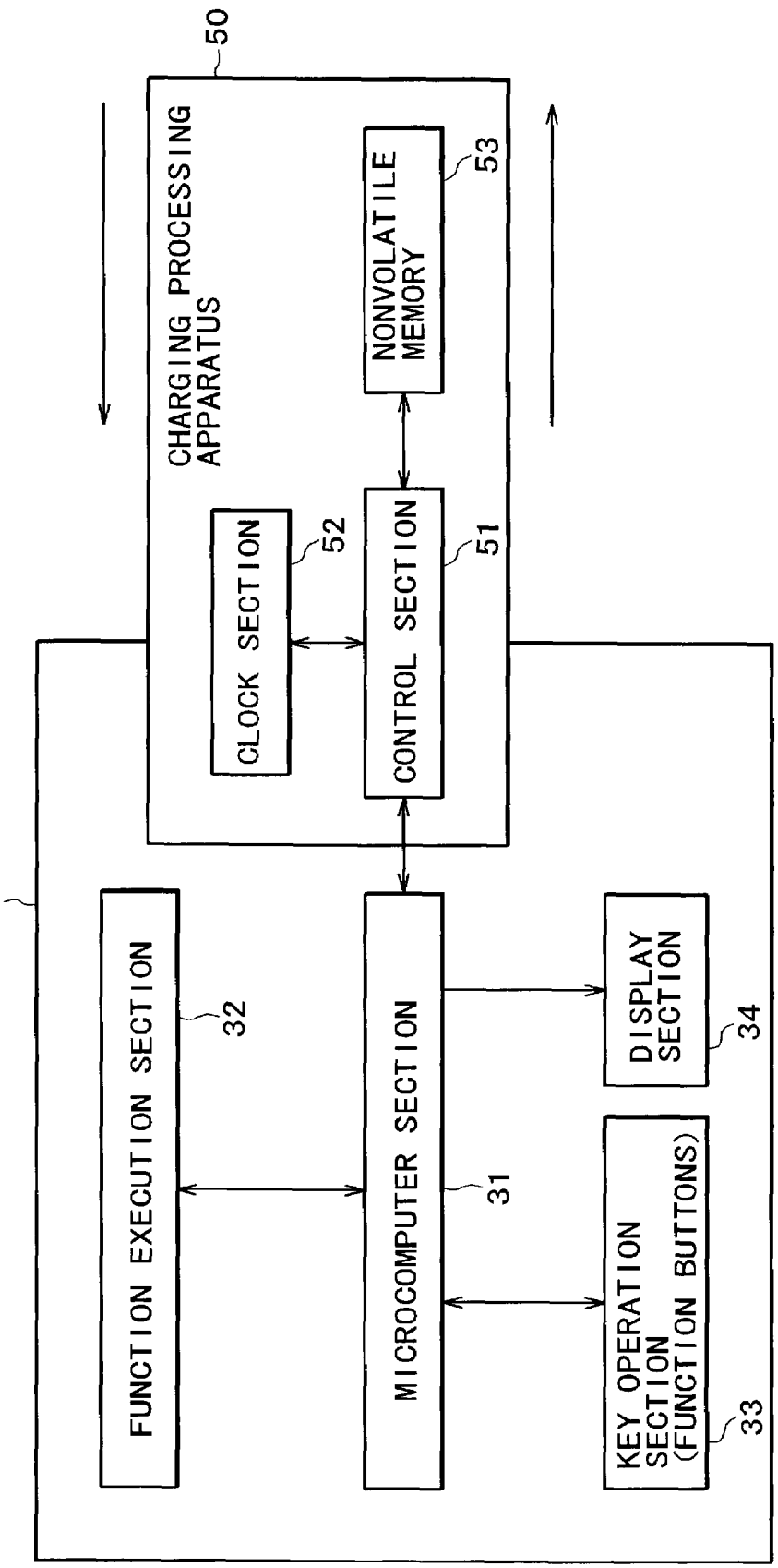
FIG. 22 is a block diagram showing an example of a configuration of an electronic apparatus used in a time period charging system according to a third embodiment of the present invention.

FIG. 22 shows a configuration of an electronic apparatus 30 in the third embodiment where the charging processing apparatus 50 is loaded in the electronic apparatus 30. Though not shown in FIG. 22, the electronic apparatus 30 has a slot (connector) for allowing removable loading of the charging processing apparatus 50 therein. If the charging processing apparatus 50 is inserted into the slot, then the charging processing apparatus 50 and the microcomputer section 31 are connected to each other as seen in FIG. 22.

The charging processing apparatus 50 has a configuration similar to that of the charging processing section 35 and includes a control section 51 corresponding to the control section 351, a clock section 52 corresponding to the clock section 352 and a nonvolatile memory 53 corresponding to the nonvolatile memory 353. The charging processing apparatus 50 thus operates in a similar manner to that of the charging processing section 35 described hereinabove.

Figure 23:
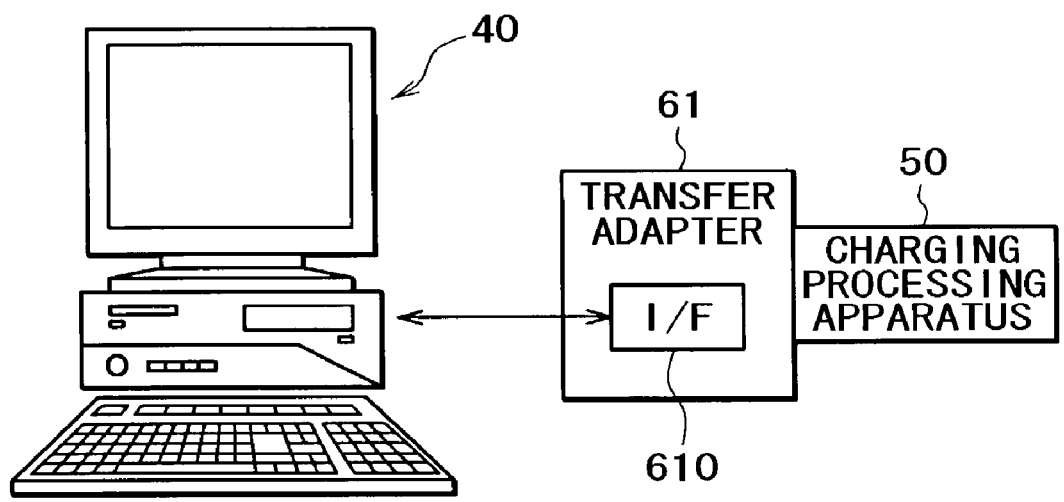
FIG. 23 is a block diagram illustrating a data transfer process involved in a settlement process in the third embodiment.

Similarly as in the first embodiment, in order to transfer data for a settlement process through the personal computer 40, the charging processing apparatus 50 is loaded into a transfer adapter 61 which includes an interface section 610 for allowing connection to the personal computer 40 as seen in FIG. 23.

The transfer adapter 61 has a slot (not shown) for removably receiving the charging processing apparatus 50 similarly as in the electronic apparatus 30. Thus, if the charging processing apparatus 50 is inserted into the slot, then the control section 51 of the charging processing apparatus 50 is connected to the interface section 610. The interface section 610 is similar to the interface section 36 of the electronic apparatus 30 in the first embodiment shown in FIG. 3. Accordingly, if a data transfer request is sent from the personal computer 40 to the charging processing apparatus 50 through the transfer adapter 61, then data transfer can be performed.

Figure 24:
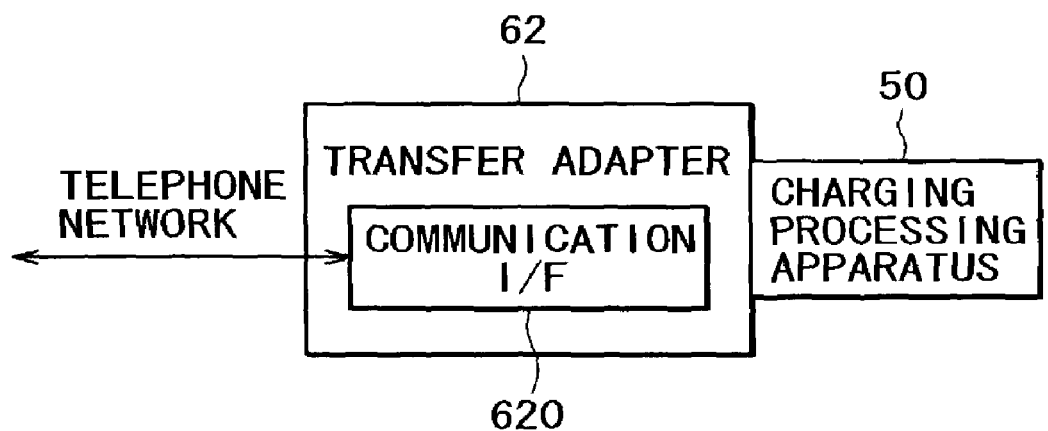
FIG. 24 is a block diagram illustrating another data transfer process involved in the settlement process in the third embodiment.

Further, similarly as in the second embodiment, if such a transfer adapter 62 connected to a telephone line as shown in FIG. 24 is used, then the charging processing apparatus 50 can be connected directly to the charging management system 210 without intervention of the personal computer 40 to transfer data from the charging processing apparatus 50.

The transfer adapter 62 shown in FIG. 24 has a slot not shown for removably receiving the charging processing apparatus 50 similarly as in the transfer adapter 61. If the charging processing apparatus 50 is inserted into the slot, then the control section 51 of the charging processing apparatus 50 is connected to a communication interface section 620 connected to the communication means.

It is to be noted that, if the communication interface section 620 in FIG. 24 is replaced by a radio communication section, then the charging processing apparatus 50 can be connected directly to the charging management system 210 without intervention of the personal computer 40 over a public network such as, for example, a telephone network (an ADSL, an ISDN, a portable telephone communication network, a PHS telephone network or the Internet), a privately leased line or a CATV communication network to transfer data from the charging processing apparatus 50 in a similar manner as in the second embodiment described hereinabove.

Figure 25:
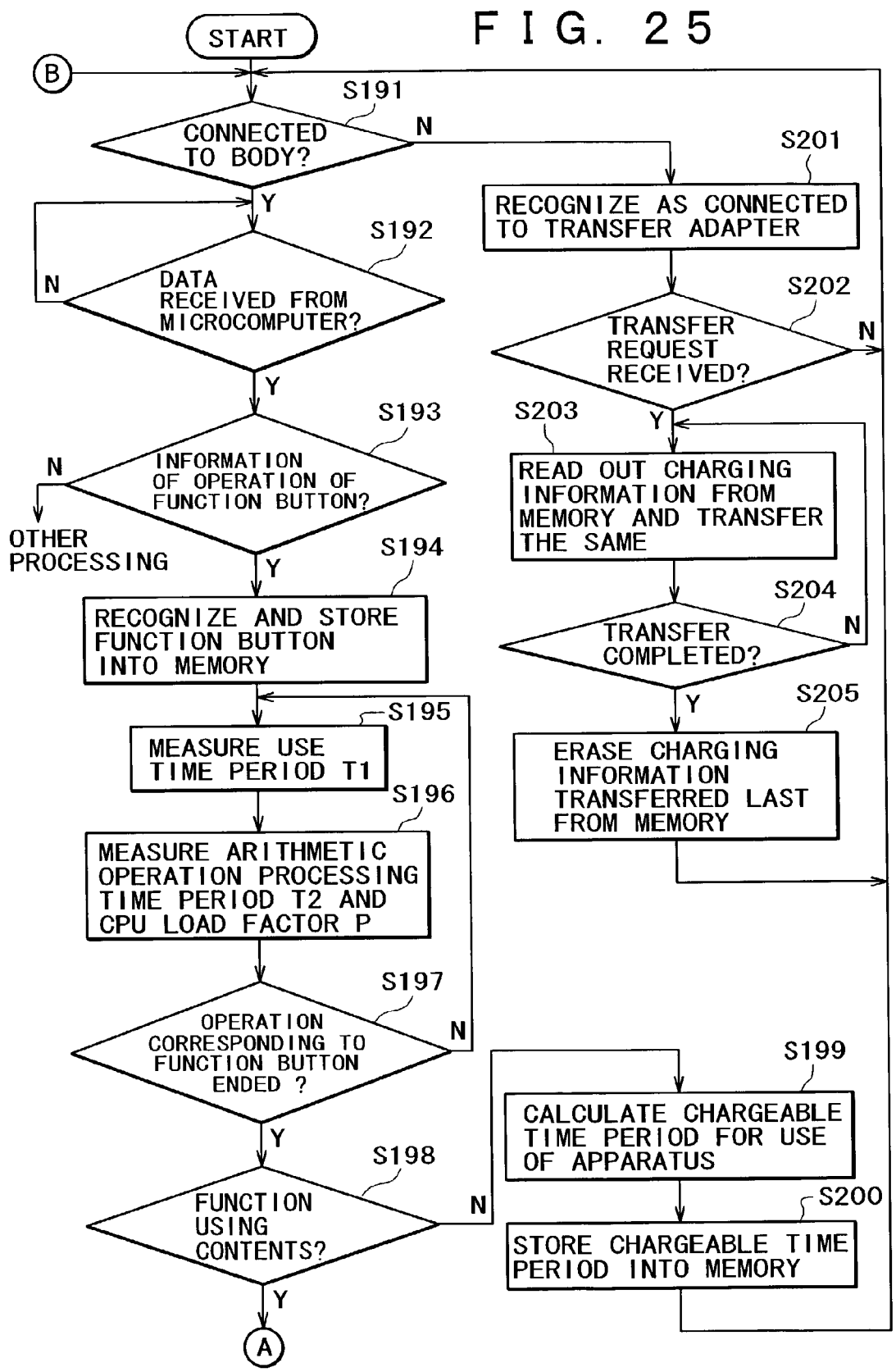
FIGS. 25 and 26 are flow charts illustrating operation of an electronic apparatus used in the third embodiment.
Figure 26:
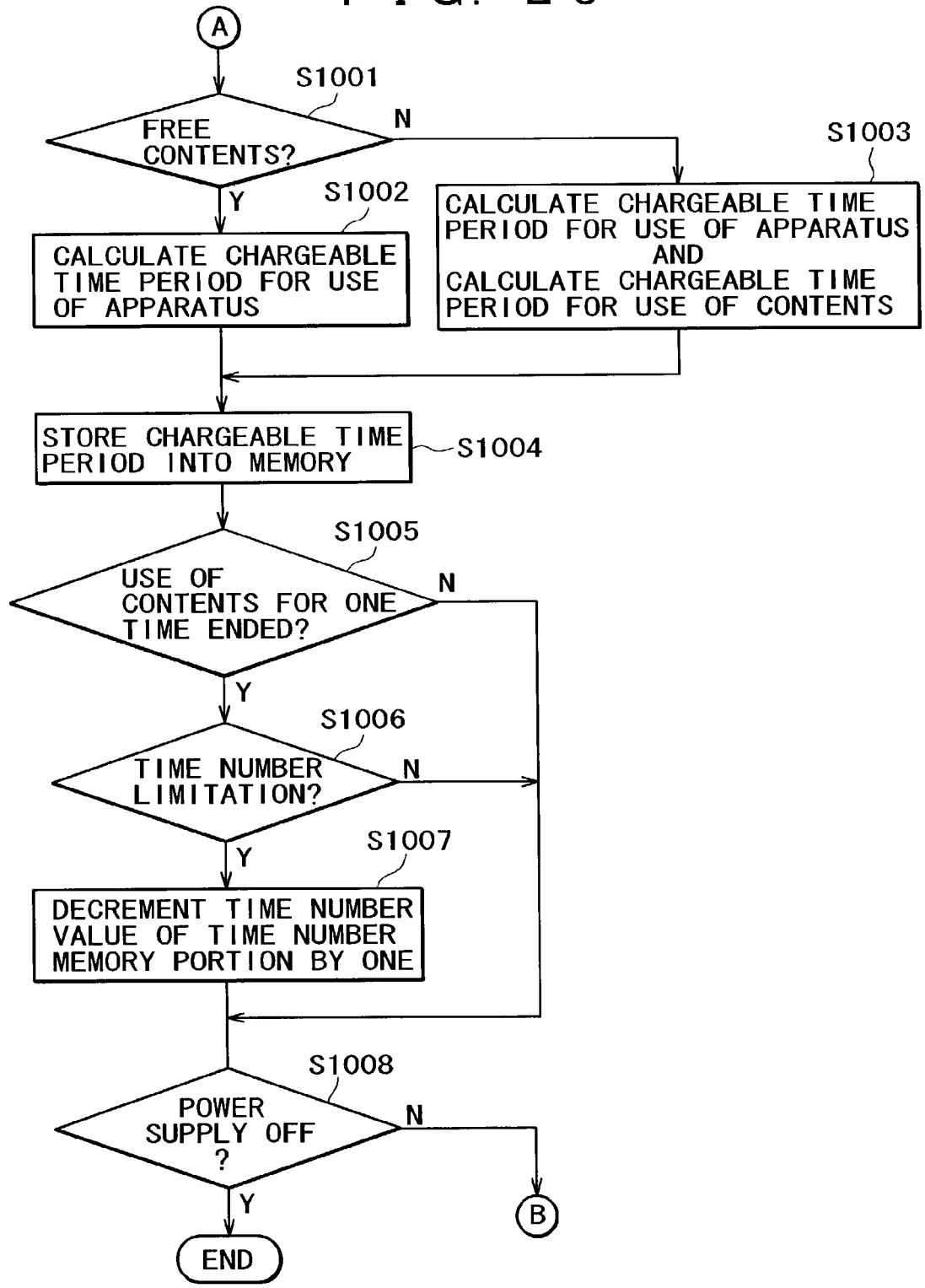

FIGS. 25 and 26 illustrate an example of operation of the charging processing apparatus 50 where the transfer adapter 61 of FIG. 23 is used.

Referring to FIG. 25, the control section 51 of the charging processing apparatus 50 discriminates whether or not the charging processing apparatus 50 is connected to the body of the electronic apparatus 30 (step S191). If the control section 51 recognizes that the charging processing apparatus 50 is connected to the electronic apparatus 30, then it waits for reception of data from the microcomputer section 31 (step S192).

Then, if the control section 51 discriminates that data from the microcomputer section 31 is received, then it discriminates whether or not the data represents information of operation of a function button (step S193). If the data is not information of operation of a function button, then the control section 51 executes a corresponding process. However, if the data is information of operation of a function button, then the control section 51 recognizes what the operated function button is, and stores button type information representative of the recognized function button into the memory 53 (step S194).

Then, the control section 51 measures a time period of execution of the operated function, that is, the use time period T1 of the operated function, using information of the clock section 52 (step S195). Thereafter, the control section 51 measures an arithmetic operation processing time period, which is a time period within which the CPU of the microcomputer section 31 operates continuously, that is, the time period T2 except a sleeping time period, and calculates the load factor P of the CPU of the microcomputer section 31 (step S196). Although the load factor P of the CPU of the microcomputer section 31 is arithmetically operated repetitively during execution of the process illustrated in FIG. 25, it may otherwise be arithmetically operated at a point of time when execution of the process comes to an end.

For the calculation of the load factor P, the expression:

$$P=(T2/T1)\times K$$

is used as described hereinabove. In the expression, K is the apparatus type-dependent coefficient and is a variable coefficient which depends upon a video apparatus, an audio apparatus, a television receiver, a medium type or the like.

The measurement of the use time period T1 at step S195 and the measurement of the arithmetic operation time period T2 and the load factor P at step S196 are repetitively executed until operation of the function being executed comes to an end (step S197). It is to be noted that, although the load factor P of the CPU is arithmetically operated repetitively during execution of the process, it may otherwise be arithmetically operated at a point of time when execution of the process comes to an end.

Then, if it is discriminated at step S197 based on information from the microcomputer section 31 that the operation of the function being executed comes to an end, then the control section 51 of the charging processing apparatus 50 discriminates whether or not the function ended is a function which uses contents data (step S198). If the control section 51 of the charging processing apparatus 50 discriminates that the function ended is not a function which uses contents, then it calculates only the chargeable time period Dt with regard to the use of the electronic apparatus 30 (step S199).

At this time, the control section 51 calculates the chargeable time period Dt with regard to the use of the electronic apparatus 30 using a calculation expression:

chargeable time period $Dt$=use time period $T1$×CPU load factor $P$

Here, since the chargeable time period Dt is calculated by Dt=T2×K from the expression given above, the measurement only of the arithmetic operation time period T2 may be performed without measuring the use time period T1.

Then, the control section 51 of the charging processing apparatus 50 stores information of the chargeable time period Dt of a result of the calculation as part of charging information including a date, a chargeable time period or periods, operation information and so forth into the nonvolatile memory 53 (step S200). Then, the processing returns to step S191.

If it is discriminated at step S198 that the function ended is a function which uses contents data, then the control section 51 discriminates from the stored contents of the nonvolatile memory 53 whether or not the contents used are free contents (step S1001 in FIG. 26).

Then, if the control section 51 discriminates at step S1001 that the used contents are free contents, then it calculates only the chargeable time period Dt with regard to use of the electronic apparatus 30 in a similar manner as at step S199 (step S1002). On the other hand, if the control section 51 discriminates at step S1001 that the used contents are not free contents, then it calculates not only the chargeable time period Dt with regard to use of the electronic apparatus 30 but also the chargeable time period Ct with regard to use of the contents (step S1003).

At this time, the control section 51 of the charging processing section 50 calculates the chargeable time period Ct with regard to the use of the contents in a similar manner as described above using the contents price normalization coefficient W in accordance with the following calculation expression:

chargeable time period $Ct$=use time period $T1$×contents price normalization coefficient $W$ The control section 51 of the charging processing section 50 stores the information of the chargeable time period Dt with regard to the use of the electronic apparatus and the information of the chargeable time period Ct with regard to the use of the contents calculated in such a manner as described above into the nonvolatile memory 53 (step S1004).

Then, the control section 51 discriminates based on the information from the microcomputer section 31 whether or not the end of operation described above is an end of use of the contents for one time (step S1005). If the control section 51 discriminates that the end of operation is not an end of use of the contents for one time, then it discriminates whether or not the contents have some use time number limitation (step S1006). If the contents have some use time number limitation, then the control section 51 decrements the value of the use permission time number for the corresponding contents in the time number memory portion of the nonvolatile memory 53 by one (step S1007).

Then, the control section 51 discriminates whether or not the power supply is off (step S1008). If the power supply is not off, then the processing returns to step S191 of FIG. 25, at which the control section 51 waits for subsequent turning on of a function button. On the other hand, if it is discriminated at step S1008 that the power supply is off, then the control section 51 ends the processing routine. On the other hand, when it is discriminated at step S1005 that the end of operation is not an end of use of the contents for one time or when it is discriminated at step S1006 that the contents have no time number limitation, the processing advances to step S1008, at which the control section 51 discriminates whether or not the power supply is off. Then, if the power supply is not off, then the processing returns to step S191 of FIG. 25, at which the control section 51 waits for subsequent turning on of a function button. However, if the power supply is off at step S1008, then the control section 51 ends the processing routine.

If it is discriminated at step S191 of FIG. 25 that the charging processing apparatus 50 is not connected to the body of the electronic apparatus 30, then the control section 51 recognizes that the charging processing apparatus 50 is connected to the transfer adapter 61 (step S201). Then, the control section 51 discriminates whether or not a data transfer request from the personal computer 40 is received (step S202). If a data transfer request is not received, then the processing returns to step S191.

On the other hand, if the control section 51 discriminates that a data transfer request is received, then it reads out the operation information including the charging information Dt and Ct from the memory 53 and transfers it to the personal computer 40 through the transfer adapter 61 (step S203). Then, when the control section 51 recognizes completion of the data transfer (step S204), it erases the operation information transferred by the last data transfer from the memory 53 (step S205), whereafter the processing returns to step S191.

Fourth Embodiment

In the embodiments described above, time period charging information stored (recorded) on a storage medium or added to downloaded data relates only to contents. However, in the fourth embodiment, the time period charging information includes time period charging information with regard to use not only of contents but also of an electronic apparatus. The time period charging information with regard to use of an electronic apparatus in this instance is effective with regard to use of the electronic apparatus when the contents are used.

With the charging method described, for example, when contents of a trial version or an advertisement are used through reproduction on an electronic apparatus, the use time period unit price of the apparatus can be reduced from an ordinary use time period unit price for the electronic apparatus or can be reduced to zero, and therefore, it is anticipated that use of contents of a trial version or an advertisement can be promoted.

Further, although, in the embodiments described above, the price based on a use time period is paid later, in the present fourth embodiment, the price is paid in advance (by a prepaid method). Thus, in the present fourth embodiment, a prepaid card is used for payment.

[Contents Used on an Electronic Apparatus]

In the present fourth embodiment, on a disk medium as a package medium provided from the time charge management company 21, contents time period charging information representing that contents data written on the disk medium are contents data of use time period chargeable contents with which a substantial use time period is charged is written together with the contents data. The time period charging information includes time period charging information with regard to use of the contents and time period charging information with regard to use of the electronic apparatus.

Figure 27:
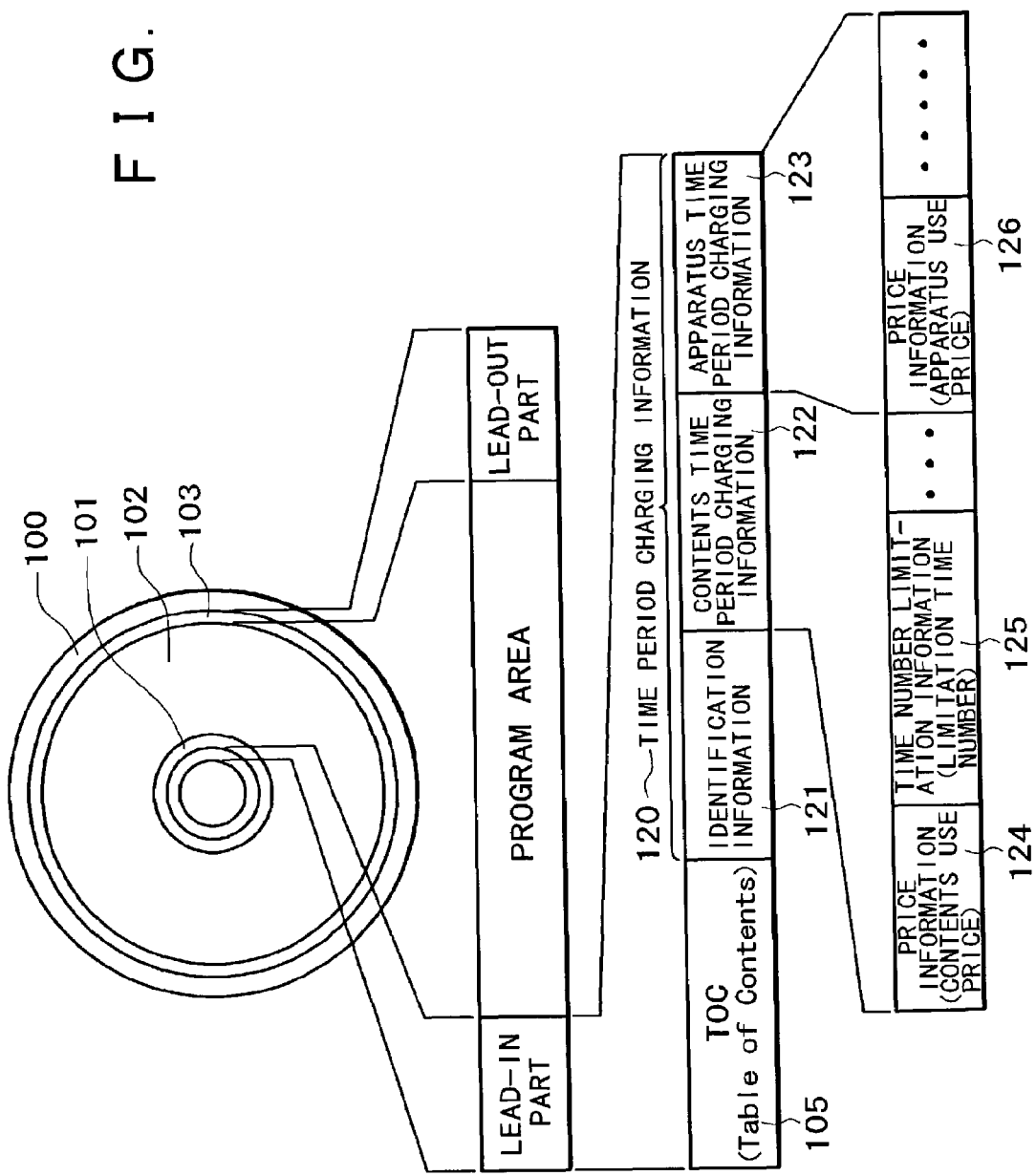
FIG. 27 is a diagrammatic view illustrating an example of contents used in a time period charging system according to a fourth embodiment of the present invention.

FIG. 27 shows an outline of a configuration of data stored (recorded) on a disk medium 100 used in the present embodiment. Referring to FIG. 27, a disk medium 100 of the type shown has a lead-in part 101 provided on the innermost circumference side, a lead-out part 103 provided on the outermost circumference side, and a program area 102 interposed between the lead-in part 101 and the lead-out part 103. Contents data are recorded into the program area 102.

Information called TOC (Table Of Contents) including contents table information of the contents recorded on the disk medium 100 is written in the lead-in part 101. In the fourth embodiment, time period charging information 120 is written in the lead-in part 101 separately from the TOC 105 as seen in FIG. 27. When contents written on the disk medium 100 are not use time period chargeable contents, the time period charging information 120 is not provided in the lead-in part 101.

The time period charging information 120 includes identification information 121 including a medium ID which is an identifier of the disk medium 100 and a contents ID which is an identifier of contents written on the disk medium 100, contents time period charging information 122 and apparatus time period charging information 123.

The contents time period charging information 122 includes price information 124 including a use price (contents use price) of the contents per unit time period, time number limitation information 125 including a number of times of use permission of the contents, and other necessary information. The apparatus time period charging information 123 includes price information 126 including a use price (apparatus use price) of the apparatus per unit time period and other necessary information.

The contents use price of the price information 124 and the apparatus use price of the price information 126 include a free use price (no charge). As the time number limitation information 125, where there is no limitation to the number of times of use, data representative of the infinity is written as the use permission time number. On the other hand, where there is some limitation, data representative of a finite time number value N (N is an integer equal to or greater than 0 (N □ 0)) is written as the time number limitation information 125.

The electronic apparatus 30 reads the TOC 105 and the time period charging information 120 of the lead-in part 101 in prior to use of contents data. However, if the lead-in part 101 does not include the time period charging information 120, then the electronic apparatus 30 interprets that an equivalent has been paid for the proprietary right of contents written on the disk medium loaded and does not perform a process for charging with regard to use of the contents.

On the other hand, if the time period charging information 120 is read out from the disk medium 100, then the electronic apparatus 30 analyzes contents of the information, and performs a process for charging based on the price information 124 and 126 and permits use of the contents by a number of times equal to a use permission time number in accordance with the time number limitation information 109.

It is to be noted that the time period charging information 120 may otherwise be written not separately from the TOC 105 but as information included in the TOC 105. Further, the time period charging information 120 may otherwise be written in the lead-out part 103. Furthermore, where the disk medium 100 is of the type in which an IC memory is embedded, the contents time period charging information may be written into the IC memory. On other hand, where the disk medium is accommodated in a diskette or a cartridge in which a memory is provided, the time period charging information 120 may be written into the memory.

It is to be noted that the time period charging information may include a flag of 1 bit representing whether or not the contents are time period chargeable contents. In this instance, where the contents are not time period chargeable contents, dummy data may be written as the price information 124 or 126 or the time number limitation information 125 or alternatively no such price information or time number limitation information may be written.

Figure 28:
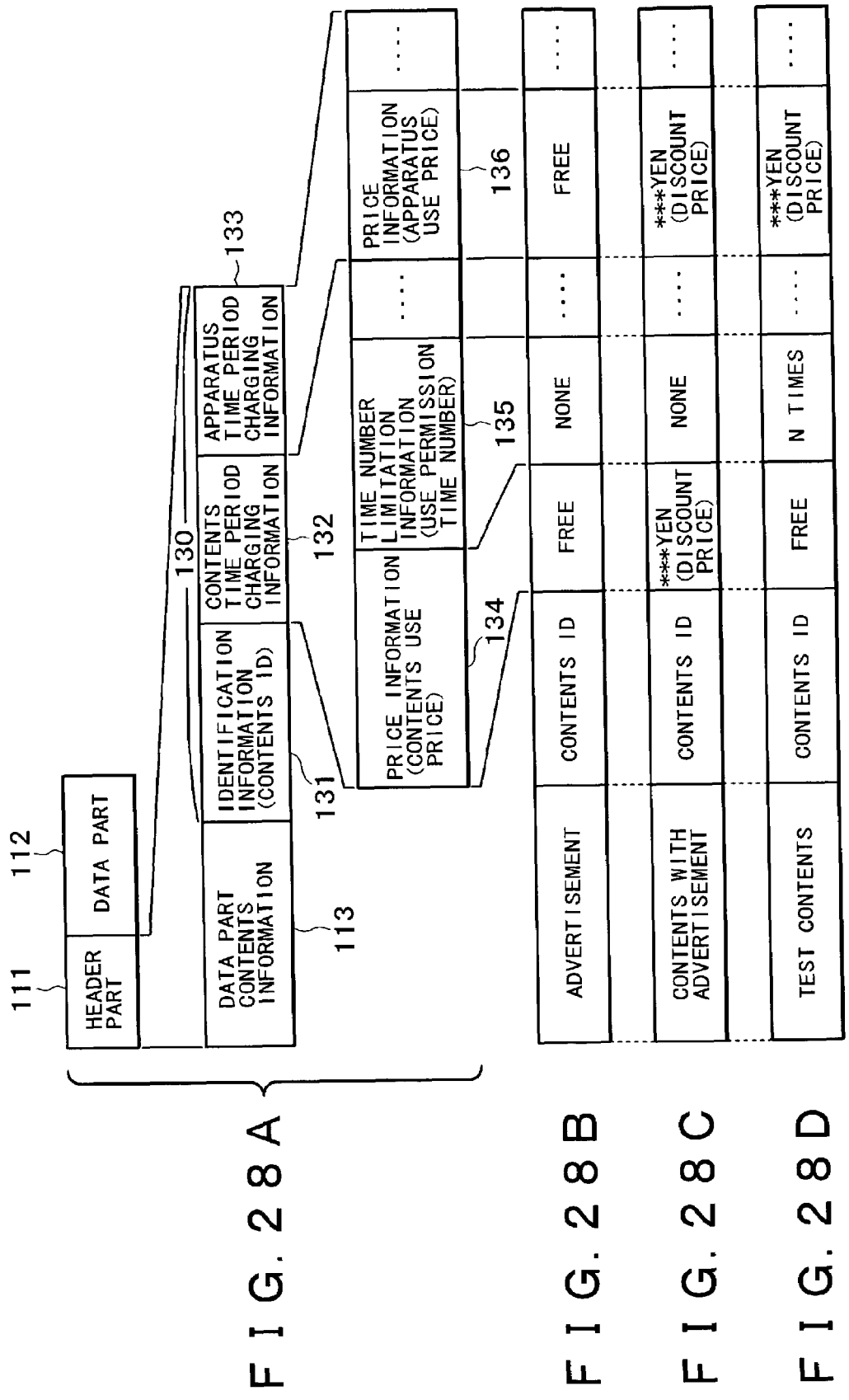
FIGS. 28A to 28D are diagrammatic views illustrating another example of contents used in the time period charging system of the fourth embodiment of the present invention.

FIGS. 28A to 28D show a structure of downloaded data in the fourth embodiment. Referring first to FIG. 28A, the downloaded data include a header part 111 and a data part 112. In the data part 112, contents data not only of tune information and image information but also of text information and a program are placed.

The header part 111 includes data part contents information 113 representative of what contents are placed in the data part 112, and time period charging information 130 where the contents of the data part 112 are use time period chargeable contents. If the contents placed in the data part 112 are not use time period chargeable contents, then the time period charging information 130 is not provided in the header part 111.

The time period charging information 130 includes identification information 131 including an identifier (contents ID) of the contents written in the data part 112, contents time period charging information 132 and apparatus time period charging information 133.

The contents time period charging information 132 includes price information 134 including a use price (contents use price) of the contents per unit time period, time number limitation information 135 including a use permission time number of the contents, and so forth. The apparatus time period charging information 133 includes price information 136 including a use price (apparatus use price) of the apparatus per unit time period, and so forth.

The contents use price of the price information 134 and the apparatus use price of the price information 136 include a free use price (no charge). Where there is no limitation to the number of times of use, data representative of the infinity is written as the time number limitation information 135. On the other hand, where there is some limitation, data representative of a finite time number value N (N is an integer equal to or greater than 0 (N □ 0)) is written as the time number limitation information 135.

Also where the downloaded contents are used through reproduction or the like, the time period charging information 130 is read out prior to the use of the contents and a charging process similar to that for a disk medium described above is performed depending upon whether or not the contents are use time period chargeable contents in a similar manner as in the case of a package medium such as a disk medium described hereinabove.

FIGS. 28B to 28D illustrates different examples of the downloaded data in the fourth embodiment.

In the example shown in FIG. 28B, the data part contents information 113 is contents only of an advertisement, and the contents use price 134 indicates no charge and the time number limitation information 135 indicates no time number limitation while the apparatus use price 136 indicates no charge as well. Since contents of an advertisement are preferably utilized by a number of users as great as possible, where the use of the contents and the apparatus is free as in the present example, the object can be achieved effectively. Besides, since a price can be collected as advertising rates from an advertisement providing party, even where the use is free as described above, this is profitable to the time charge management company 21.

In the example shown in FIG. 28C, the data part contents information 113 is contents with an advertisement, and the contents use price 134 indicates a discounted price and the time number limitation information 135 indicates no time number limitation while the apparatus use price 136 indicates a discounted price. Since contents with an advertisement allow collection of a price as advertising rates from an advertisement providing party, discounted prices can be applied to the contents use price and the apparatus use price as in the present example.

In the example shown in FIG. 28D, the data part contents information 113 is trial contents. In the example shown, the contents use price 134 indicates no charge for a period for trial use, that is, for use up to the use permission time number N, and the apparatus use price 136 indicates a discounted price for use within the period up to the use permission time number N. The apparatus use price 136 may otherwise be zero within the trial period up to the use permission time number N.

Figure 29:
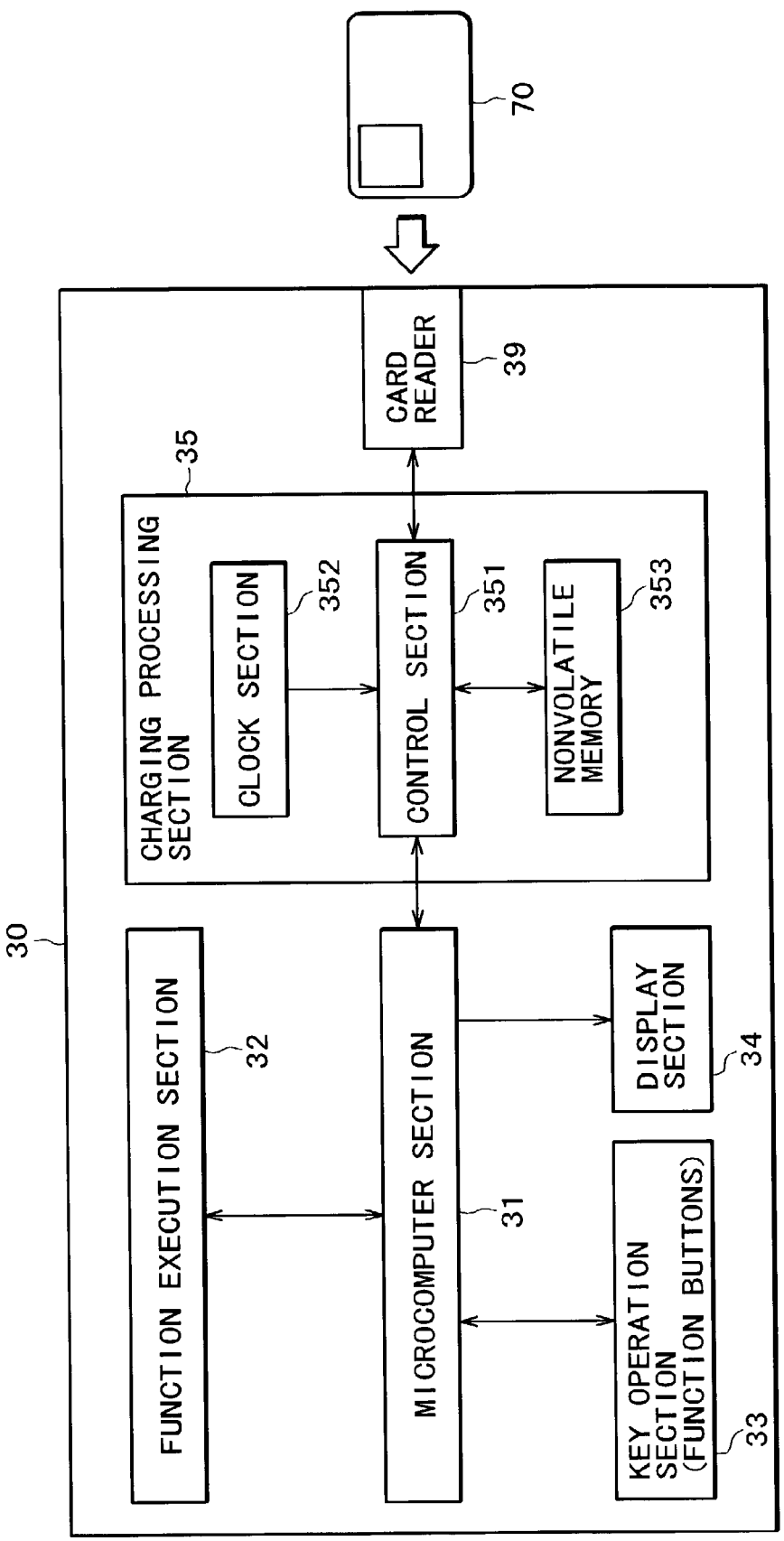
FIG. 29 is a block diagram showing an example of a configuration of an electronic apparatus used in the time period charging system of the fourth embodiment of the present invention.

FIG. 29 shows an example of a configuration of the electronic apparatus 30 in the fourth embodiment. In the fourth embodiment, the electronic apparatus 30 includes a card reader 39 for reading stored information of a prepaid card 70 in place of the interface section 36 of the electronic apparatus 30 in the first embodiment described hereinabove with reference to FIG. 3 or the radio communication section 37 of the electronic apparatus 30 in the second embodiment described hereinabove with reference to FIG. 19.

The charging processing section 35 includes a control section 351, a clock section 352 and a nonvolatile memory 353 and has a similar hardware configuration to that in the first or second embodiment. The memory 353 may be provided externally of the charging processing section 35 similarly as in the first or second embodiment.

However, the control section 351 has a software configuration different from that in the first or second embodiment. In particular, although the software regarding the measurement of a use time period and the measurement of a chargeable time period is common, the software configuration of the control section 351 in the fourth embodiment is different in that the electronic apparatus 30 executes a settlement process based on charging information stored in the memory 353 and stored information of the prepaid card 70.

[Contents Using Operation with an Electronic Apparatus]

Figure 30:
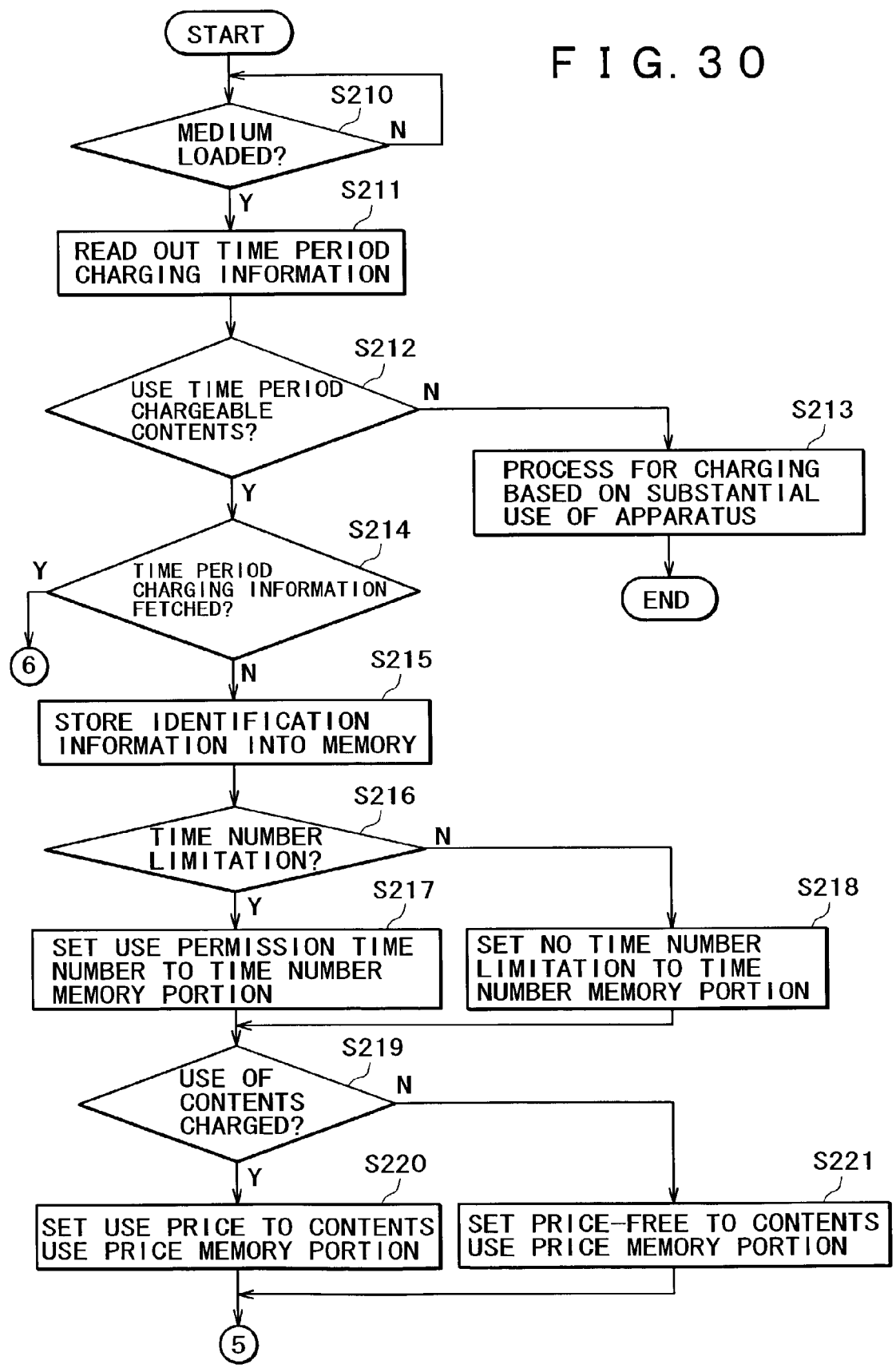
FIGS. 30, 31 and 32 are flow charts illustrating operation of the electronic apparatus used in the fourth embodiment.
Figure 31:
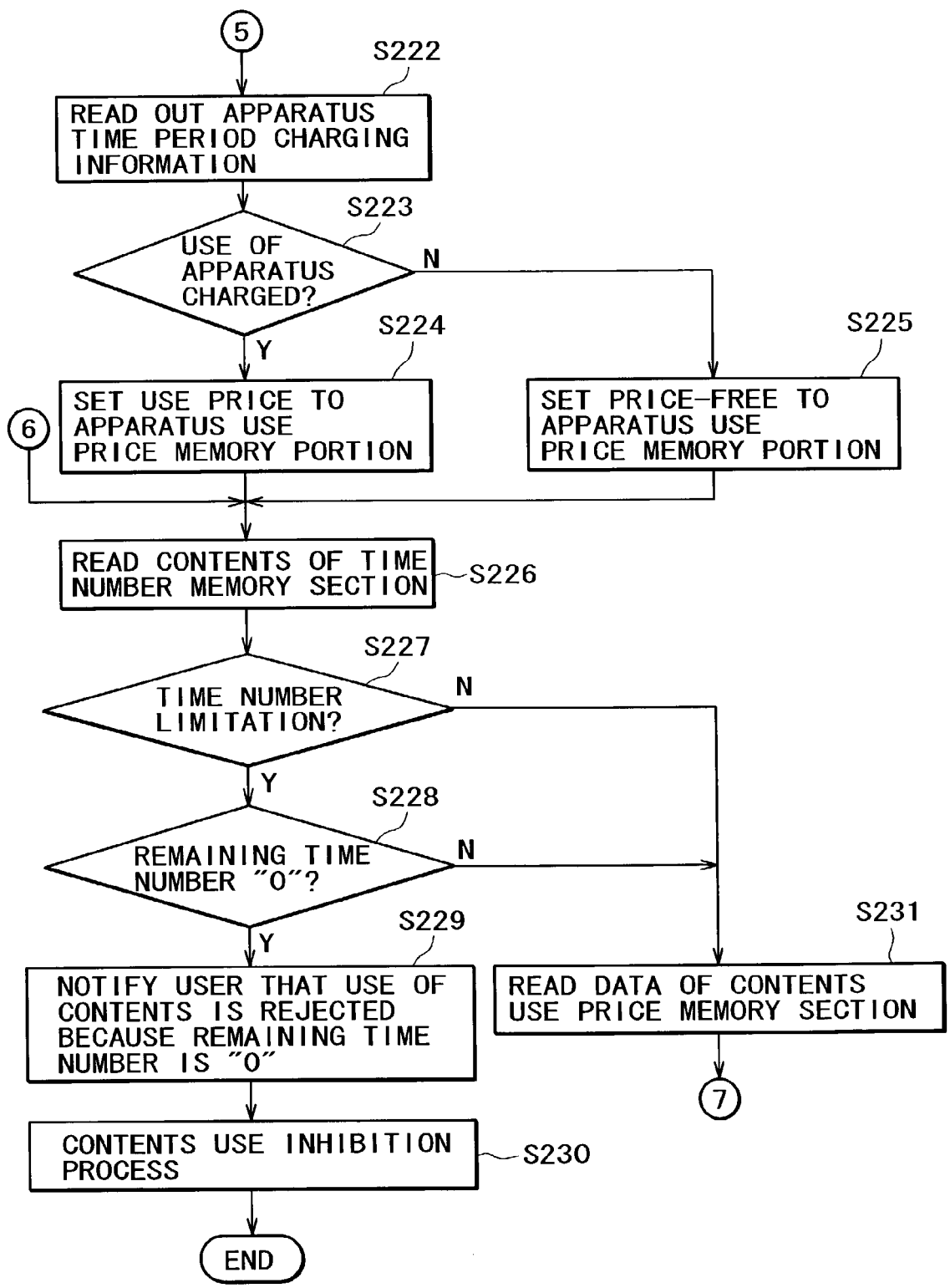
Figure 32:
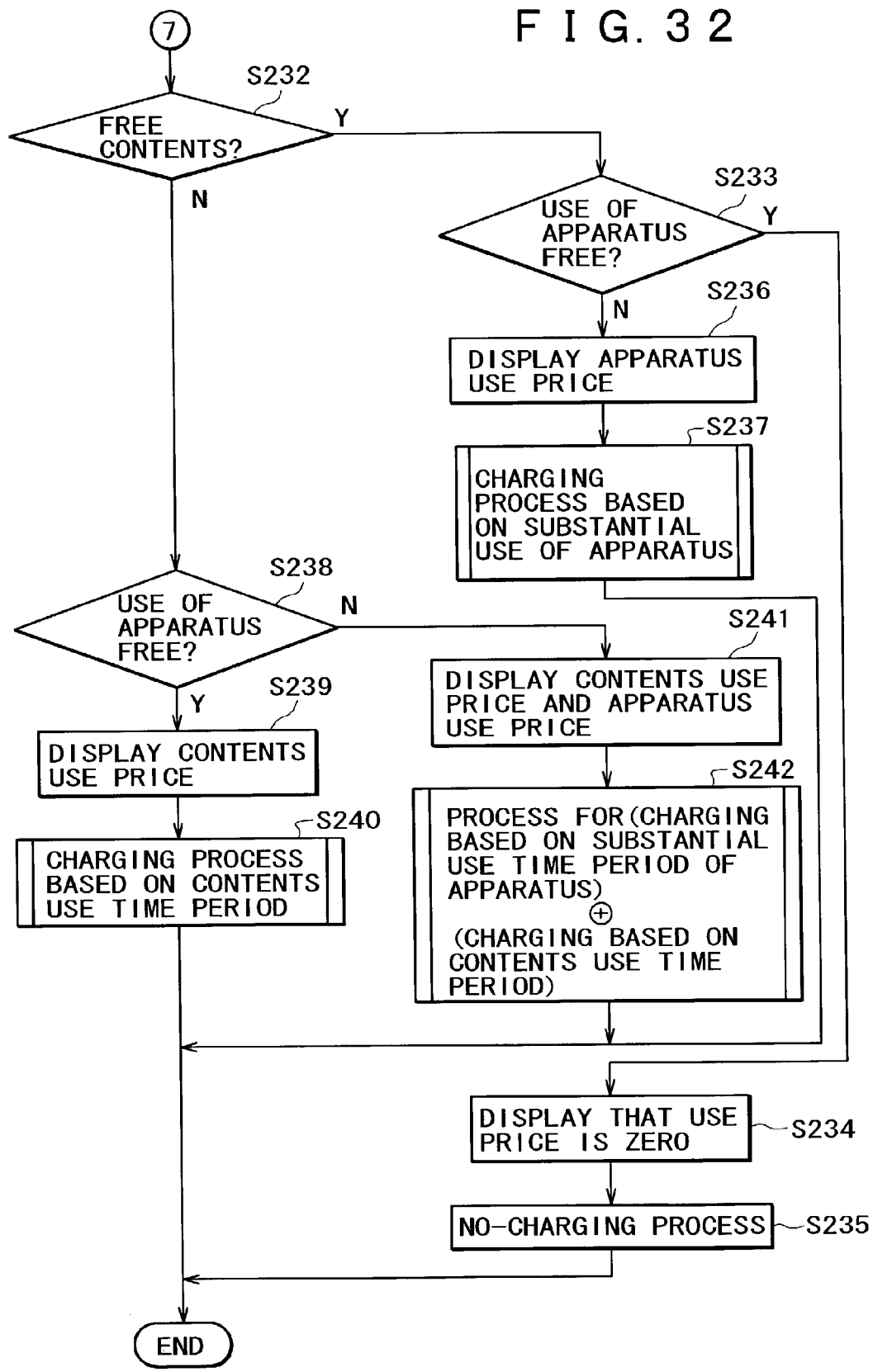

FIGS. 30, 31 and 32 illustrate operation of the electronic apparatus 30 in the fourth embodiment.

After the power supply to the electronic apparatus 30 is switched on, the electronic apparatus 30 starts its process illustrated in FIGS. 30 to 32 and first waits that a disk medium is loaded into it (step S210). After the microcomputer section 31 confirms that a disk medium is loaded, it reads out the TOC 105 and the time period charging information 120 of the lead-in part 101 of the disk medium (step S211).

Then, the microcomputer section 31 discriminates based on presence or absence of the time period charging information 120 whether or not contents of the disk medium are use time period chargeable contents (step S212). If the microcomputer section 31 discriminates that the contents are not use time period chargeable contents, then it does not perform a process for charging based on substantial use of the contents but performs only a process for charging based on substantial use of the electronic apparatus 30 (step S213), whereafter it ends the processing routine.

On the other hand, if the microcomputer section 31 discriminates at step S212 that the contents of the disk medium are use time period chargeable contents, then it refers to the identification information 121 included in the time period charging information 120 read out at step S211 and identification information of disk media loaded in the electronic apparatus 30 in the past stored in the nonvolatile memory 353 of the charging processing section 35 to discriminate whether or not the pertaining disk medium has been loaded in the electronic apparatus 30 in the past and the time period charging information 120 of the disk medium has been fetched already (step S214).

If the microcomputer section 31 discriminates at step S214 that the pertaining disk medium is loaded for the first time in the electronic apparatus 30 and the time period charging information 120 of the disk medium has not been fetched as yet, then it stores the identification information 121 of the disk medium into the nonvolatile memory 353 of the charging processing section 35 (step S215) and interprets detailed information of the contents time period charging information 122 of the time period charging information 120 fetched at step S211 to discriminate whether or not the use permission time number indicated by the time number limitation information indicates some limitation (step S216).

Then, if the microcomputer section 31 discriminates at step S216 that the use permission time number indicates some limitation, that is, the use permission time number is not the infinity, then it stores the value N of the use permission time number into a time number memory portion, which is part of the memory area of the nonvolatile memory 353 of the charging processing section 35, as use permission time number of the contents of the medium indicated by the stored identification information in a coordinated relationship with the identification information 121 (step S217).

On the other hand, if the microcomputer section 31 discriminates at step S216 that the use permission time number is the infinity and indicates no use time number limitation, then it stores information representative of "no time number limitation" into the time number memory portion of the nonvolatile memory 353 in a coordinated relationship with the identification information 121 (step S218).

After the writing of the information relating to the use permission time number into the time number memory portion of the nonvolatile memory 353 at step S217 or S218, the microcomputer section 31 checks the price information 124 to discriminate whether or not use of the contents should be charged (step S219). If use of the contents should be charged, then the microcomputer section 31 writes the use price of the contents per unit time period into a contents use price memory portion, which is part of the memory area of the nonvolatile memory 353 of the charging processing section 35, in a coordinated relationship with the identification information 121 (step S220). On the other hand, if use of the contents should not be charged at step S219, then the microcomputer section 31 stores information representative of "no charge" into the contents use price memory portion of the nonvolatile memory 353 in a coordinated relationship to the identification information 121 (step S221).

Then, the microcomputer section 31 reads out the apparatus time period charging information 123 of the time period charging information 120 fetched at step S211 (step S222 of FIG. 31) and checks the price information 126 to discriminate whether or not use of the apparatus should be charged (step S223). If use of the apparatus should be charged, then the microcomputer section 31 writes the use price of the apparatus per unit time period into an apparatus use price memory portion, which is part of the memory area of the nonvolatile memory 353 of the charging processing section 35, in a coordinated relationship with the identification information 121 (step S224). On the other hand, if use of the apparatus should not be charged at step S223, then the microcomputer section 31 stores information representative of "no charge" into the apparatus use price memory portion of the nonvolatile memory 353 in a coordinated relationship to the identification information 121 (step S225).

After the writing of information regarding the apparatus use price into the apparatus use price memory portion of the nonvolatile memory 353 at step S224 or S225 comes to an end, the microcomputer section 31 reads out contents of the time number memory portion represented by the identification information 121 and the contents of the disk medium (step S226). Also when it is discriminated at step S214 that the time period charging information 120 has been fetched already, the processing advances to step S226, at which contents regarding the disk medium represented by the identification information 121 and the contents of the disk medium are read out from the time number memory portion of the nonvolatile memory 353 similarly.

Then, the microcomputer section 31 discriminates whether or not there is some use number limitation (step S227). If there is some use number limitation, then the microcomputer section 31 confirms whether or not the remaining number of the use permission time number is "0" (step S228). If the remaining number of the use permission time number is "0", then the microcomputer section 31 controls the display section 34 to display on the screen a message that "use of contents is not permitted because the remaining number of the use permission time number is '0'" to notify the user of the fact (step S229). Then, the microcomputer section 31 disables the function or functions regarding use of contents from among a plurality of functions of the function execution section 32 (step S230), thereby ending the processing routine.

When it is discriminated at step S227 that there is no use time number limitation or when it is discriminated at step S228 that the remaining number of the use permission time number is not "0", the microcomputer section 31 reads out data stored in of the contents use price memory portion of the nonvolatile memory 353 in which the disk medium represented by the identification information 121 and contents of the disk medium are stored (step S231).

Then, the microcomputer section 31 discriminates whether or not the contents use price is zero (step S232 of FIG. 32). If the contents use price is zero, then the microcomputer section 31 reads the stored contents of the apparatus use price memory portion of the nonvolatile memory 353 regarding the disk medium represented by the identification information 121 and contents of the disk medium and checks whether or not the use price of the apparatus is zero (step S233). Then, if it is discriminated that the use price of the apparatus is zero, then the microcomputer section 31 controls the display section 34 to display that the use prices of the contents and the apparatus are zero (step S234) and then performs a no-charging process (step S235), whereafter it ends the processing routine.

On the other hand, if it is discriminated at step S233 that the use price of the apparatus is not zero, then the microcomputer section 31 controls the display section 34 to display that the contents are free contents and display the apparatus use price stored in the apparatus use price memory portion of the non volatile memory 353 thereby to notify the user that, although the contents are free, the use of the apparatus are chargeable (step S236). Then, the microcomputer section 31 performs a process for charging based only on the substantial use time period of the electronic apparatus 30 (step S237), whereafter it ends the processing routine.

On the other hand, if it is discriminated at step S232 that the contents use price is not "0", then the microcomputer section 31 reads the stored contents of the apparatus use price memory portion of the nonvolatile memory 353 regarding the disk medium represented by the identification information 121 and contents of the disk medium and checks whether or not the use price of the apparatus is zero (step S238).

Then, if it is discriminated that the use price of the apparatus is zero, then the microcomputer section 31 controls the display section 34 to display the use price of the contents on the screen and display that the use price of the apparatus is zero thereby to notify the user that, although the contents are chargeable contents, the use price of the apparatus is zero (step S239) and then performs a process for charging based on the use time period of the contents (step S240), whereafter it ends the processing routine.

On the other hand, if it is discriminated at step S238 that use of the apparatus is chargeable, then the microcomputer section 31 controls the display section 34 to display the contents use price and the apparatus use price on the screen thereby to notify the user of the fact that the contents are chargeable contents and of the use price of the apparatus (step S241). Then, the microcomputer section 31 performs a process for charging based on the substantial use time period of the electronic apparatus 30 and a process for charging based on the use time period of the contents (step S242), whereafter it ends the processing routine.

The processes at steps S213, S237, S240 and S242 are executed through cooperation of the control section 351 of the charging processing section 35 and the microcomputer section 31. Detailed processing operations at steps S213, S237, S240 and S242 mentioned are described below with reference to FIGS. 33 and 34.

In the fourth embodiment, the prepaid card 70 has information of a usable time period written in advance therein, and the useable time period is re-written into a time period decremented in accordance with a use time period of the electronic apparatus 30 of the user by the charging processing section 35 of the electronic apparatus 30. Accordingly, the prepaid card 70 has a remaining time period of the usable time period stored therein.

Figure 33:
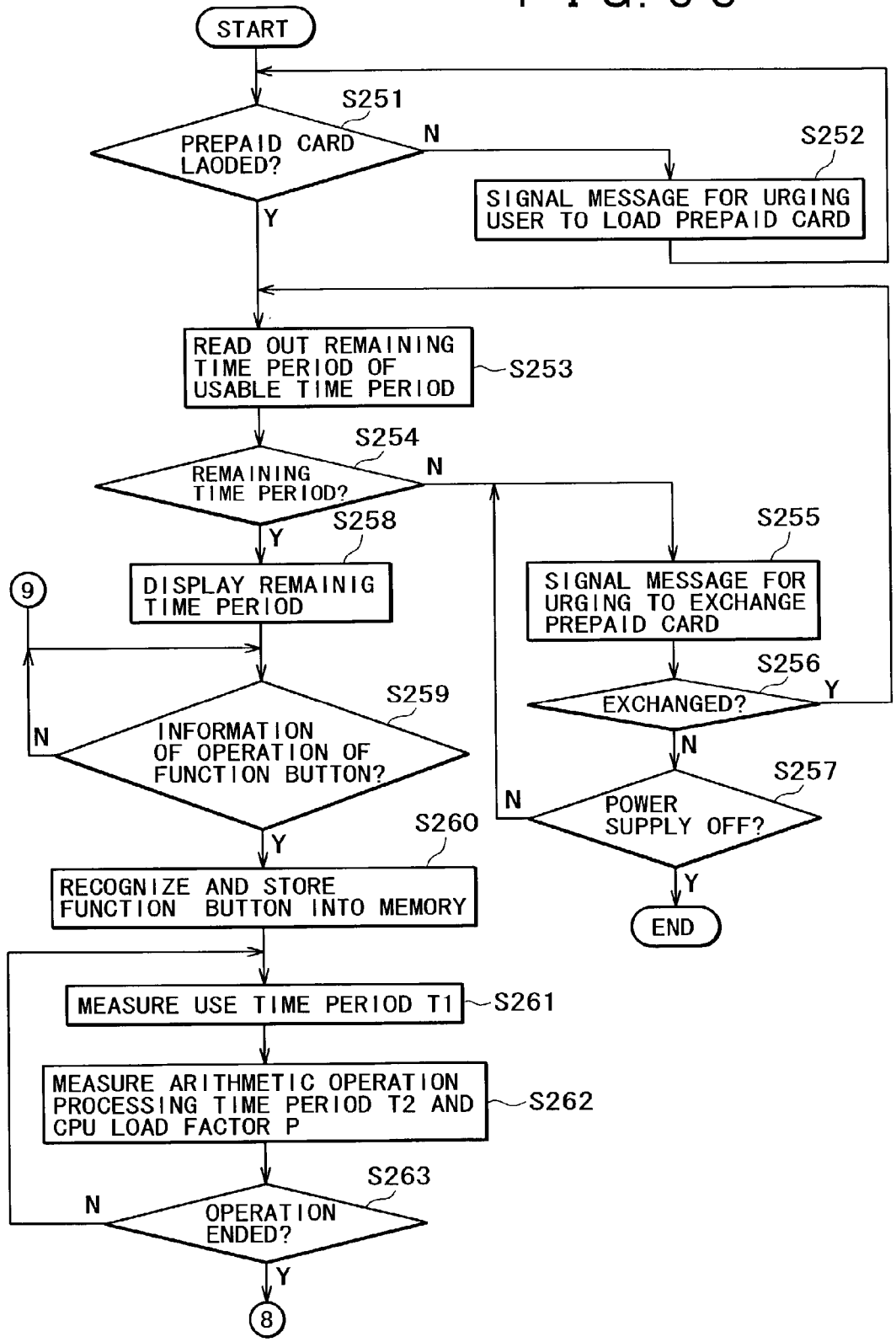
FIGS. 33 and 34 are flow charts illustrating a time period charging process of the electronic apparatus in the fourth embodiment.

Referring first to FIG. 33, the control section 351 first discriminates whether or not a prepaid card 70 is loaded in the electronic apparatus 30 (step S251). If no prepaid card 70 is loaded in the electronic apparatus 30, then the control section 351 displays a message for urging the user to load its prepaid card 70 on the screen of the display section 34 through the microcomputer section 31 (step S252).

Then, if the control section 351 discriminates that a prepaid card 70 is loaded in the electronic apparatus 30, then it reads out the remaining time period of the usable time period from the prepaid card 70 (step S253) and confirms whether or not the remaining time period is zero (step S254). If the remaining time period is zero, then the control section 351 displays a message "The remaining time period of the prepaid card is zero and therefore must be replaced." on the screen of the display section 34 through the microcomputer section 31 (step S255).

Then, the control section 351 waits for replacement of the prepaid card 70 (step S256). If the prepaid card 70 is not replaced, then the control section 351 discriminates whether or not the power supply to the electronic apparatus 30 is off (step S257). If the power supply is off, then the control section 351 ends its processing. On the other hand, if the power supply is not off, then the processing returns to step S255, at which the control section 351 displays the message for urging the user to replace the prepaid card 70 on the screen of the display section 34.

On the other hand, if the control section 351 confirms at step S256 that the prepaid card 70 is replaced, then it reads out the remaining time period of the usable time period of the newly loaded prepaid card 70 (step S253) and then confirms whether or not the remaining time period is zero (step S254). If the remaining time period is not zero, then the control section 351 displays the remaining time period on the screen of the display section 34 through the microcomputer section 31 (step S258).

Then, the control section 351 waits for reception of information of a function button from the microcomputer section 31 (step S259). If information of operation of a function button is received, then the control section 351 discriminates what the operated function button is and stores the button type information into the memory 353 (step S260).

Then, the control section 351 measures a time period of execution of the operated function, that is, the use time period T1, using information of the clock section 352 (step S261). Thereafter, the control section 351 measures a time period of arithmetic operation processing which is a time period within which the CPU of the microcomputer section 31 continuously operates, that is, the time period T2 except a time period of sleeping, and calculates the load factor P of the CPU of the microcomputer section 31 (step S262).

For the calculation of the load factor P, the expression:

$$P=(T2/T1) \times K$$

is used as described hereinabove. In the expression, K is the apparatus type-dependent coefficient and is a variable coefficient which depends upon a video apparatus, audio apparatus, a television receiver, a medium type or the like.

The measurement of the use time period T1 at step S261 and the measurement of the arithmetic operation processing time period T2 and the CPU load factor P at step S262 are repetitively executed until operation of the function being executed comes to an end (step S263). Although the load factor P of the CPU of the microcomputer section 31 is arithmetically operated repetitively during execution of the process illustrated in FIG. 33, it may otherwise be arithmetically operated at a point of time when execution of the process comes to an end.

Figure 34:
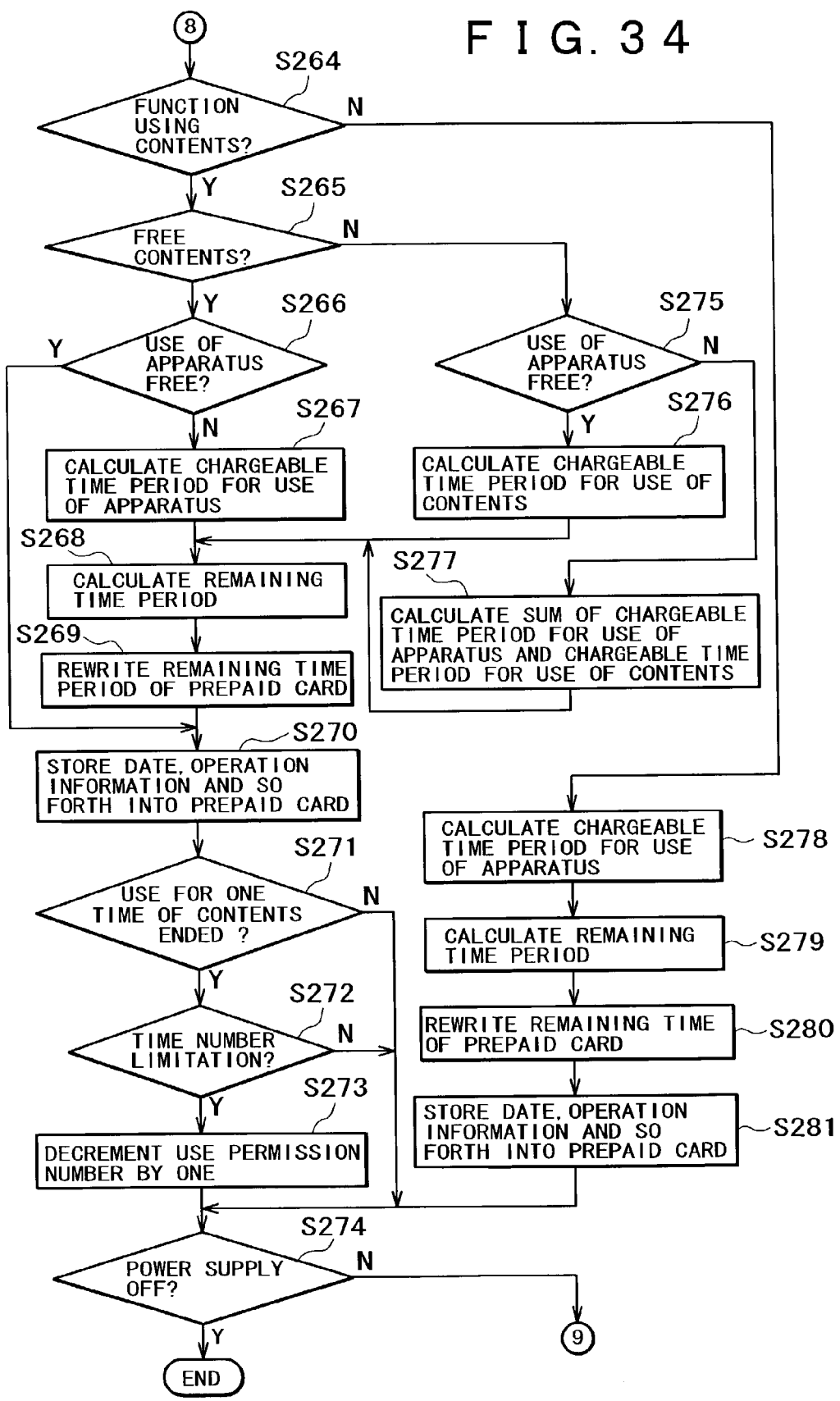

Then, if it is discriminated at step S263 based on the information from the microcomputer section 31 that the operation of the function being executed comes to an end, then the control section 351 of the charging processing section 35 discriminates whether or not the function ended is a function which uses the contents data (step S264 of FIG. 34). Then, if the control section 35 discriminates that the function ended is a function which does not use the contents, then it calculates only the chargeable time period Dt with regard to the use of the electronic apparatus 30 (step S278).

At this time, the control section 351 of the charging processing section 35 calculates the chargeable time period Dt with regard to the use of the electronic apparatus 30 using a calculation expression:

chargeable time period $Dt$=use time period $T1 \times$CPU load factor $P$

Then, the control section 351 of the charging processing apparatus 35 calculates the remaining time period of the usable time period of the prepaid card 70 using the information of the chargeable time period Dt of a result of the calculation (step S279) and rewrites the remaining time period of the prepaid card 70 with the remaining time period of the result of the calculation (step S280). Further, the control section 351 writes also information of the date and operation information and so forth into the prepaid card 70 (step S281). Such information is read out from the prepaid card 70 by the time charge management company 21 and used as a material for a marketing research or the like.

Then, the control section 351 of the charging processing section 35 discriminates whether or not the power supply is off (step S274). If the power supply is not off, then the processing returns to step S259 of FIG. 33, at which the control section 351 waits for subsequent turning on of a function button. However, if the power supply is off, then the processing routine is ended.

On the other hand, if the control section 351 discriminates at step S264 that the function ended is a function which uses the contents data, then it discriminates from the stored contents of the nonvolatile memory 353 whether or not the contents used are free contents (step S265).

Then, if the control section 351 discriminates at step S265 that the used contents are free contents, then it discriminates from the stored contents of the nonvolatile memory 353 whether or not the use price of the apparatus is zero (step S266). Then, if it is discriminated that the use price of the apparatus is not zero, then the control section 351 calculates only the chargeable time period Dt with regard to the use of the electronic apparatus 30 in a similar manner as at step S278 (step S267).

Then, the control section 351 calculates the remaining time of the usable time period of the prepaid card 70 using the information of the chargeable time period Dt, which is a result of the calculation (step S268) and rewrites the remaining time of the prepaid card 70 with the remaining time period of the result of the calculation (step S269). Further, the control section 351 writes also information of the date and operation information and so forth into the prepaid card 70 (step S270).

If it is discriminated at step S266 that the use of the apparatus is free, then the processing skips to step S270, at which the control section 351 writes the information of the date, operation information and so forth into the prepaid card 70 without performing a rewriting process of the remaining time period of the prepaid card 70 for charging.

On the other hand, if it is discriminated at step S265 that the use price of the used contents is not zero, then the control section 351 discriminates from the stored contents of the nonvolatile memory 353 whether or not the use price of the apparatus is zero (step S275). Then, if it is discriminated that the use price of the apparatus is zero, then the control section 351 calculates the chargeable time period Ct with regard to the use of the contents (step S276).

At this time, the control section 351 of the charging processing section 35 calculates the chargeable time period Ct with regard to the use of the contents using the contents price normalization coefficient W in accordance with the following calculation expression:

chargeable time period $Ct$=use time period $T1 \times$contents price normalization coefficient $W$ On the other hand, if it is discriminated at step S275 that the use price of the apparatus is not zero, then the control section 351 calculates the chargeable time period Dt with regard to the use of the electronic apparatus 30 and the chargeable time period Ct with regard to the use of the contents and calculates the sum of the two chargeable time periods (step S277). Then, the processing advances to step S268, at which the control section 351 calculates the remaining time period of the usable time period of the prepaid card 70 using the information of the chargeable time period Ct of a result of the calculation and rewrites the remaining time of the prepaid card 70 with the remaining time period of a result of the calculation (step S269). Also information of the date and operation information and so forth is written into the prepaid card 70 (step S270).

When the remaining time period process regarding the use permission time period of the prepaid card 70 and the writing processing of information such as the date and the operation information come to an end in such a manner as described above after it is discriminated at step S264 that the function being executed is a function which uses the contents, the control section 351 subsequently discriminates based on the information from the microcomputer section 31 whether or not the end of processing described above is an end of use of the contents for one time (step S271). If the control section 351 discriminates that the end of processing is an end of use of the contents for one time, then it discriminates whether or not the corresponding contents has the use time number limitation (step S272). If the control section 351 discriminates that the contents has the use time number limitation, then it decrements the value of the use permission time number regarding the corresponding contents in the time number memory portion of the nonvolatile memory 353 by one (step S273).

Then, the microcomputer section 31 discriminates whether or not the power supply is off (step S274). If the power supply is not off, then the processing returns to step S259 of FIG. 33, at which the microcomputer section 31 waits for subsequent turning on of a function button. On the other hand, if it is discriminated at step S274 that the power supply is off, then the microcomputer section 31 ends the processing routine.

It is to be noted that the prepaid card 70 may be sold not only by the providing company which provides the electronic apparatus or the time charge management company 21 but also by such stores as a convenience store. In the latter case, in order to allow a prepaid card which stores valuable materials such as operation information and has the remaining time period of zero to be returned to the dealer, it is desirable to construct a system for presenting a use time period service card or data to a user who returns the prepaid card.

Fifth Embodiment

While the fourth embodiment described above involves settlement by an electronic apparatus using a prepaid card, the fifth embodiment uses not a prepaid card but an IC bankcard. The electronic apparatus has a hardware configuration similar to that in the fourth embodiment, and therefore, overlapping description of the hardware configuration of the electronic apparatus is omitted herein to avoid redundancy.

Thus, in the fifth embodiment, not the prepayment but the deferred payment is used. Therefore, for example, the flow charts of FIGS. 5 and 6 in the first embodiment described hereinabove are modified such that, as processing after processing at step S34, S58 or S60, the charging processing section 35 calculates a chargeable price corresponding to the chargeable time period, and the chargeable price is paid from an IC bankcard. Also operation information and so forth are written into the IC bankcard.

In the fifth embodiment, the operation information and so forth written in the IC bankcard are transferred from the bank to the time charge management company 21. Further, since the operation information and so forth are stored also in the memory 353 of the electronic apparatus 30, they may be transferred from the electronic apparatus 30 to the time charge management company 21.

Sixth Embodiment

While the fourth embodiment described above uses the prepayment system using a prepaid card, charging of the prepayment system may be performed by the electronic apparatus 30 using the nonvolatile memory 353 of the charging processing section 35 without using a prepaid card.

In this instance, the charging processing section may be the charging processing section 35 built in the electronic apparatus 30 as in the first embodiment or may have a configuration of the charging processing apparatus 50 of a loadable type as in the fourth embodiment.

The electronic apparatus in the sixth embodiment is configured such that it can be connected to the charging management system 210 of the time charge management company 21 through the personal computer 40 and a digital communication network or an analog communication network similarly as in the first embodiment.

Figure 35:
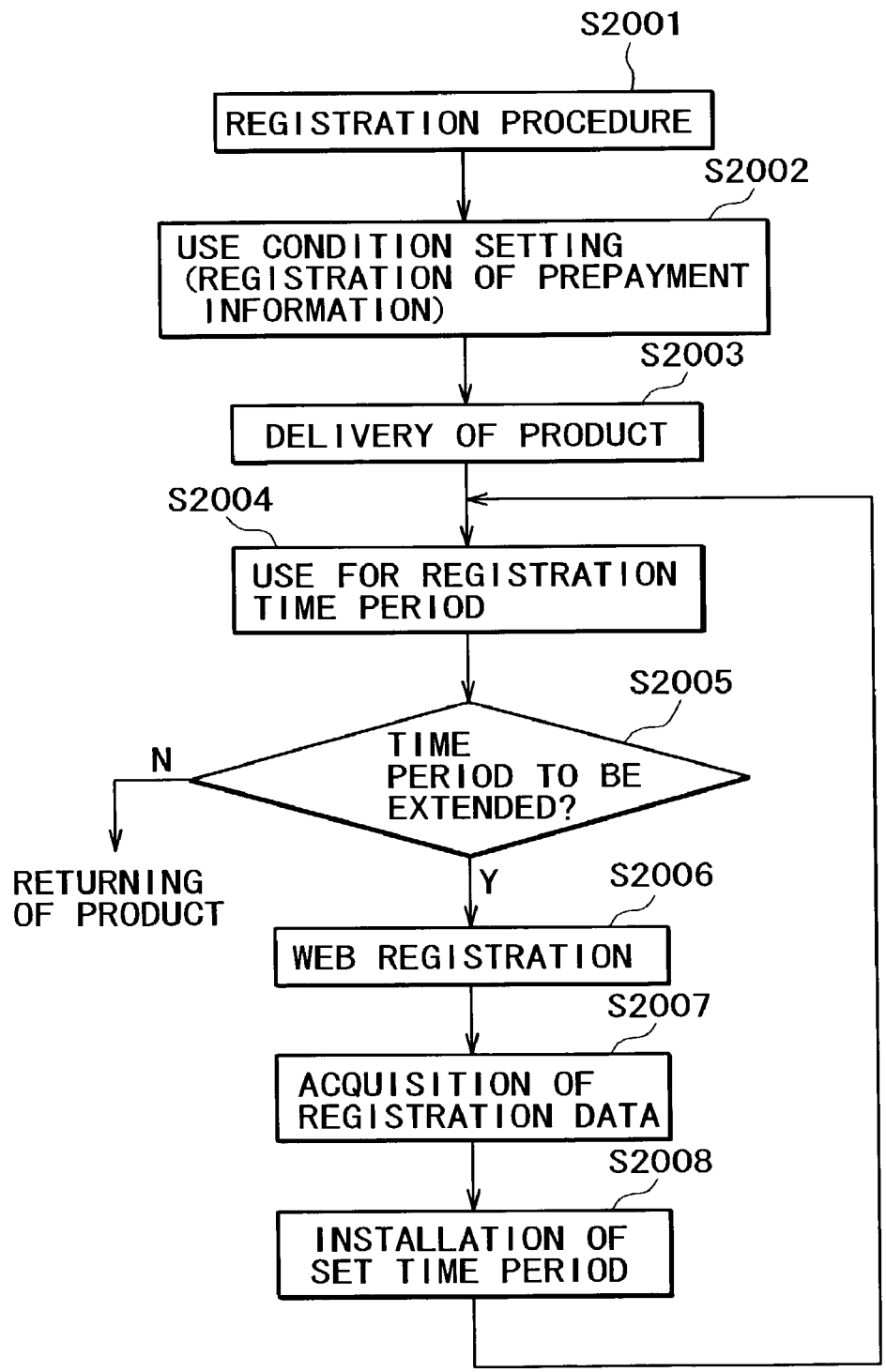
FIG. 35 is a flow chart illustrating a general flow of process of a time period charging system according to a sixth embodiment of the present invention.

FIG. 35 illustrates a general flow in the sixth embodiment.

A customer performs membership registration into the time charge management company 21 (step S2001) so that the customer becomes a member. The membership registration may be performed at a storefront or may be Web registration. Then, the member sets and registers use conditions such as a usable time period in advance (step S2002) and acquires a desired charging object product such as, for example, an electronic apparatus (step S2003). Consequently, the member can use (including use of contents) the electronic apparatus for the registered time period (step S2004).

If the member wants to prolong the use after the member uses the electronic apparatus for the time period set and registered as described above (step S2005), then the member uses the personal computer 40 to perform re-registration of use conditions by Web registration (step S2006) and acquires registration data (step S2007). Then, the member installs a corresponding usable time period into the memory 353 of the electronic apparatus 30 (step S2008). Consequently, the electronic apparatus 30 is enabled again.

On the other hand, if the member does not want to prolong the use of the electronic apparatus (step S2005), then the member returns the electronic apparatus to the time charge management company 21.

FIG. 36 illustrates operation of the electronic apparatus 30 in the sixth embodiment.

Referring to FIG. 36, the control section 351 reads out the remaining time period of the usable time period from the memory 353 of the charging processing section 35 (step S291) and confirms whether or not the remaining time period is zero (step S292). If the remaining time period is zero, then the control section 351 displays information of the usable time period which is one of the use conditions, that is, a message for urging the user to install prepayment information on the screen of the display section 34 through the microcomputer section 31 (step S294).

The user receiving the message will connect the electronic apparatus 30 to the personal computer 40 and install prepayment information.

The control section 351 of the electronic apparatus 30 confirms whether or not the electronic apparatus 30 is connected to the personal computer 40 (step S295). The user will use the personal computer 40 to acquire prepayment information, which is information regarding a usable time period, from the time charge management company 21 in such a manner as hereinafter described. The acquired prepayment information is transferred to the electronic apparatus 30.

The control apparatus 351 of the electronic apparatus 30 supervises whether or not such prepayment information is received from the personal computer 40 (step S296). If the control apparatus 351 confirms reception of prepayment information, then it writes the received prepayment information into the nonvolatile memory 353 of the charging processing section 35 thereby to install the prepayment information (step S297). Consequently, the remaining time period of the usable time period of the memory 353 is re-written (step S298).

Thereafter, the processing returns to step S291, at which the control section 351 reads out the remaining time period of the usable time period from the memory 353 and confirms that the remaining time period is not zero (step S292). Then, the control section 351 displays the remaining time period on the screen of the display section 34 through the microcomputer section 31 (step S293).

After the step S293, the processing advances to step S259 of FIG. 33, and such operation as described hereinabove with reference to FIG. 33 in connection with a prepaid card is performed. It is to be noted, however, that the object of rewriting of a remaining time period of a usable time period as prepayment information and rewriting of operation information is changed from a prepaid card to the memory 353 of the charging processing section 35.

Subsequently, installation of prepayment information using the personal computer 40 is described with reference to FIG. 37. This process corresponds to the Web registration of use conditions illustrated in FIG. 35.

Figure 37:
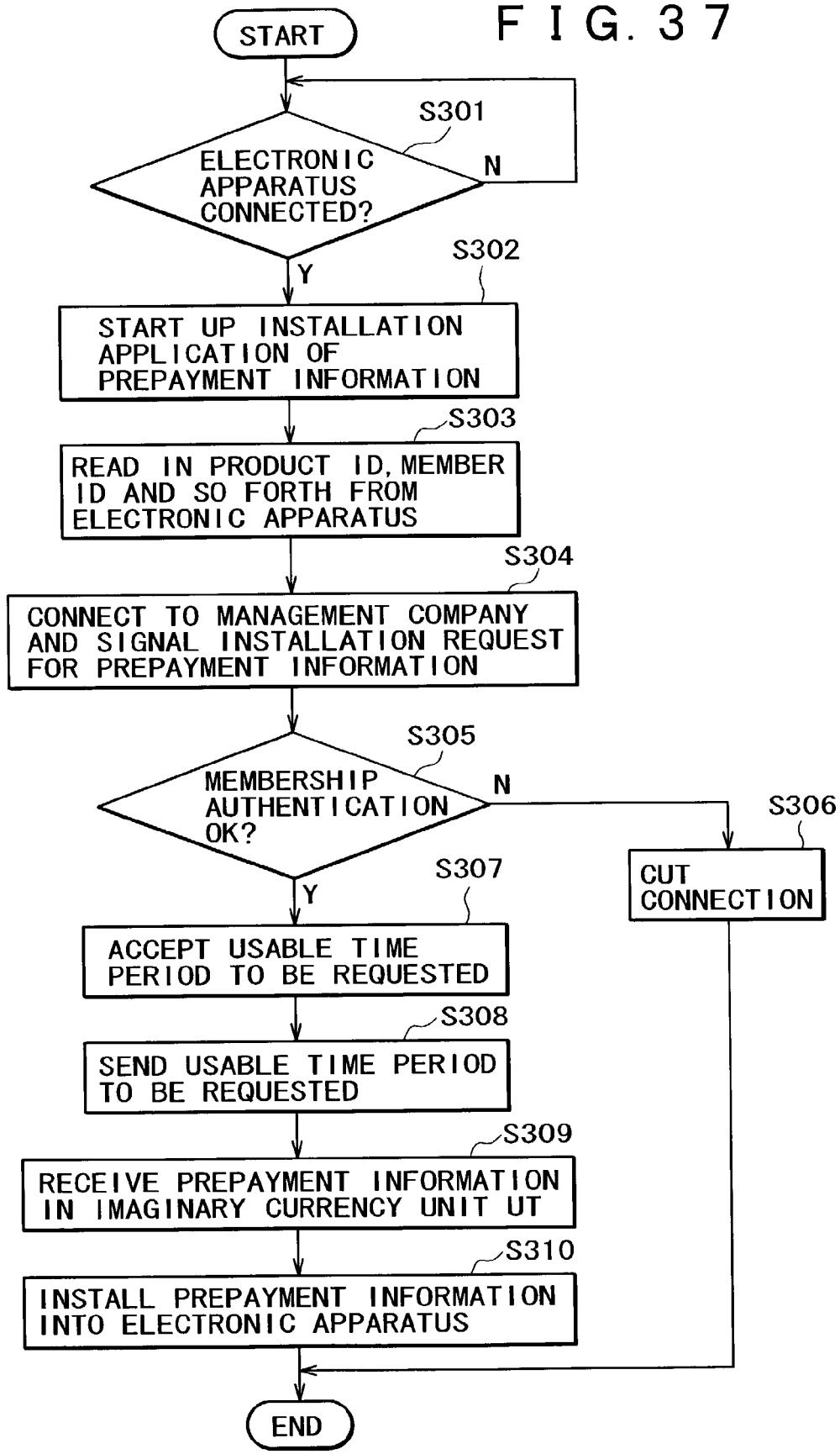
FIG. 37 is a flow chart illustrating an example of an installation method of prepayment information used in the process for time period charging by the electronic apparatus in the sixth embodiment.

Referring to FIG. 37, the personal computer 40 first confirms whether or not the electronic apparatus 30 is connected thereto (step S301). If connection of the electronic apparatus 30 is confirmed, then a prepayment information installation application is started up in response to an instruction of the user (step S302).

Then, the personal computer 40 reads out information necessary for membership authentication such as the member ID and the product ID from the nonvolatile memory 353 of the charging processing section 35 of the electronic apparatus 30 (step S303). Then, the personal computer 40 establishes a connection to the charging management system 210 of the time charge management company 21 over a data communication network such as the Internet and signals a prepayment information installation request to the charging management system 210 together with the information necessary for membership authentication read out at step S303 (step S304).

The charging management system 210 receiving the installation request performs membership authentication and notifies the personal computer 40 of a result of the membership authentication. The personal computer 40 discriminates based on the notification whether or not the membership authentication is successful (step S305). If the membership authentication results in failure, then the connection to the charging management system 210 is cut (step S306), and the processing routine is ended thereby.

On the other hand, if the membership authentication is successful at step S305, then the personal computer 40 accepts an information input of a usable time period to be requested for registration from the user (step S307). Then, the personal computer 40 sends the information of the accepted usable time period to the charging management system 210 (step S308).

The charging management system 210 in the present embodiment uses a value obtained by converting the received usable time period into an imaginary currency UT (Used Time) as prepayment information. The charging management system 210 settles the price corresponding to the prepayment information in accordance with a settlement method registered by the user identified with the member ID.

Here, the imaginary currency UT is a unit currency per a unit time period determined imaginarily as an equivalent to the use time period. For example, if the imaginary currency UT is determined, for example, 1 UT=0.1 minute unit time period price=0.01 yen/second then the exchange rate between the imaginary currency UT and the currency "yen" is given as 1 UT=0.06 yen The charging management system 210 signals the prepayment information obtained by conversion of the prepaid cash into the imaginary currency UT back to the personal computer 40.

Thus, the personal computer 40 receives the prepayment information represented by the imaginary currency UT from the charging management system 210 (step S309) and transfers the received prepayment information to the electronic apparatus 30 so that the prepayment information is installed as information of the usable time period into the electronic apparatus 30 (step S310).

In the sixth embodiment, the electronic apparatus 30 decrements the usable time period information represented by the imaginary currency UT for each unit time to successively decrease the remaining time period of the usable time period. For example, the remaining time period of the usable time period is decremented by 10 UT when the chargeable time period is 1 minute. The remaining time period of the usable time period is displayed as time information converted from the information represented in a unit of the imaginary currency UT. It is to be noted that naturally the remaining time period of the usable time period may be represented in the imaginary currency UT.

It is to be noted that, in the sixth embodiment, even if the user desires to exchange the electronic apparatus 30 with a new product before the remaining time period of the usable time period of the memory 353 of the charging processing section 35 of the electronic apparatus 30 reduces to zero, the exchanged old electronic apparatus can be placed to a used article market with some value found therein in terms of the remaining time period of the usable time period of the same.

Figure 38:
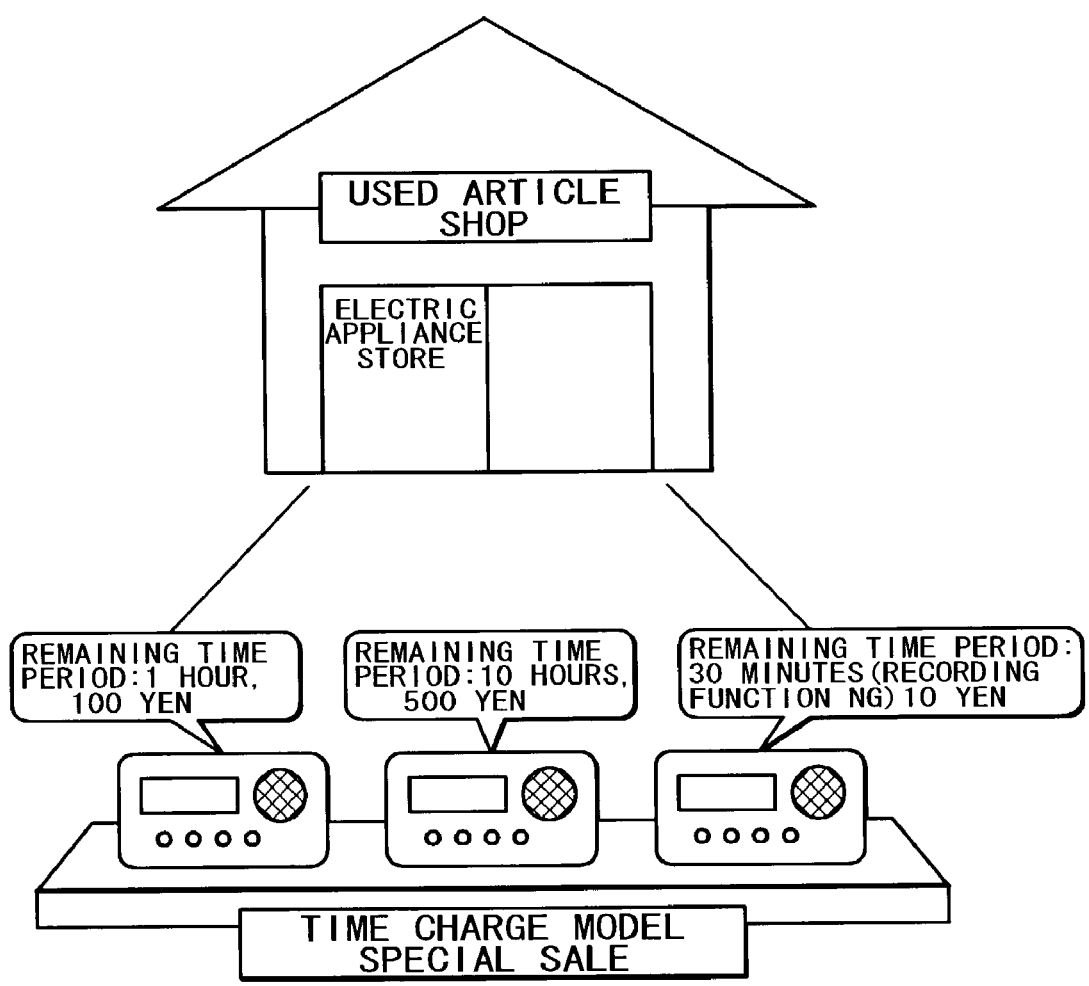
FIG. 38 is a schematic view illustrating a used article market of electronic apparatus used in any time period charging system to which the present invention is applied.

FIG. 38 illustrates such a used article market as just mentioned. Referring to FIG. 38, a used article shop reads out the remaining time period of the usable time period stored in the memory 353 of the electronic apparatus 30 and sets a use price based on the remaining time period. Whereas an electronic apparatus in the sixth embodiment displays the remaining time period thereof when the power supply thereto is switched on, also an electronic apparatus which does not have such a remaining time period displaying function can be placed to a used article market if the remaining time period thereof can be read by means of the personal computer 40 or a reader for exclusive use.

It is to be noted that, in any of the first to sixth embodiments described above, it is possible to calculate a cumulative use time period in a similar manner as in the example described in the background of the invention hereinabove and use such a time unit table of the depreciation type as shown in FIG. 59 to achieve charging of the depreciation type.

Further, naturally it is possible to apply the example described in the background of the invention hereinabove to such use of contents as described above.

Seventh Embodiment

The seventh embodiment is directed to an electronic apparatus. While the electronic apparatus 30 in the embodiments described hereinabove is produced as a model for time charging in advance, the electronic apparatus in the seventh embodiment can be changed over between a model for ordinary sales and a model for time charging by inputting a password.

Figure 39:
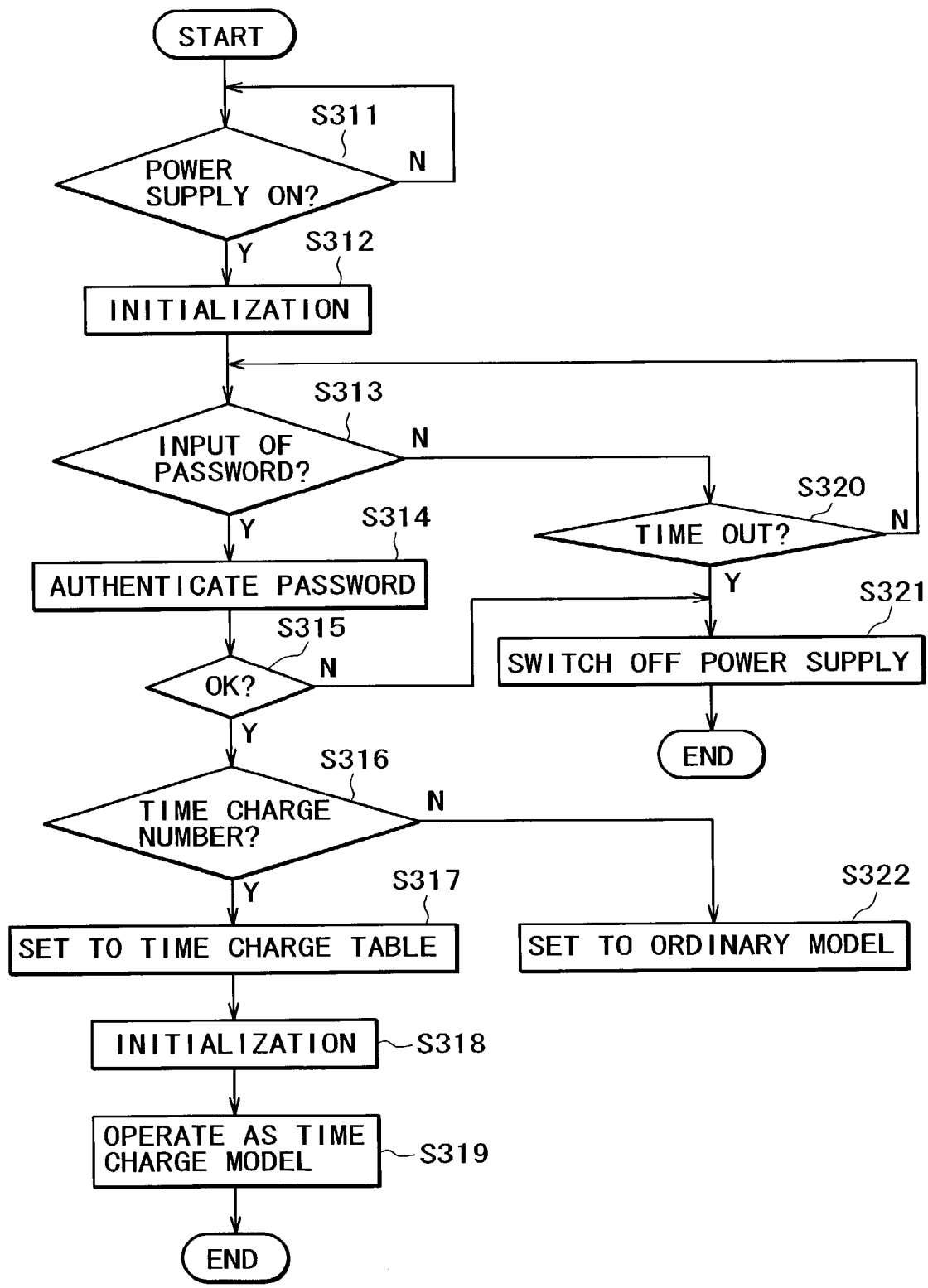
FIG. 39 is a flow chart illustrating a model changing over process of an electronic apparatus used in a time period charging system according to a seventh embodiment of the present invention.

FIG. 39 illustrates a model changing over process of the electronic apparatus 30 in the seventh embodiment.

First, after the power supply to the electronic apparatus 30 is switched on (step S311), the electronic apparatus 30 performs initialization (step S312) and waits for inputting of a password (step S313). If the microcomputer section 31 of the electronic apparatus 30 detects that no password is inputted for a fixed time period (step S320), then it automatically switches off the power supply to the electronic apparatus 30 (step S321) and ends the processing routine.

On the other hand, if the microcomputer section 31 detects inputting of a password at step S313, then it authenticates the inputted password (step S314). If the inputted password is not a predetermined password (step S315), then the power supply to the electronic apparatus is automatically switched off (step S321) and the processing routine is ended.

On the other hand, if the inputted password is the predetermined one (step S315), then the microcomputer section 31 discriminates whether or not the password is a time charge number (step S316). The time charge number is a number applied to the time charge model.

If the microcomputer section 31 discriminates at step S316 that the password is not a time charge number, then the electronic apparatus 30 is set to the ordinary sales model (step S322). Where the electronic apparatus 30 is set as the ordinary sales model, the charging processing section 35 therein does not operate.

On the other hand, if the microcomputer section 31 discriminates at step S316 that the password is a time charge number, then the electronic apparatus 30 is set to the time charge model and the charging processing section 35 is enabled (step S317). Thereafter, the electronic apparatus 30 is initialized (step S318) and therefore operates in such a manner as described hereinabove in connection with the preceding embodiments as the time charge model (step S319).

In the flow chart of FIG. 39, irrespective of whether the electronic apparatus 30 is set to the ordinary sales model or the time charge model, password authentication is performed. However, the flow chart may be modified such that password authentication is required only when the electronic apparatus 30 is set to the time charge model or conversely only when the electronic apparatus 30 is set to the ordinary sales model.

In this manner, with the electronic apparatus in the seventh embodiment, since it can be set to the ordinary sales model or the time charge model only by inputting a password, there is no necessity to produce such two different models separately from each other. This gives rise to another advantage that reduction of the cost by a mass production effect can be anticipated.

Eighth Embodiment

The eighth embodiment uses prepayment. However, the eighth embodiment does not use a prepaid card or an IC bankard, but uses imaginary money of the coin type which has a built-in electronic circuit including a storage section for storing operation data and so forth, an arithmetic operation section for performing calculation of a use price and a transmission-reception section for data. It is to be noted that, in the following description, the imaginary money of the coin type is referred to as electronic coin.

Further, in the eighth embodiment, the imaginary currency UT described hereinabove in connection with the sixth embodiment is used as the currency for an equivalent to a use time period stored in the storage section of the built-in electronic circuit of the electronic coin. It is to be noted that the unit of the imaginary currency is 1 UT as described hereinabove.

Figure 40:
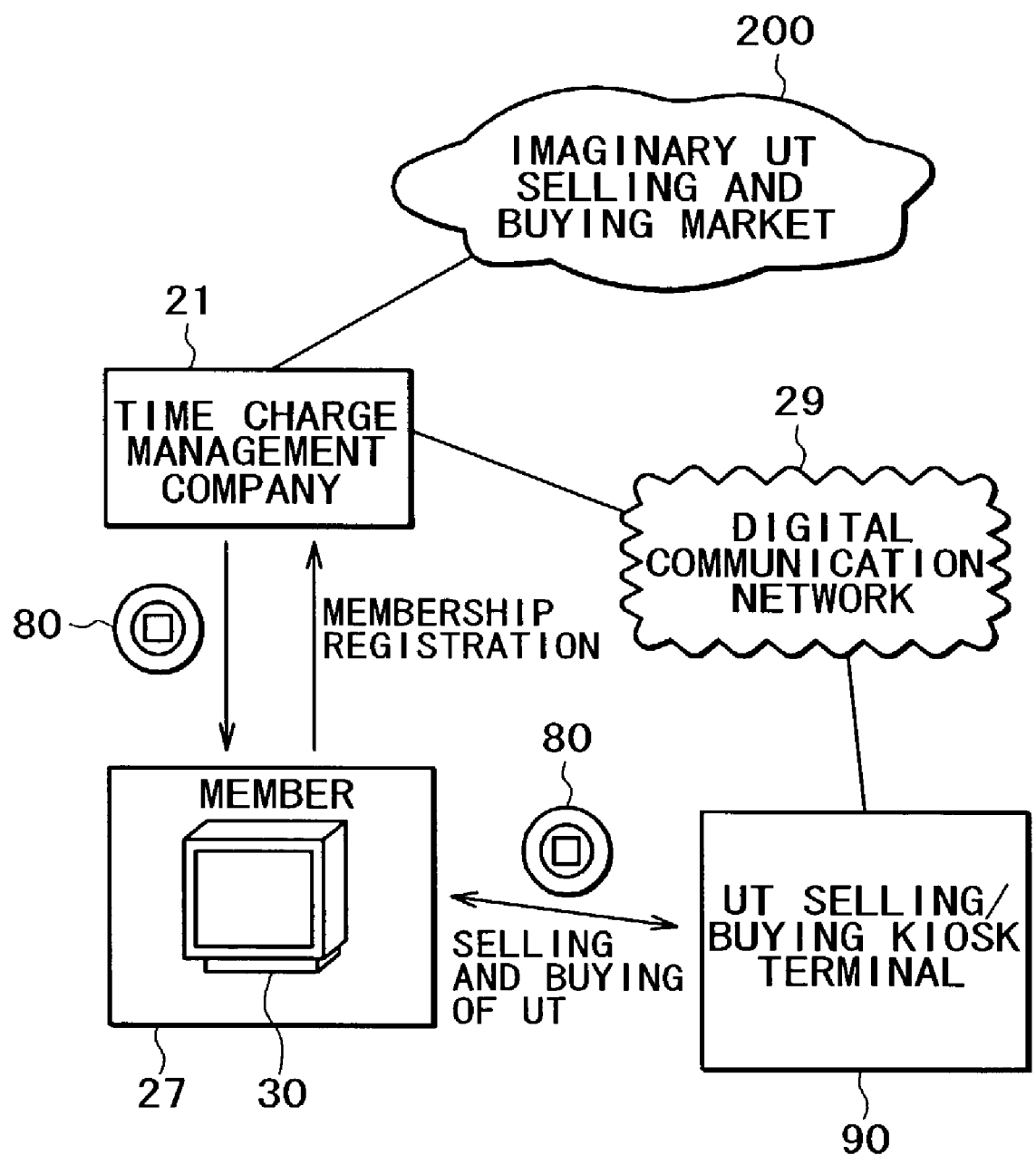
FIG. 40 is a block diagram illustrating a business model in which a time period charging system according to an eighth embodiment of the present invention is applied.

While also the eighth embodiment presupposes such a business model as described hereinabove with reference to FIG. 1, it uses such a mechanism as shown in FIG. 40 for a charging process in which an electronic coin is used for payment of an equivalent to a use period of time.

First, as described hereinabove, a user performs membership registration into the time charge management company 21 to become a member 27, and is provided with an electronic apparatus 30 with regard to which it concludes a contract with the time charge management company 21 and receives an electronic coin 80. In the storage section of the electronic coin 80 at this time, a UT number by the imaginary currency UT corresponding to the amount of money paid by the member 27 is stored. The UT number corresponds to the usable time period. Also user information such as the name (user name), user ID and personal identification number of the registered member 27 is stored in the storage section of the electronic coin 80.

Also price information of time period charging information and a use permission time number are stored in the memory of the electronic coin 80. The information is used later for a charging process hereinafter described.

The member 27 is permitted to use the electronic apparatus 30 if the member throws an electronic coin 80, whose UT number of the imaginary currency UT is not zero, that is, whose usable time period is not zero, into the electronic apparatus 30. In this instance, the electronic apparatus 30 performs a charging process in accordance with a use time period in a similar manner as in the case of a prepaid card described hereinabove. In this instance, however, the charging process is performed using a value of the imaginary currency UT converted from the use time period. In particular, the electronic apparatus 30 performs a process of decrementing the UT number of the imaginary currency UT stored in the storage section of the electronic coin 80 in accordance with the use time period. Upon such charging processing, the electronic apparatus 30 writes use history information into the storage section of the electronic coin 80. The use history information includes the year, month and day of the use, the use time period and so forth.

The member 27 who is a user can use a UT selling/buying kiosk terminal 90 to buy the imaginary currency UT when the remaining UT number of the imaginary currency UT stored in the storage section of the electronic coin 80 is poor. Further, in the eighth embodiment, it is possible for the member 27 to sell an unnecessary amount of the imaginary currency UT through the UT selling/buying kiosk terminal 90.

The UT selling/buying kiosk terminal 90 is connected to the time charge management company 21 through a digital communication network 29. Thus, in response to a request from the time charge management company 21 or by autonomous processing of the UT selling/buying kiosk terminal 90, information regarding buying and selling of the imaginary currency UT and use history information read out from the electronic coin 80 are transferred from the UT selling/buying kiosk terminal 90 to the time charge management company 21.

Further, in the eighth embodiment, the imaginary currency UT is handled as variable currency as hereinafter described. As one of variation factors, a history in the past regarding the use time period, for example, a cumulative value of the use time period in a unit of one day or in a unit of one month, is used. In particular, for example, if the use time period in the last month is short, the exchange rate of the imaginary currency UT for the current month is set comparatively low, but on the contrary if the use time period in the last month is long, the exchange rate of the imaginary currency UT for the current month is set comparatively high.

In order to vary the exchange rate, the exchanging amount of money for one 1 UT is varied. Although it is otherwise possible to vary the use time period per 1 UT, since such variation of the exchanging amount of money as described above does not involve variation of the use time period per 1 UT, this eliminates the necessity to take a change of the rate in calculation of the usable time period into consideration.

The sold or bought quantity of the imaginary currency UT is used as another one of the variation factors. In particular, when the sold or bought quantity of the imaginary currency UT is great, the exchange rate of the imaginary currency UT is set to a comparatively high value, but when the sold or bought quantity of the imaginary currency UT is small, the exchange rate of the imaginary currency UT is set to a comparatively low value.

In this instance, as regards the sold and bought quantity of the imaginary currency UT, not only information of the quantity of the sold and bought imaginary currency UT acquired from the kiosk terminal 90 but also the quantity of the imaginary currency UT sold and bought on a market are taken into consideration because, in the eighth embodiment, a selling and buying market 200 for selling and buying the imaginary currency UT is provided as seen in FIG. 40 so that the imaginary currency UT can be sold and bought.

The exchange rate of the imaginary currency UT set in such a manner as described above is determined, for example, in a unit of one month and transferred to the kiosk terminal 90 through the digital communication network 29 so that it is used as an exchange rate for selling and buying of the imaginary currency UT for the current month. Accordingly, the member 27 can refer to the exchange rate to sell or buy the imaginary currency UT.

Where the imaginary currency UT is handled as variable currency so that the exchange rate thereof with actual currency may be variable, it can be anticipated to reduce the seasonal variation of the use time period of the electronic apparatus 30 and/or contents to average the use time period thereby to raise the operating ratio of the electronic apparatus 30 and/or contents. Further, by raising the operating ratio of the electronic apparatus 30, the purchased electronic apparatus as use object products can be reduced.

For example, where the situation of use of a product with regard to which a charge is to be imposed on a use time period varies from an economical, seasonal, political or like factor, if the charging rate for the use time period is fixed, then the use time period of the electronic apparatus 30 varies as indicated by a thick solid line 201 in FIG. 41.

On the other hand, if the exchange rate of the imaginary currency UT is varied as indicated by a broken line 202 in FIG. 41 taking the variation of the use time period into consideration, then it can be anticipated that the use time period when the exchange rate is high decreases whereas the use time period when the exchange rate is low increases. Therefore, it can be anticipated that the use time period of the electronic apparatus 30 is uniformed and exhibits a minimized seasonal variation as indicated by a thin sold line 203 in FIG. 41.

Further, that the imaginary currency UT itself is handled as an object of selling and buying can be beneficial to a user. For example, it is possible for a user to buy the imaginary currency UT when the exchange rate is comparatively low but sell the imaginary currency UT when the exchange rate is comparatively high thereby to obtain marginal profits.

Figure 42A:
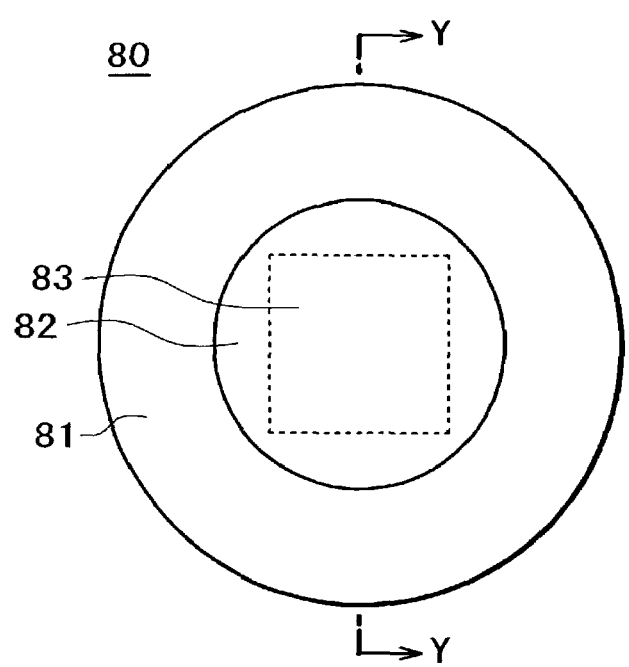
FIGS. 42A and 42B are schematic views showing a structure of an example of an electronic coin used in the eighth embodiment.
Figure 42B:
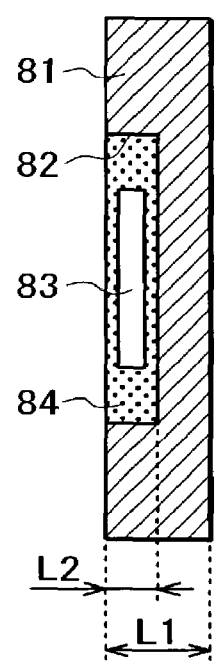

Now, several examples of the structure of the electronic coin 80 shown in FIG. 40 are described. FIGS. 42A and 42B show the structure of a first example of the electronic coin 80, and particularly, FIG. 42A is a front elevational view of the first example of the electronic coin 80 and FIG. 42B is a sectional view taken along line Y-Y of FIG. 42A.

Referring to FIGS. 42A and 42B, the electronic coin 80 of the example shown includes a flattened disk 81 made of a metal or a resin and having a circular recess 82 formed at a central portion thereof, an electronic circuit 83 accommodated in the circular recess 82, and a filler 84 filled in the recess 82 to secure the electronic circuit 83. For the filler 84, for example, an ultraviolet curing resin or the like is used. In this instance, the depth L2 of the circular recess 82 is smaller than the thickness L1 of the disk 81 and is set to approximately, for example, L2=L1/2. The recess 82 and the electronic circuit 83 are isolated from each other.

Referring to FIG. 43, the electronic circuit 83 shown includes a control section 831 formed from a microcomputer, a memory 832, a clock section 833, a transmission section 834, and a reception section 835. The transmission section 834 and the reception section 835 shown transmit and receive data wirelessly. For the radio transmission/reception of data, any of a method which uses a radio wave, another method which uses light such as infrared rays and a further method which uses an ultrasonic wave may be used.

Figure 44A:
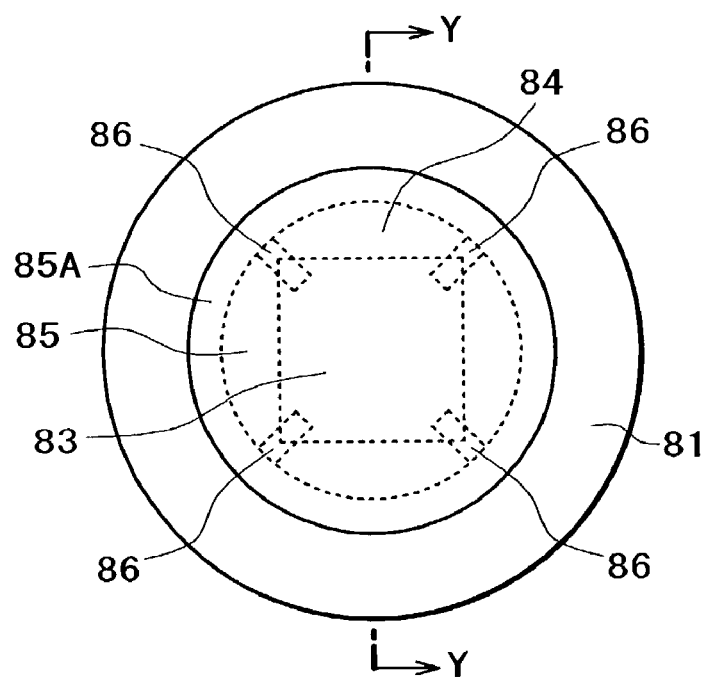
FIGS. 44A and 44B are schematic views showing a structure of another example of an electronic coin used in the eighth embodiment.
Figure 44B:
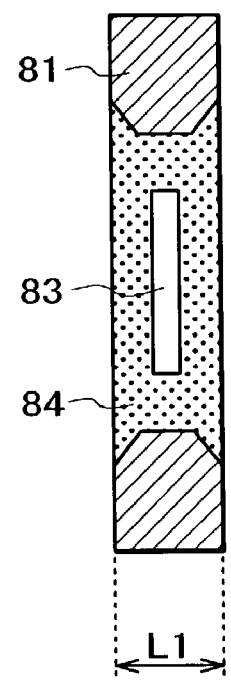
Figure 45A:
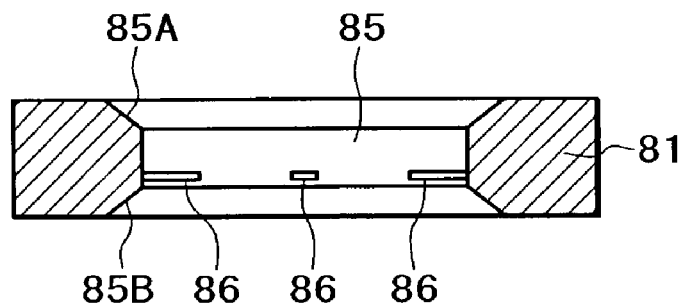
FIGS. 45A, 45B and 45C are schematic sectional views illustrating different steps of a procedure of production of the electronic coin of FIGS. 44A and 44B.

FIGS. 44A and 44B show a second example of the structure of the electronic coin 80, and particularly, FIG. 44A is a front elevational view of the electronic coin 80 and FIG. 44B is a sectional view taken along line Y-Y of FIG. 44A. Further, FIGS. 45A, 45B and 45C illustrate an outline of different steps of a process of producing the electronic coin 80 shown in FIGS. 44A and 44B.

Referring to FIGS. 44A, 44B and 45A to 45C, also the electronic coin 80 of the example shown includes a flattened disk 81 made of a metal or a resin and an electronic circuit 83 embedded in a central portion of the disk 81. However, in the present example, the embedded electronic circuit 83 cannot be removed readily from the disk 81.

In particular, as seen in FIG. 44A, a through-hole 85 is formed at a central portion of the disk 81 in a concentric relationship with an outer circumference of the disk 81. Further, a pair of tapering faces 85A and 85B are formed on an inner wall face of the through-hole 85 such that the diameters thereof increase toward the opposite surfaces of the disk 81 as seen in FIG. 44B. Furthermore, a plurality of projections 86 for retaining the electronic circuit 83 are provided on the inner wall face of the through-hole 85 as seen in FIGS. 44A and 45A.

Figure 45B:
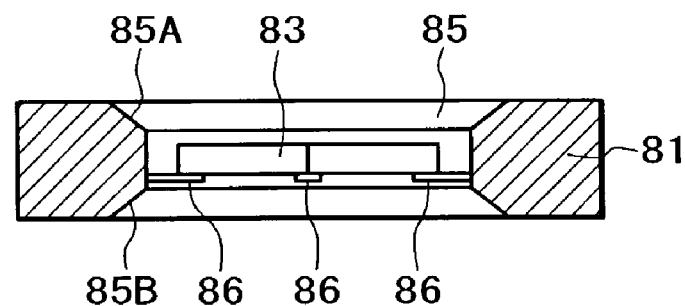
Figure 45C:
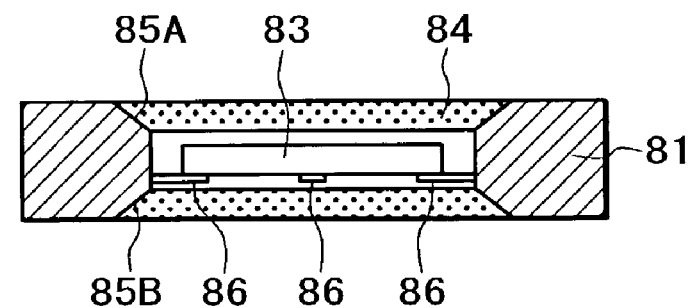

Upon production of the electronic coin 80, the electronic circuit 83 is accommodated into the through-hole 85 such that it is placed onto and retained by the projections 86 as seen in FIG. 45B. Then, while the condition shown in FIG. 45B is kept, the filler 84 is filled into the entire through-hole 85 as seen in FIG. 45C. For the filler 84, an ultraviolet curing resin can be used similarly as described above.

With the structure of the electronic coin of the second form described above, the tapering faces 85A and 85B of the through-hole 85 prevent dropping of the electronic circuit 83 embedded in the filler 84 from the disk 81.

Now, a hardware configuration of the electronic apparatus 30 in the eighth embodiment is described with reference to FIG. 46.

The electronic apparatus 30 shown includes an electronic coin loading/unloading mechanism 301. The electronic apparatus 30 is enabled if an electronic coin 80 is loaded into the electronic coin loading/unloading mechanism 301. However, even if an electronic coin 80 is loaded into the electronic coin loading/unloading mechanism 301, if the remaining UT number stored in the memory 832 of the electronic circuit 83 built in the electronic coin 80 is zero, then use of the electronic apparatus 30 is not permitted.

Loading/unloading of an electronic coin 80 is performed by the electronic coin loading/unloading mechanism 301 which is controlled by the microcomputer section 31 in response to an operation of a loading/unloading button by a user as a trigger. It is to be noted that, in such a case that the remaining UT number of the electronic coin 80 is zero or the like, unloading of the electronic coin 80 may be performed automatically by the electronic apparatus 30.

The electronic apparatus 30 in the eighth embodiment does not include a charging processing section. A process to be executed by the charging processing section is executed in such a manner as hereinafter described by the control section 831 of the electronic circuit 83 built in the electronic coin 80. However, it is otherwise possible to provide a charging processing section in the electronic apparatus 30 and transfer a result of a charging process by the charging processing section to the electronic coin 80.

The electronic apparatus 30 in the eighth embodiment further includes a transmission section 302 and a reception section 303 for transmitting and receiving data to and from the electronic coin 80. Further, a function execution section 32, a key operation section 33 and a display section 34 are connected to the microcomputer section 31 of the electronic apparatus 30 similarly as in the configuration shown in FIG. 3 or 22.

Figure 47:
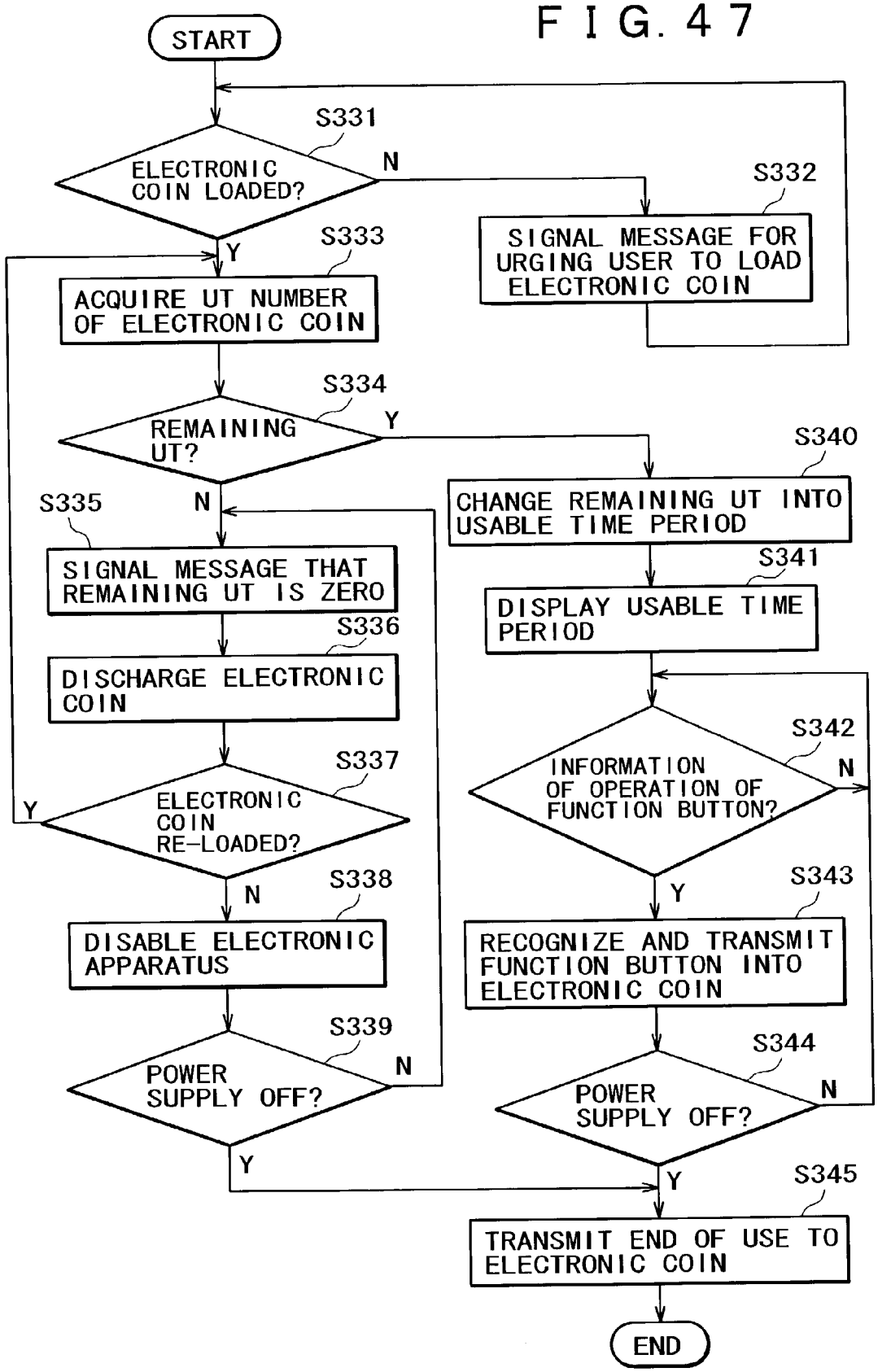
FIG. 47 is a flow chart illustrating processing operation of the electronic apparatus used in the eighth embodiment.

FIG. 47 illustrates operation of the electronic apparatus 30 in the eighth embodiment. The process of FIG. 47 is executed principally by the microcomputer section 31.

Referring to FIG. 47, after the power supply to the electronic apparatus 30 is switched on and initialization of the electronic apparatus 30 is performed, the microcomputer section 31 discriminates whether or not an electronic coin 80 is loaded in the electronic apparatus 30 (step S331). If no electronic coin 80 is loaded in the electronic apparatus 30, then the microcomputer section 31 displays a message for urging the user to load an electronic coin 80 on the screen of the display section 34 (step S332).

Then, if the microcomputer section 31 discriminates that an electronic coin 80 is loaded in the electronic apparatus 30, then it sends a transfer request for UT information to the electronic coin 80 through the transmission section 302 and receives information of the UT number sent thereto from the electronic coin 80 in response to the transfer request through the reception section 303 (step S333). Then, the microcomputer section 31 confirms whether or not the electronic coin 80 includes some remaining UT (step S334). If the remaining UT is zero, then the microcomputer section 31 displays a message "The electronic coin should be replaced because the remaining UT of the electronic coin is zero." on the screen of the display section 34 (step S335).

Then, the microcomputer section 31 unloads the electronic coin 80 (step S336) and waits for loading of another electronic coin 80 (step S337). However, if no new electronic coin 80 is loaded into the electronic apparatus 30, then the microcomputer section 31 disables the electronic apparatus 30 (step S338) and then discriminates whether or not the power supply to the electronic apparatus 30 is off (step S339). If the microcomputer section 31 discriminates that the power supply to the electronic apparatus 30 is off, then the microcomputer section 31 transmits an end of use to the electronic coin 80 (step S346), thereby ending the processing. On the other hand, if the microcomputer section 31 discriminates that the power supply to the electronic apparatus 30 is not off, then the processing returns to step S335, at which it displays the message for urging the user to replace the electronic coin 80 on the screen of the display section 34.

If the microcomputer section 31 confirms at step S337 that the electronic coin 80 is replaced, then the processing returns to step S333, at which the microcomputer section 31 reads out the remaining UT of the newly loaded electronic coin 80. Then, the microcomputer section 31 confirms whether or not the remaining UT is zero (step S334). Then, if the remaining UT is not zero, then the microcomputer section 31 converts the remaining UT into a s usable time period (step S340) and displays the usable time period on the screen of the display section 34 (step S341).

Then, the microcomputer section 31 discriminates whether or not a function button on the key operation section 33 is operated (step S342). If the microcomputer section 31 discriminates that a function button is operated, then it recognizes what the operated function button is and transmits button type information of the operated function button to the electronic coin 80 through the transmission section 302 (step S343).

Then, the microcomputer section 31 discriminates whether or not the power supply to the electronic apparatus 30 is switched off (step S344). If the power supply is not off, then the processing returns to step S342 so that the processing beginning with step S342 is repeated. On the other hand, if it is discriminated at step S344 that the power supply to the electronic apparatus 30 is switched off, then the microcomputer section 31 transmits information of the end of use to the electronic coin 80 through the transmission section 302 (step S345). Then, the microcomputer section 31 ends the processing.

Figure 48:
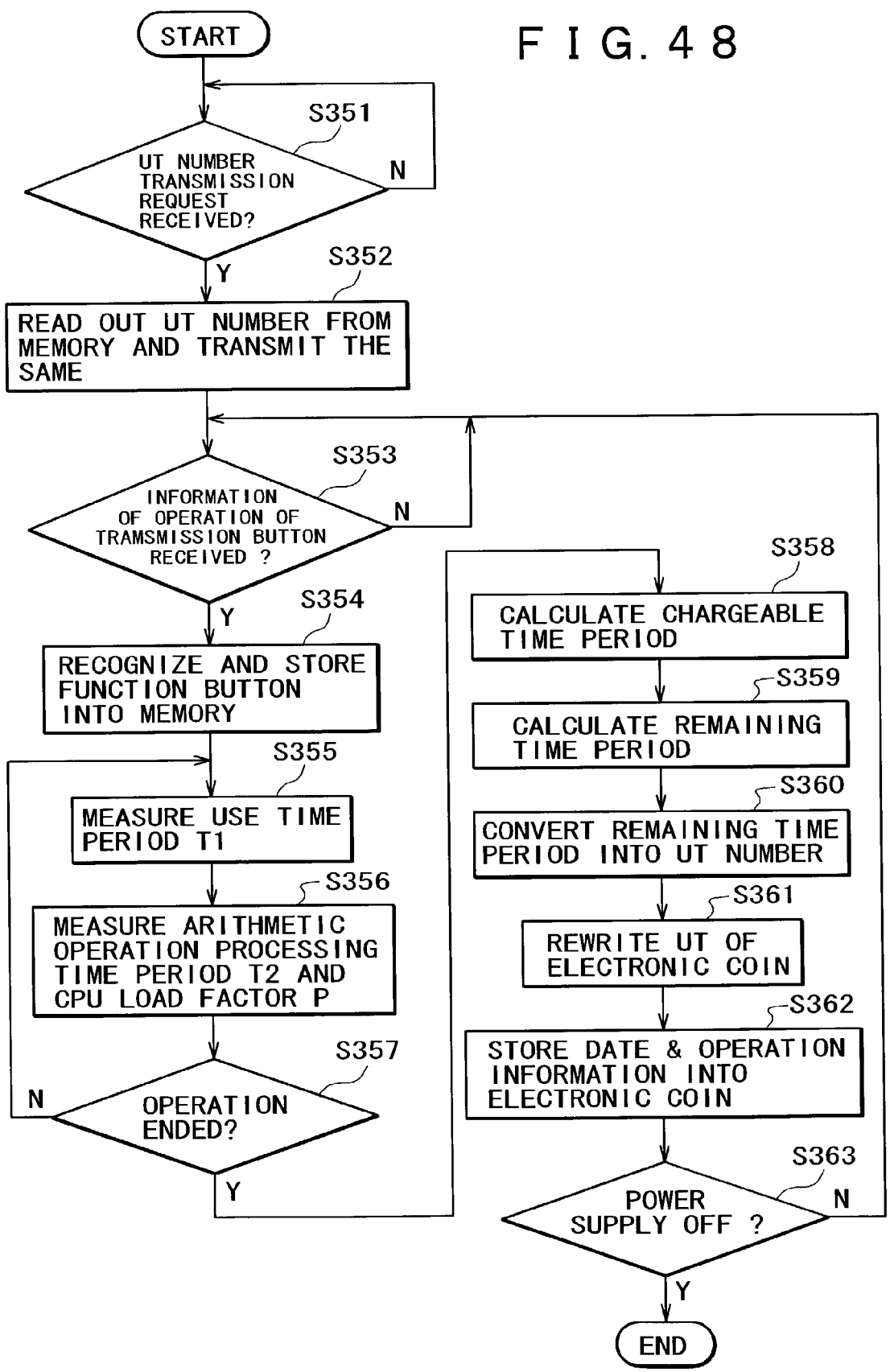
FIG. 48 is a flow chart illustrating processing operation of the electronic circuit built in the electronic coin used in the eighth embodiment.

Subsequently, operation of the electronic circuit 83 of the electronic coin 80 when the electronic coin 80 is loaded into the electronic apparatus 30 is described with reference to FIG. 48. The operation of the electronic circuit 83 illustrated in the flow chart of FIG. 48 is started when the control section 831 of the electronic coin 80 detects that the electronic coin 80 is loaded into the electronic coin loading/unloading mechanism 301 of the electronic apparatus 30.

In order to detect that the electronic coin 80 is loaded into the electronic coin loading/unloading mechanism 301 of the electronic apparatus 30, an optical or electronic detection element may be provided, for example, in the electronic coin loading/unloading mechanism 301 of the electronic apparatus 30 such that, when loading of the electronic coin 80 is detected by the optical or electronic detection element, a loading detection signal may be sent through the transmission section 302. However, the electronic coin 80 may alternatively or additionally include an optical or electronic detection element which detects that the electronic coin 80 is loaded into the electronic coin loading/unloading mechanism 301 of the electronic apparatus 30.

If the electronic coin 80 is loaded into the electronic apparatus 30, then a UT number transmission request is sent from the electronic apparatus 30 to the electronic coin 80. Thus, when the electronic circuit 83 confirms reception of the transmission request (step S351), it reads out the remaining UT number from the memory 832 and transmits it to the electronic apparatus 30 through the transmission section 834 (step S352).

Then, when the electronic circuit 83 receives operation information of a function button from the electronic apparatus 30 (step S353), it recognizes the operated function button and stores the information of the function button into the memory 832 (step S354).

Then, the control section 831 measures a time period of execution of the operated function, that is, the use time period T1, using time information of the clock section 833 (step S355). Then, while information is communicated between the electronic apparatus 30 and the electronic coin 80, the control section 831 measures an arithmetic operation processing time period which is a time period within which the CPU of the microcomputer section 31 operates continuously, that is, the time period T2 except a sleep time period, and calculates the load factor P of the CPU of the microcomputer section 31 (step S356). Although the load factor P of the CPU of the microcomputer section 31 is arithmetically operated repetitively during execution of the process illustrated in FIG. 48, it may otherwise be arithmetically operated at a point of time when execution of the process comes to an end.

For the calculation of the load factor P, the expression:

$$P=(T2/T1) \times K$$

is used as described hereinabove. In the expression, K is the apparatus type-dependent coefficient and is a variable coefficient which depends upon a video apparatus, audio apparatus, a television receiver, a medium type or the like.

The measurement of the use time period T1 at step S355 and the measurement of the time period T2 and the load factor P at step S356 are repetitively executed until operation of the function being executed comes to an end (step S357).

Then, if it is discriminated that the operation of the function being executed comes to an end, then the control section 831 of the electronic coin 80 calculates the chargeable time period Dt with regard to the use of the apparatus and the chargeable time period Ct with regard to the use of the contents (step S358) in a similar manner as in the embodiments described hereinabove.

Then, the control section 831 calculates the remaining time period of the usable time period using the information of the chargeable time periods Dt and Ct of a result of the calculation (step S359) and converts the remaining time period of a result of the calculation into a UT number (step S360). Then, the control section 831 decrements the UT number of the memory 832 of the electronic coin 80 by the UT number obtained by the conversion and rewrites the remaining UT number with a result of the decrementing (step S361). The control section 831 writes also operation information including the date and the use time period into the memory 832 of the electronic coin 80 (step S362). The information written in the memory 832 of the electronic coin 80 is read out from the electronic coin 80 by the kiosk terminal 90 as hereinafter described and sent to the time charge management company 21, by which it is used as a material for a marketing research or the like.

Thereafter, the control section 831 discriminates whether or not the power supply to the electronic apparatus 30 is switched off (step S363). If the power supply is not off, then the processing returns to step S353, at which the control section 831 waits for a next operation of a function button. On the other hand, if the power supply is off, then the processing routine is ended.

It is to be noted that, although processing regarding the contents time period charging information 106 or 114 and the time period charging information 120 or 130 is omitted in FIGS. 47 and 48 for simplified illustration, such price information and time number limitation information as described above are stored in a coordinated relationship with identification information in the memory 833 in the electronic circuit 83 of the electronic coin 80 in a quite similar manner as in the embodiments described hereinabove. Also charging processing using such information is performed in a quite similar manner as in the embodiments described hereinabove.

It is to be noted that, while the electronic coin 80 described above performs a charging process, a charging processing section may alternatively be provided in the electronic apparatus 30 as in the configuration shown in FIG. 3 such that a result of a charging process is transferred from the charging processing section to the electronic coin 80. In this instance, the electronic circuit 83 of the electronic coin 80 need not store and manage price information or time period charging information such as time number limitation information in the memory 833, but may perform a settlement process regarding the imaginary currency UT in accordance with operation information sent thereto from the charging processing section of the electronic apparatus 30 and store the operation information into the memory.

Example of a Configuration of the UT Selling/Buying Kiosk Terminal 90

Figure 49:
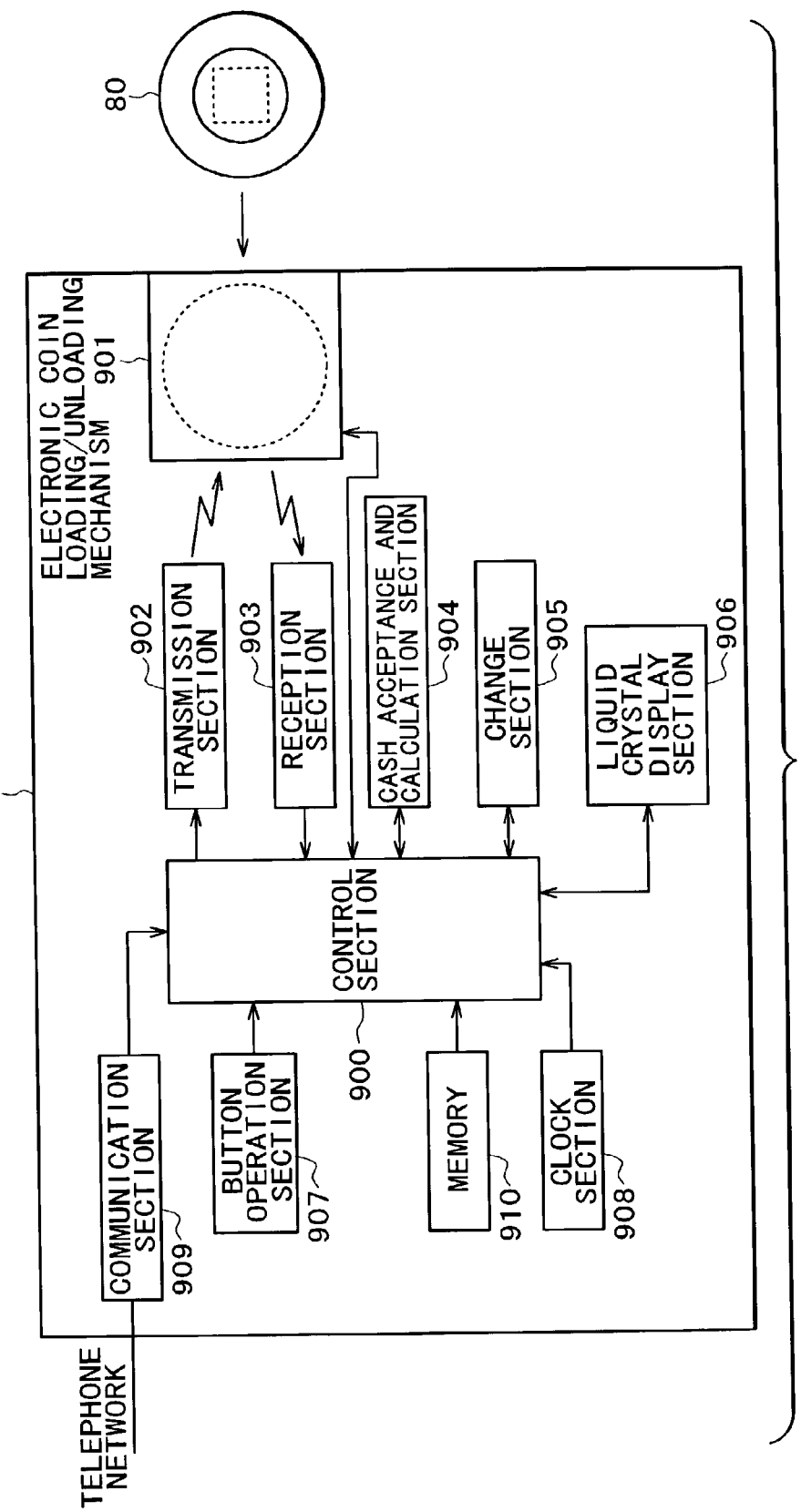
FIG. 49 is a block diagram showing a configuration of an example of a terminal apparatus for buying an imaginary currency used in the eighth embodiment and recording the same into the electronic coin.

Now, an example of a configuration of the UT selling/buying kiosk terminal 90 is described with reference to FIGS. 49 and 50. FIG. 49 shows an example of an internal configuration of the UT selling/buying kiosk terminal 90 while FIG. 50 shows an example of a face of an operation panel of the UT selling/buying kiosk terminal 90.

Referring first to FIG. 49, the UT selling/buying kiosk terminal 90 includes a control section 900 formed from a microcomputer, an electronic coin loading/unloading mechanism 901, a transmission section 902 for transmitting write data to the electronic coin 80, a reception section 903 for receiving data read out from the memory 832 and transmitted thereto from the electronic coin 80, a cash acceptance and calculation section 904, a change section 905, a display section 906 formed from a liquid crystal display (LCD) unit, a button operation section 907 including numeral buttons, a UT buying button and a UT selling button, which are lo hereinafter described, and other necessary buttons, a clock section 908, a communication section 909 connected to the digital communication network 29 through a telephone network or the like for communicating with the time charge management company 21, and a memory 910. Here, an analog communication network may be used in place of the digital communication network 29.

Figure 50:
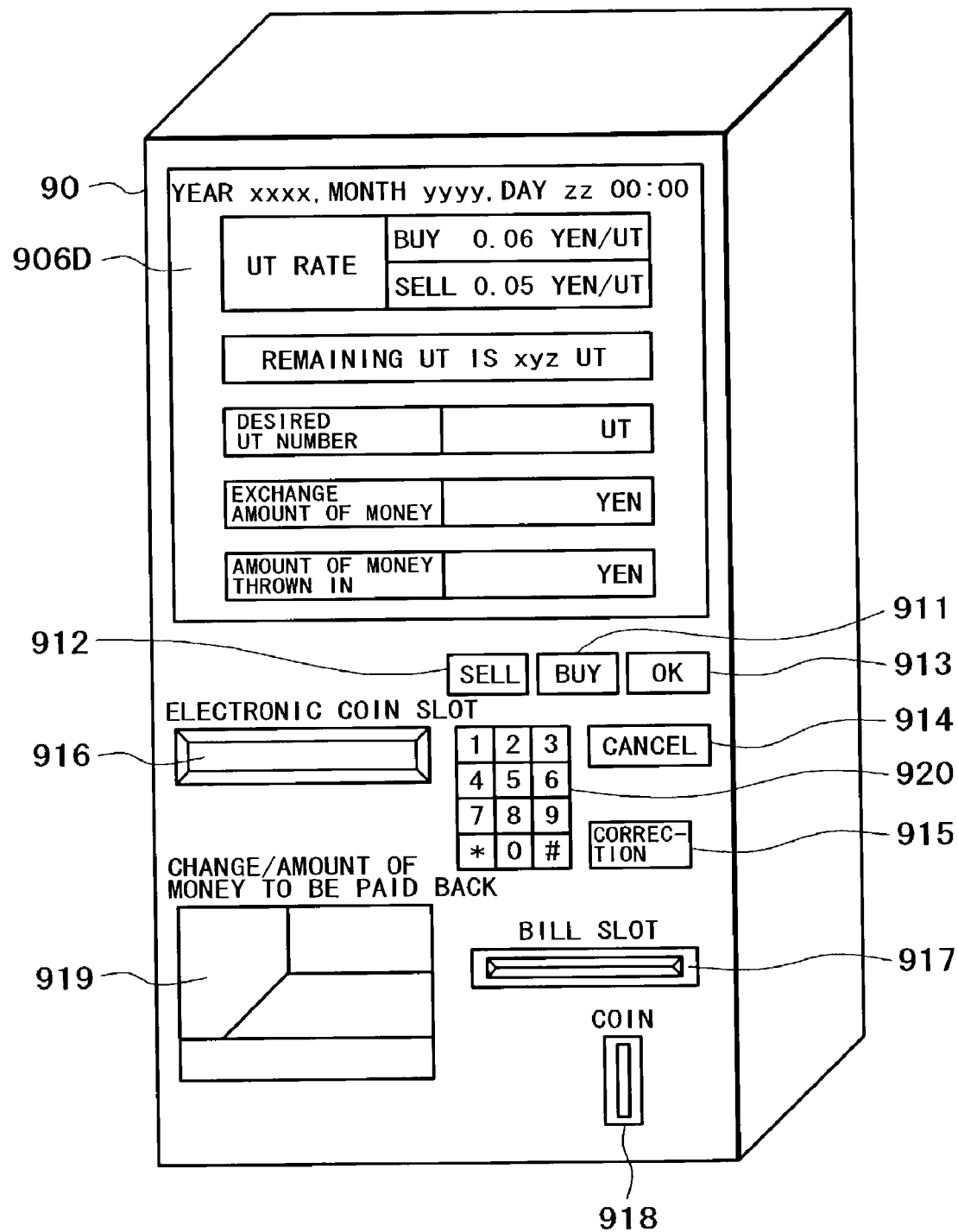
FIG. 50 is a schematic view showing a configuration of a front surface panel section of the terminal apparatus of FIG. 49.

Referring to now FIG. 50, a display screen 906D of the display section 906 is provided on the operation panel surface, and also a plurality of buttons included in the button operation section 907 described above are provided on the operation panel surface. More particularly, the numeral buttons 920, UT buying button 911 and UT selling button 912 as well as an OK button 913, a cancel button 914 and a correction button 915 are provided on the operation panel surface.

Further, an electronic coin slot 916, a bill slot 917, a coin slot 918 and a returning money receiver 919 are provided on the operation panel surface.

The UT selling/buying kiosk terminal 90 can be used not only for buying of the imaginary currency UT but also selling of the imaginary currency UT. An exchange rate of the imaginary currency UT for selling and buying is sent from the time charge management company 21 to the UT selling/buying kiosk terminal 90 over the digital communication network 29. The exchange rate is published also on a homepage of the time charge management company 21 on the Internet.

In the present example, the charging management system of the time charge management company 21 determines a UT exchange rate in a unit of one month as hereinafter described. However, the exchange rate may be changed not in a unit of one month but in a unit of one week or one day.

The memory 910 of the UT selling/buying kiosk terminal 90 stores the information of the exchange rate. Then, the control section 900 of the UT selling/buying kiosk terminal 90 reads out the information of the exchange rate from the memory 910 and displays an exchange rate for buying (buying UT rate) and an exchange rate for selling (selling UT rate) of the imaginary currency UT on the display screen 906D as shown in FIG. 50.

By referring to the UT rates published on the homepage or displayed on the UT selling/buying kiosk terminal 90, the user can buy the imaginary currency UT selecting a month in which the exchange rate is comparatively low and can sell the imaginary currency UT selecting a month in which the exchange rate is comparatively high.

Further, if an electronic coin 80 is loaded into the UT selling/buying kiosk terminal 90 through the electronic coin slot 916, then the UT selling/buying kiosk terminal 90 displays the remaining UT number of the electronic coin 80 on the display screen 906D thereof as seen in FIG. 50. Consequently, the user can confirm the remaining UT number of the electronic coin 80. If the user wants to merely confirm the remaining UT number, then the user will depress the cancel button 914. Consequently, the electronic coin 80 is discharged from the electronic coin slot 916.

However, if the user wants to buy the imaginary currency UT, then the user will depress not the cancel button 914 but the UT buying button 911 and input the UT number to be bought using the numeral buttons 920. On the other hand, if the user wants to sell the imaginary currency UT, then the user will depress the UT selling button 912 and input the UT number to be sold using the numeral buttons 920. The inputted UT number is displayed on the display screen 906D. Through the display, the user can confirm the inputted UT number. Further, the user can depress the correction button 915 to correct the inputted UT number to re-input another UT number.

The UT selling/buying kiosk terminal 90 converts the inputted desired UT number using the exchange rate of the current month and displays a resulting value of the conversion as an exchange amount of money on the display screen 906D. When the user who buys or sells the imaginary currency UT confirms the inputted desired UT number and the exchange amount of money, the user will depress the OK button 913.

Consequently, if the user selects buying of the imaginary currency UT, then the UT selling/buying kiosk terminal 90 displays a message requesting the user to pay the cash on the display screen 906D and enters a cash payment accepting preparation mode. Thus, the user will throw in necessary cash into the bill slot 917 and/or the coin slot 918. The amount of money thrown in is displayed on the screen of the display screen 906D. If the cash of an amount of money equal to or greater than the exchange amount of money, then the UT selling/buying kiosk terminal 90 accepts the exchange amount of money and writes the UT number after incremented by the bought UT number into the memory 832 of the electronic coin 80. If some change remains, then the UT selling/buying kiosk terminal 90 returns the change and discharges the electronic coin 80 from the electronic coin slot 916.

Further, if the user selects selling of the imaginary currency UT, then when the OK button 913 is depressed, the UT selling/buying kiosk terminal 90 discharges cash of an amount of money displayed as the exchange amount of money on the display screen 906D through the returning money receiver 919. Further, the UT selling/buying kiosk terminal 90 rewrites the remaining UT number in the memory of the electronic coin 80 with the remaining UT number after decremented by the sold UT number and discharge the electronic coin 80 from the electronic coin slot 916.

Operation of the UT selling/buying kiosk terminal 90 when the imaginary currency UT is sold or bought through the electronic coin 80 is described with reference to FIGS. 51 and 52. The operation of the UT selling/buying kiosk terminal 90 is executed principally as controlling operation by the control section 900.

Figure 51:
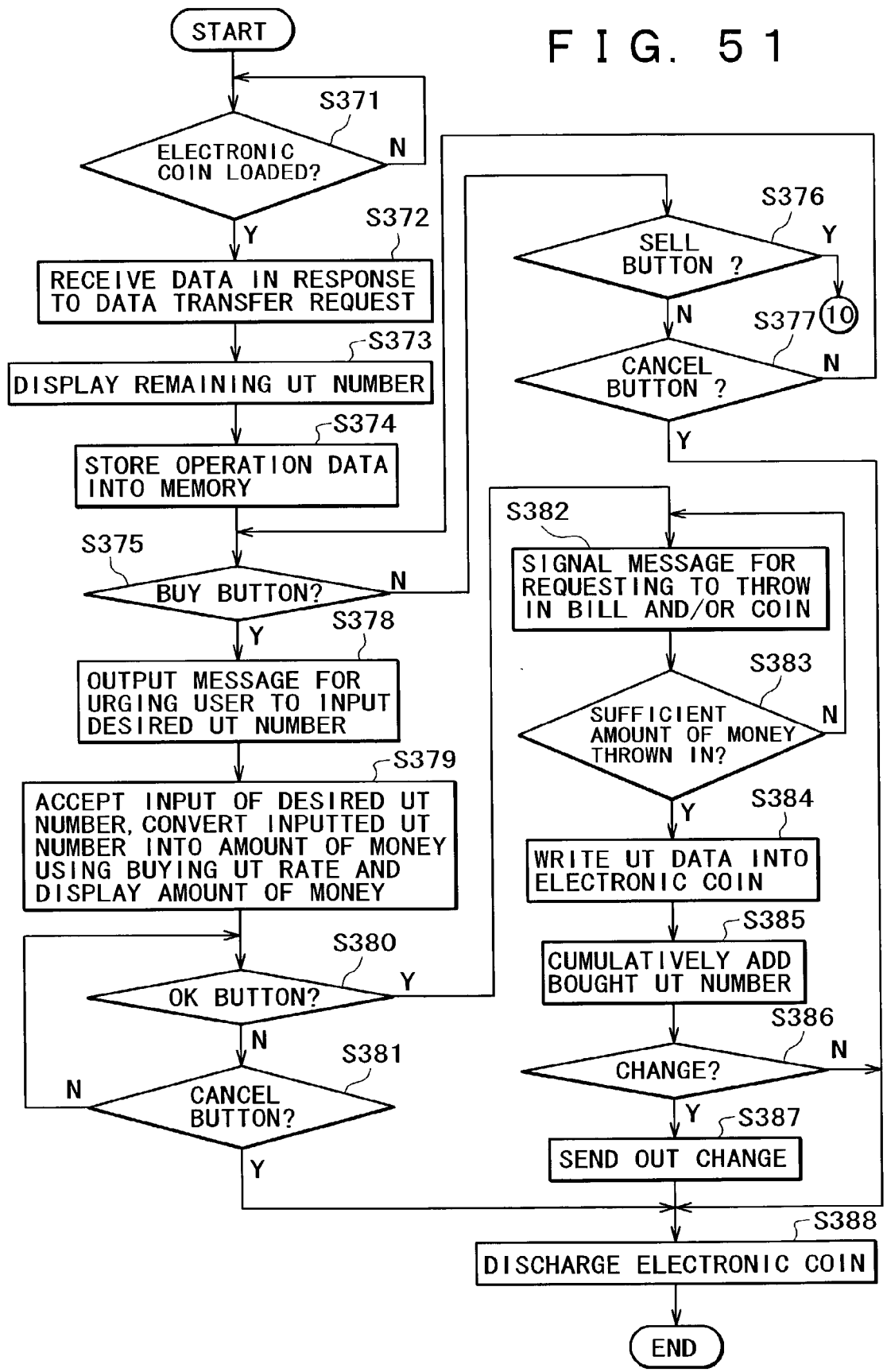
FIGS. 51 and 52 are flow charts illustrating processing operation of the terminal apparatus shown in FIG. 49.

Referring first to FIG. 51, the UT selling/buying kiosk terminal 90 discriminates through the optical or electronic element described hereinabove whether or not an electronic coin 80 is thrown in from the electronic coin slot 916 (step S371). If it is discriminated that an electronic coin 80 is thrown in, then the UT selling/buying kiosk terminal 90 transmits a data transfer request to the electronic coin 80 and receives the remaining UT number and operation data from the electronic coin 80 in response to the data transfer request (step S372). Then, the UT selling/buying kiosk terminal 90 displays the received remaining UT number on the display screen 906D (step S373) and stores the operation data into the memory 910 (step S374).

Then, the control section 900 of the UT selling/buying kiosk terminal 90 discriminates whether or not the UT buying button 911 is depressed by the user (step S375). If the control section 900 discriminates that the UT buying button 911 is not depressed, then it discriminates whether or not the UT selling button 912 is depressed by the user (step S376). If the control section 900 discriminates that the UT selling button 912 is not depressed either, then it discriminates whether or not the cancel button 914 is depressed (step S377). If the control section 900 discriminates that the cancel button 914 is depressed, then the UT selling/buying kiosk terminal 90 discharges the electronic coin 80 therefrom (step S388) and ends its processing. On the other hand, if the control section 900 discriminates that the cancel button 914 is not depressed, then the processing returns to step S375, at which it waits for an operation of the UT buying button 911 or the UT selling button 912.

If it is discriminated at step S375 that the UT buying button 911 is depressed, then the UT selling/buying kiosk terminal 90 displays a message for urging the user to input the user's desired UT number on the display screen 906D (step S378). The user will observe the display and input the user's desired UT number. Thus, the UT selling/buying kiosk terminal 90 accepts and converts the inputted desired UT number into an amount of money using the UT rate for buying of the current month, and displays the amount of money as an exchange amount of money on the display screen 906D (step S379).

As described above, when the user wants to settle the desired UT number, the user depresses the OK button 913, but when the user wants to stop buying of the imaginary currency UT, then the user depresses the cancel button 914. Thus, the UT selling/buying kiosk terminal 90 discriminates whether or not the OK button 913 is depressed (step S380). If the OK button 913 is not depressed, then the UT selling/buying kiosk terminal 90 discriminates whether or not the cancel button 914 is depressed (step S381). If the cancel button 914 is depressed, then the processing advances to step S388, at which the UT selling/buying kiosk terminal 90 discharges the electronic coin 80 and ends its processing. However, if it is discriminated at step S381 that the cancel button 914 is not depressed, then the processing returns to step S380, at which the UT selling/buying kiosk terminal 90 waits for an operation of the OK button 913.

If it is discriminated at step S380 that the OK button 913 is depressed, then the UT selling/buying kiosk terminal 90 signals a message for requesting throwing in of the exchange amount of money (step S382). Then, the UT selling/buying kiosk terminal 90 counts bills and/or coins thrown in by the user and discriminates whether or not bills and/or coins of an amount of money sufficient for the exchange amount of money have been thrown in (step S383). If the UT selling/buying kiosk terminal 90 confirms throwing in of a sufficient amount of money, then it accepts the amount of money equal to the displayed amount of money and sends data of the total UT number of the remaining UT number and the UT number bought newly and a remaining UT number rewriting request to the electronic coin 80 (step S384). The electronic coin 80 thus rewrites the remaining UT number in the memory 832 with the received UT number.

Then, the UT selling/buying kiosk terminal 90 cumulatively adds the bought UT number to the bought UT number till then and stores a resulting value into the memory 910 (step S385). Then, the UT selling/buying kiosk terminal 90 discriminates whether or not a change is required for the amount of money thrown in by the user with respect to the exchange amount of money (step S386). If a change is required, then the UT selling/buying kiosk terminal 90 sends out the change to the returning money receiver 919 (step S387), whereafter the processing advances to step S388. However, if no change is required, then the processing advances directly to step S388. At step S388, the UT selling/buying kiosk terminal 90 discharges the electronic coin 80 and then ends its processing.

Figure 52:
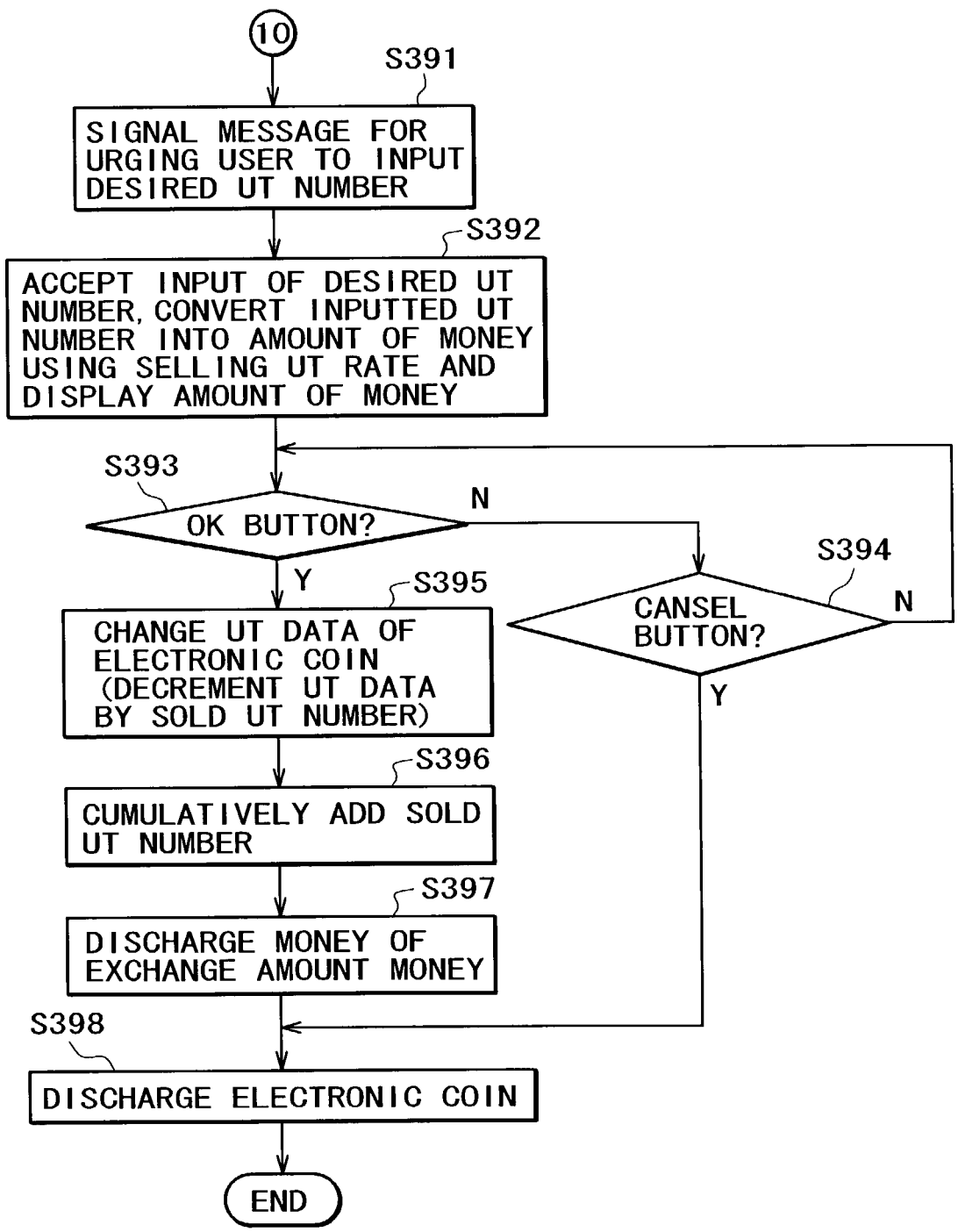

On the other hand, if it is discriminated at step S376 that the UT selling button 912 is depressed, then the UT selling/buying kiosk terminal 90 displays a message for urging the user to input a desired UT number on the display screen 906D (step S391 of FIG. 52). The user will observe the display and input a UT number desired to be sold. Consequently, the UT selling/buying kiosk terminal 90 accepts the inputted desired UT number and converts the inputted UT number into an amount of money using the UT rate for selling of the current month, and displays the amount of money as an exchange amount of money on the display screen 906D (step S392).

As described above, when the user wants to settle the desired UT number, the user depresses the OK button 913, but when the user wants to stop selling of the imaginary currency UT, the user depresses the cancel button 914. Thus, the UT selling/buying kiosk terminal 90 discriminates whether or not the OK button 913 is depressed (step S393). If the OK button 913 is not depressed, then the UT selling/buying kiosk terminal 90 discriminates whether or not the cancel button 914 is depressed (step S394). If the cancel button 914 is depressed, then the processing advances to step S398, at which the UT selling/buying kiosk terminal 90 discharges the electronic coin 80, thereby ending the processing. If it is discriminated at step S394 that the cancel button 914 is not depressed, then the processing returns to step S393, at which the UT selling/buying kiosk terminal 90 waits for an operation of the OK button 913.

If it is discriminated at step S393 that the OK button 913 is depressed, then the UT selling/buying kiosk terminal 90 sends data of a UT number obtained by subtracting the sold UT number from the remaining UT number and a remaining UT number rewriting request to the electronic coin 80. The electronic coin 80 rewrites the remaining UT number in the memory 832 with the received UT number (step S395).

Then, the UT selling/buying kiosk terminal 90 cumulatively adds the sold UT number to the sold UT number in the past and stores a resulting value into the memory 910 (step S396). Then, the UT selling/buying kiosk terminal 90 sends out the exchange amount of money to the returning money receiver 919 (step S397) and discharges the electronic coin 80 (step S398), thereby ending the processing.

As described above, the UT selling/buying kiosk terminal 90 acquires, upon selling or buying of the imaginary currency UT, operation data stored in the memory 832 of the electronic coin 80 and stores the operation data into the memory 910. Further, the UT selling/buying kiosk terminal 90 stores also data of the sold or bought UT number into the memory 910. The data stored in the UT selling/buying kiosk terminal 90 are transmitted to the time charge management company 21 when a transmission request is received from the time charge management company 21.

Figure 53:
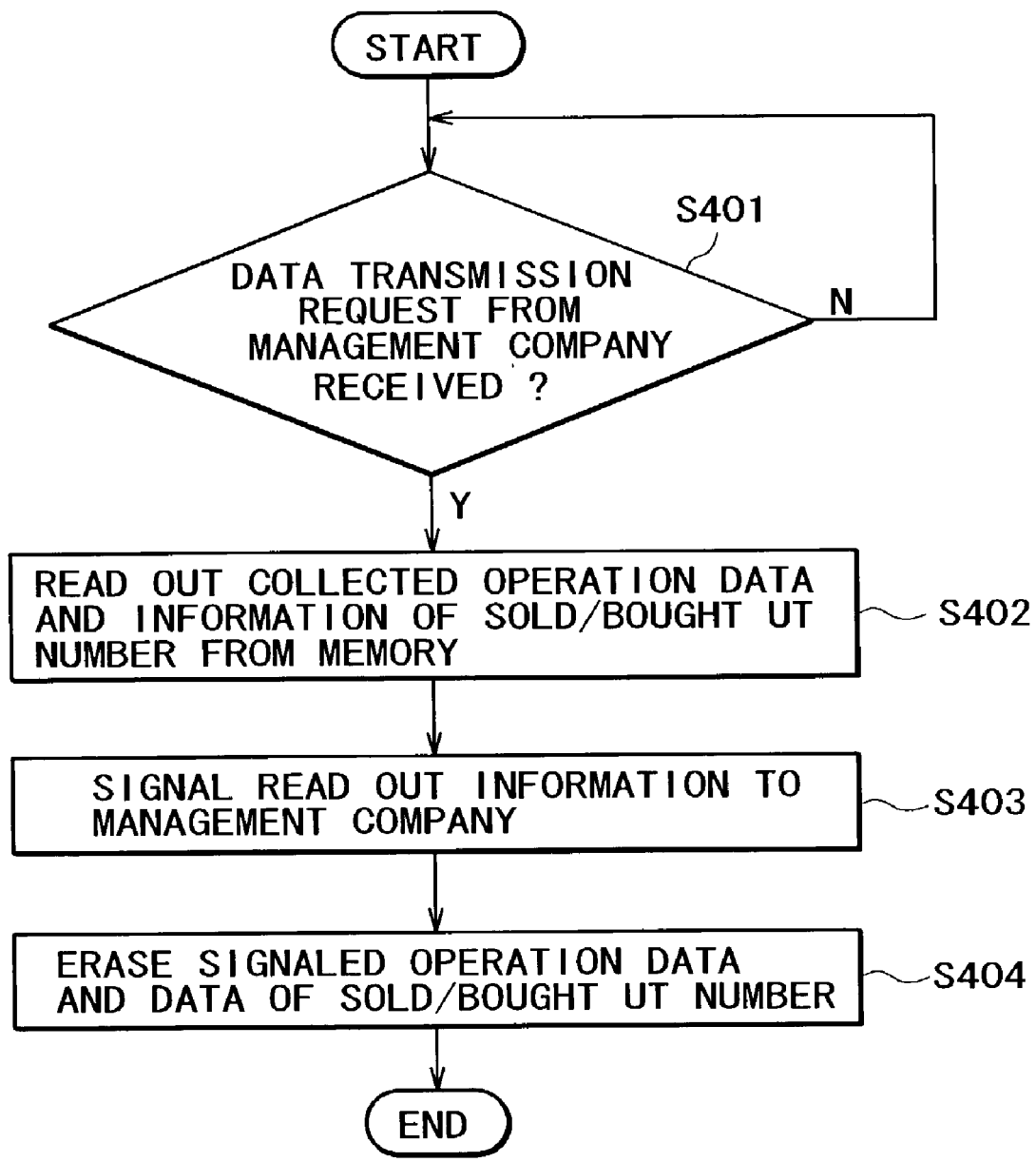
FIG. 53 is a flow chart illustrating different processing operation of the terminal apparatus shown in FIG. 49.

Processing operation of the UT selling/buying kiosk terminal 90 when a transmission request from the time charge management company 21 is received is described with reference to FIG. 53.

First, the UT selling/buying kiosk terminal 90 supervises whether or not a transmission request from the time charge management company 21 is received (step S401). If a transmission request is received, then the UT selling/buying kiosk terminal 90 reads out operation data including information regarding the use time period collected from the electronic coin 80 and data of the bought UT number and the sold UT number from the memory 910 (step S402), and signals the read out data to the time charge management company 21 (step S403). Thereafter, the UT selling/buying kiosk terminal 90 erases the operation data and the data of the sold or bought UT number from the memory 910 (step S404).

The charging management system 210 of the time charge management company 21 in the present embodiment determines, at the end of every month, the exchange rate of the imaginary currency UT for the next month from the cumulative value of the use time periods of the electronic apparatus 30 and the contents and the cumulative value of the sold and bought numbers of the imaginary currency UT in the month, and publishes the exchange rate on the homepage and sends the exchange rate to the UT selling/buying kiosk terminal 90 so that the exchange rate may be used as the exchange rate for the next month by the UT selling/buying kiosk terminal 90.

Figure 54:
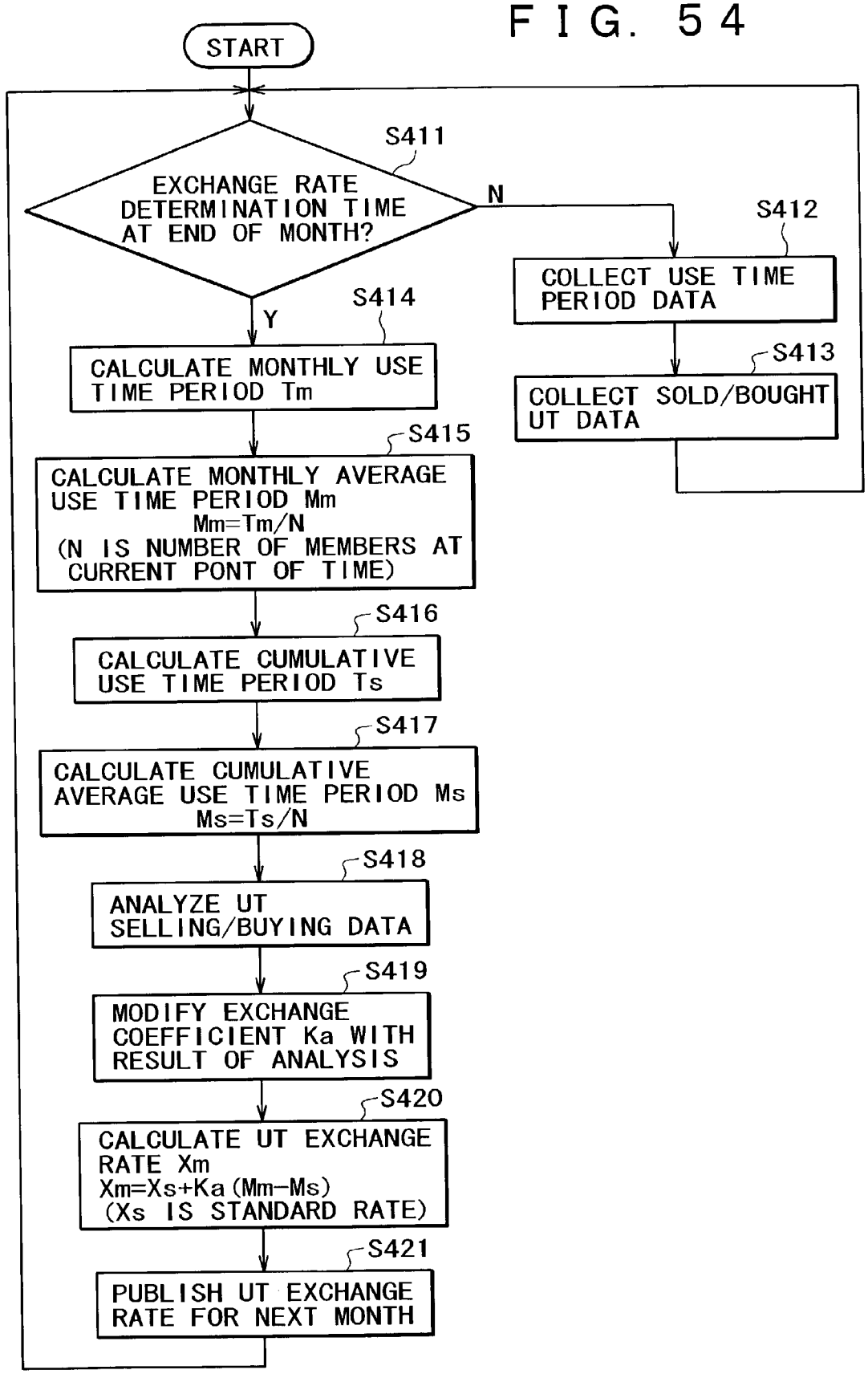
FIG. 54 is a flow chart illustrating processing operation of a charging management system used in the eighth embodiment.

Processing of the charging management system 210 of the time charge management company 21 is described with reference to FIG. 54. The flow chart of FIG. 54 illustrates operation executed by, for example, the control section in the charging management system 210.

The charging management system 210 first discriminates whether or not a determination time for the exchange rate of the imaginary currency UT is reached (step S411). If a determination time for the exchange rate is not reached, then the charging management system 210 collects data of the use time period of the electronic apparatus 30 from the UT selling/buying kiosk terminal 90 as described hereinabove (step S412) and collects data of the sold or bought UT number (step S413).

On the other hand, if it is discriminated at step S411 that a determination time for the exchange rate is reached, then the charging management system 210 calculates a sum total Tm of the use time period in the month from the collected data of the use time period (step S414). Then, where the number of members at the point of time is N, the charging management system 210 determines a monthly average use time period Mm in accordance with the following expression:

$$Mm=Tm/N$$

(step S415).

Then, the charging management system 210 calculates a cumulative use time period Ts till then regarding the electronic apparatus 30 (step S416). Then, the charging management system 210 divides the cumulative use time period Ts by the total member number N obtained by adding all of the cumulative number of members for the individual months to determine a cumulative average use time period Ms. In particular, the charging management system 210 determines the cumulative average use time period Ms in accordance with the following expression:

$$Ms=Ts/N$$

(step S417).

Then, the charging management system 210 analyzes the collected data of the sold and bought UT number (step S418) and modifies an exchange coefficient Ka to be used for determination of the exchange rate with a result of the analysis (step S419). In this instance, if the bought UT number is greater than the sold UT number, the exchange coefficient Ka is modified in a direction in which the UT exchange rate is raised, but if the bought UT number is smaller than the sold UT number, then the exchange coefficient Ka is modified in another direction in which the UT exchange rate is lowered.

Then, the charging management system 210 determines a UT exchange rate Xm for the next month in accordance with the following expression:

$$Xm=Xs+Ka(Mm-Ms)$$

(step S420), where Xs is the standard UT exchange rate. The standard UT exchange rate Xs is an exchange rate of the imaginary currency UT with respect to a standard charging unit determined in advance for the use time period of the electronic apparatus 30. In the expression above, the standard UT exchange rate Xs may be replaced by the UT exchange rate of the last month.

Then, the charging management system 210 publishes the UT exchange rate determined in such a manner as described above as the exchange rate for the next month on the homepage and sends the UT exchange rate to the UT selling/buying kiosk terminal 90 (step S421).

The charging management system 210 of the time charge management company 21 determines the UT exchange rate for the next month taking the use time period of the past and the sold and bought UT number into consideration as described above.

In this instance, as the monthly average use time period Mm of the current month is shorter by a greater amount than the cumulative average use time period of the past and as the bought number of the imaginary currency UT decreases, the UT exchange rate for the next month becomes lower. Accordingly, the equivalent to the use of the electronic apparatus 30 and/or contents becomes lower, and therefore, the use of the electronic apparatus 30 and/or contents is urged. Further, desire to buy for the imaginary currency UT is promoted and the bought UT number increases. However, the sold UT number decreases.

On the other hand, as the monthly average use time period Mm of the current month is longer by a greater amount than the cumulative average use time period of the past and as the bought number of the imaginary currency UT increases, the UT exchange rate for the next month becomes higher. Accordingly, the equivalent to the use of the electronic apparatus 30 and/or contents becomes higher, and therefore, the use of the electronic apparatus 30 and/or contents is suppressed. Further, desire to buy for the imaginary currency UT is degraded and the bought UT number decreases. However, the sold UT number increases.

As described above, according to the present embodiment, since the imaginary currency UT is handled as a variable currency, the use of the electronic apparatus 30 and/or contents by the user can be averaged with a seasonal variation thereof minimized.

It is to be noted that the sold and bought UT number collected by the charging management system 210 of the time charge management company 21 includes not only the sold and bought UT number from the UT selling/buying kiosk terminal 90 but also the sold and bought UT number of the imaginary UT selling and buying market 200 shown in FIG. 40. Subsequently, description is given of the imaginary UT selling and buying market 200.

Figure 55:
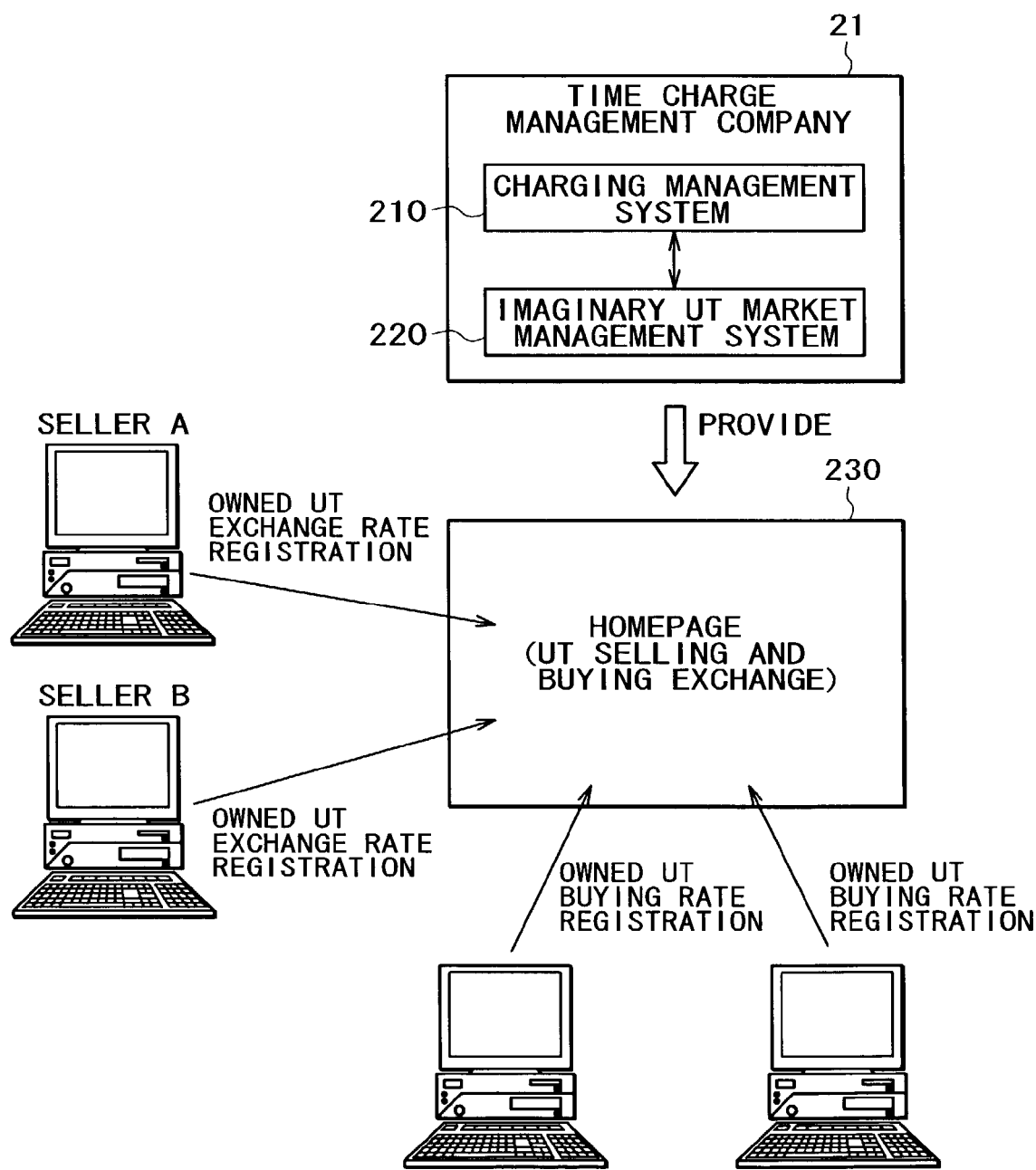
FIG. 55 is a diagrammatic view illustrating a concept of an imaginary selling/buying market of the imaginary currency UT in the eighth embodiment.

FIG. 55 illustrates a mechanism of the imaginary UT selling and buying market 200. Referring to FIG. 55, a homepage 230 provided by an imaginary UT market management system 220 of the time charge management company 21 serves as a marketing location of the imaginary UT buying and selling market. Only the members registered in the time charge management company 21 are permitted to buy and sell the imaginary currency UT on the homepage 230. The charging management system 210 performs membership authentication of a user who issues a registration request as a seller or a buyer and rejects such registration if the user is not a member.

A member who wants to sell the imaginary currency UT owned thereby performs seller registration through the homepage 230 and registers a desired UT selling rate. The seller registration and the incidental desired UT selling rate registration can be changed only after a fixed time period elapses after the registration. The charging management system 210 stores the date of the seller registration of the member and accepts an alteration to the seller registration and an alteration to the desired UT selling rate after the fixed time period elapses counting from the registration date.

Meanwhile, a member who makes seller registration is restricted so that it cannot become a buyer of the imaginary currency UT while it remains a seller. If a member registered as a seller accesses as a buyer, then the imaginary UT market management system 220 rejects the UT buying access as an illegal access.

Buyer registration, that is, UT buying request, can be performed at any time. Upon registration of such UT buying request, a desired UT buying rate and a desired buying UT number are registered. Consequently, the imaginary UT market management system 220 reports that one of desired UT buying rates of sellers registered therein which is closest to the desired UT buying rate. If the buyer accepts buying at that rate, then the transaction comes into existence. The buyer can reject buying at that rate and re-register an altered desired UT buying rate. In this instance, as regards registration of a buying rate, first come, first served. Therefore, after such re-registration, the buyer may not buy the imaginary currency UT at the buying rate presented before the re-registration.

Figure 56:
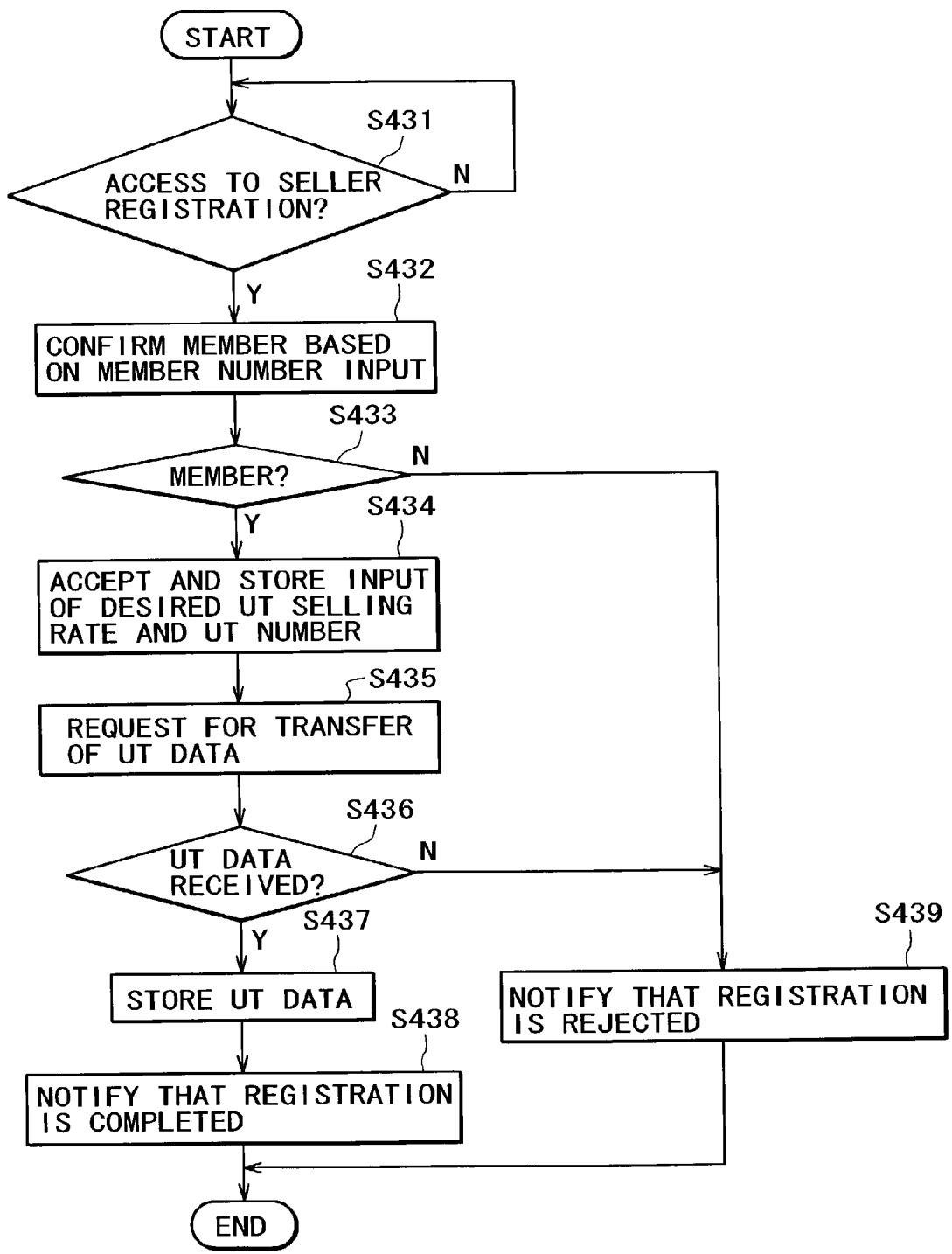
FIG. 56 is a flow chart illustrating processing operation upon seller registration in the imaginary selling/buying market of the imaginary currency UT in the eighth embodiment.

FIG. 56 illustrates processing operation of the imaginary UT market management system 220 upon seller registration. The processing operation of the flow chart of FIG. 56 is performed, for example, by a control section in the imaginary UT market management system 220.

Referring to FIG. 56, the imaginary UT market management system 220 first discriminates whether or not an access of a seller registration request is received (step S431). If the imaginary UT market management system 220 discriminates that such an access is received, then it performs membership confirmation based on an input of a member number of the accessing person (step S432). Then, the imaginary UT market management system 220 discriminates based on a result of the membership confirmation whether or not the accessing person is a member (step S433). If it is discriminated that the accessing person is not a member, then the imaginary UT market management system 220 notifies the accessing person through the homepage 230 that the seller registration of the accessing person is rejected (step S439), thereby ending the processing routine.

On the other hand, if it is discriminated at step S433 that the accessing person is a member, then the imaginary UT market management system 220 waits for inputting of a desired UT selling rate and a selling UT number and accepts such inputted desired UT selling rate and selling UT number, and then stores them together with the member number and the registration year, month and day into the memory provided in the imaginary UT market management system 220 (step S434).

Then, the imaginary UT market management system 220 issues a transfer request of the registered UT number of UT data to the member registered as a seller (step S435).

A UT data transfer adapter (not shown) is lent in advance to any member who wants to sell or buy the imaginary currency UT on the imaginary UT selling and buying market 200, and any member who wants to sell or buy the imaginary currency UT will connect the transfer adapter to a personal computer and throw an electronic coin 80 into the adapter. Then, if the member who is a seller inputs a desired UT selling number through the personal computer and inputs a transfer request, then the personal computer uses a transfer application of the adapter to accept the designated UT number from the electronic coin 80 and transmit it to the imaginary UT market management system 220. The electronic coin 80 rewrites the remaining UT number of the memory 832 with a value decremented by the acquired UT number.

The imaginary UT market management system 220 confirms whether or not UT data from the seller are received (step S436), and if it discriminates that UT data are not received, then it notifies the member that the member cannot be registered as a seller and deletes the relating contents registered in the memory (step S439).

On the other hand, if UT data are received, then the imaginary UT market management system 220 stores the received UT data in a coordinated relationship with the registration information of the member into the memory (step S437). Thereafter, the imaginary UT market management system 220 notifies the member of completion of the registration (step S438), thereby ending the seller registration processing routine.

Figure 57:
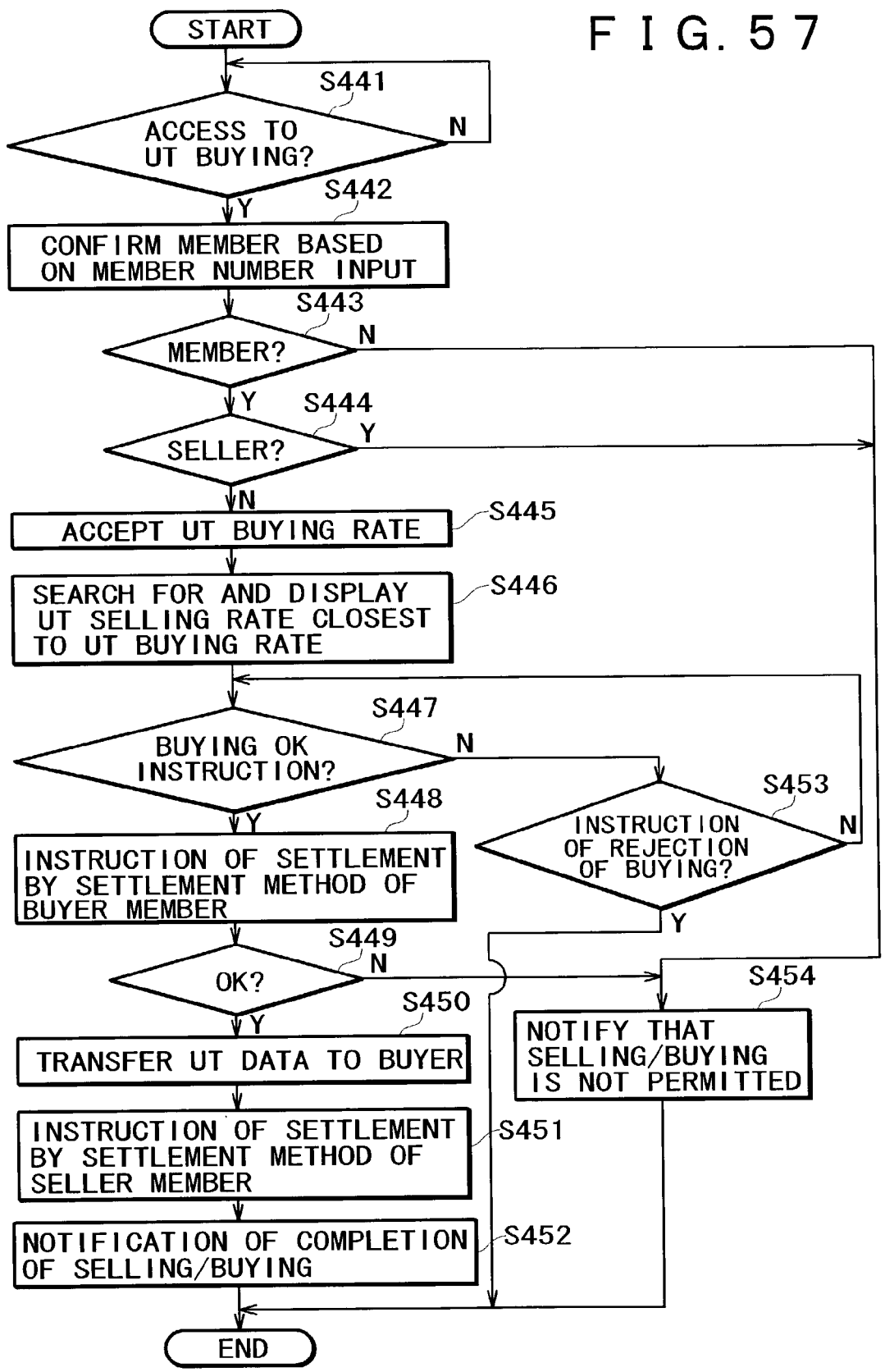
FIG. 57 is a flow chart illustrating processing operation upon buyer registration in the imaginary selling/buying market of the imaginary currency UT in the eighth embodiment.
Figure 58:
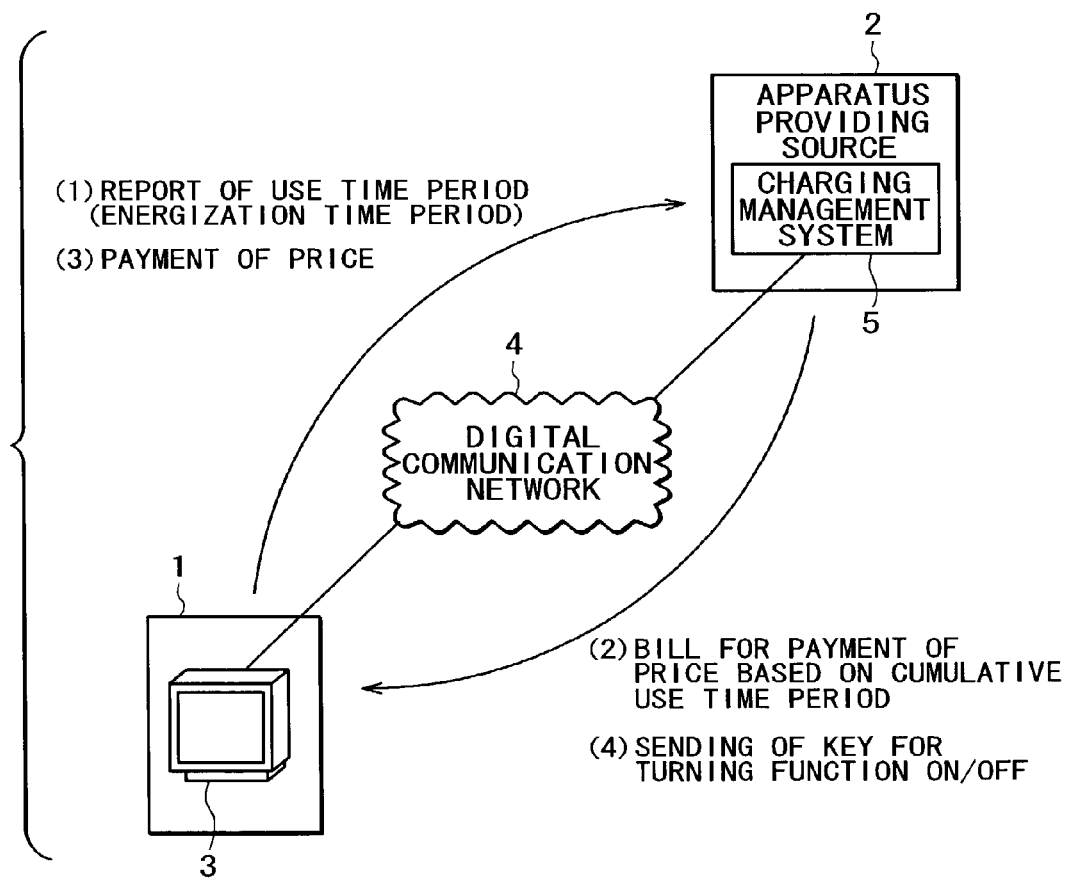
FIG. 58 is a diagrammatic view showing an outline of a time period charging system proposed formerly.
Figure 60:
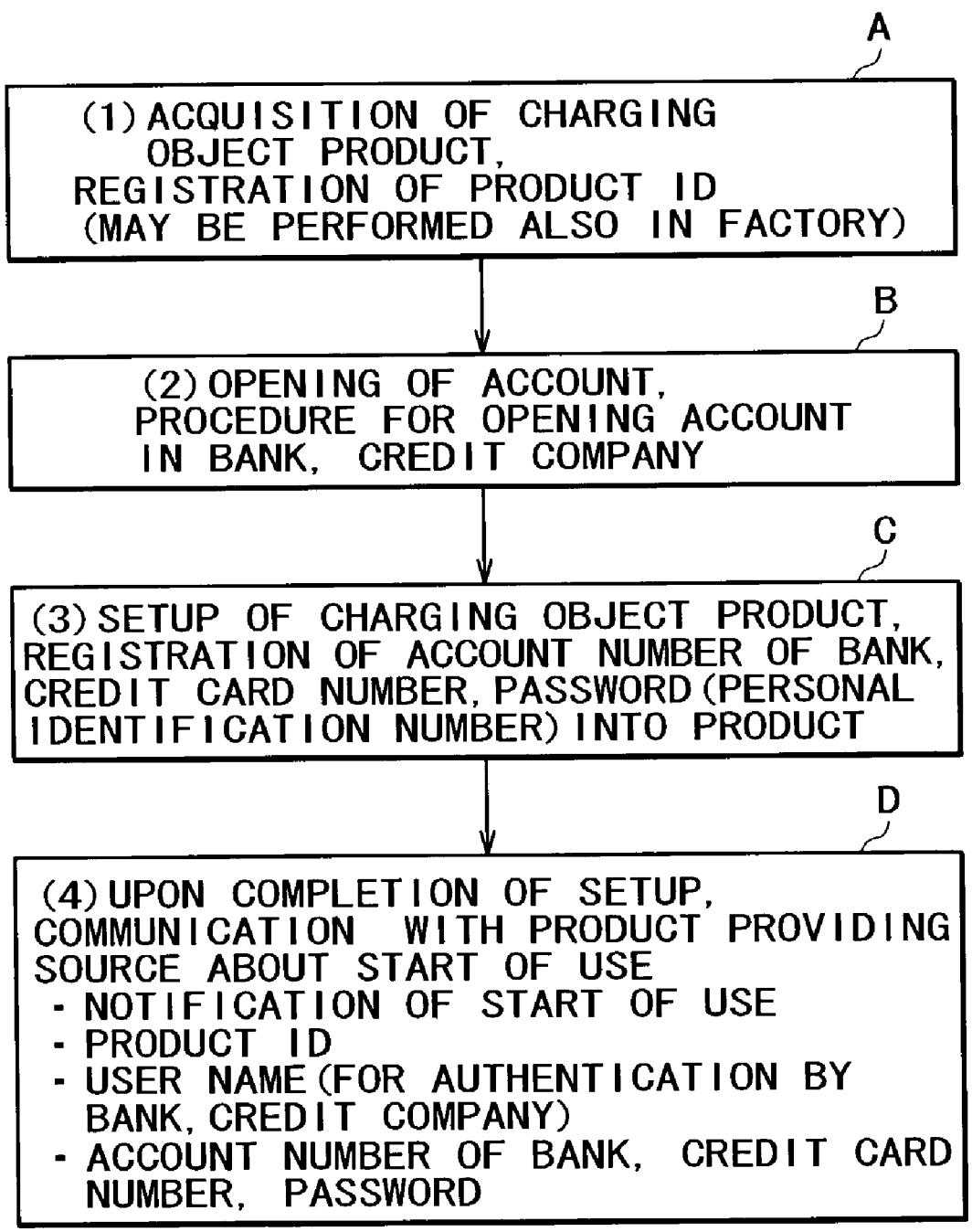
FIG. 60 is a flow chart illustrating a procedure before an electronic apparatus is used in the time period charging system of FIG. 58.
Figure 61:
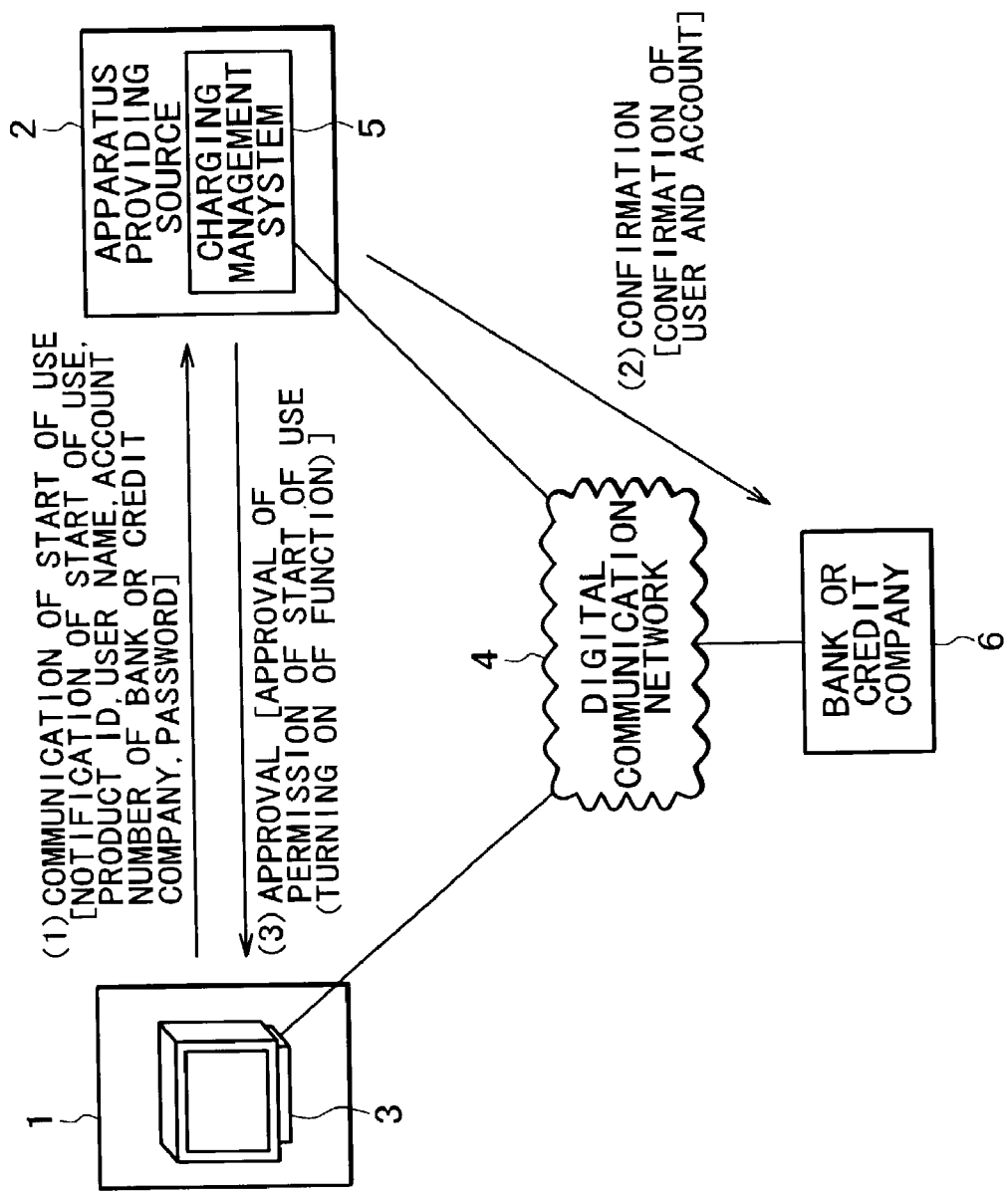
FIG. 61 is a diagrammatic view illustrating the procedure illustrated in FIG. 60.
Figure 62:
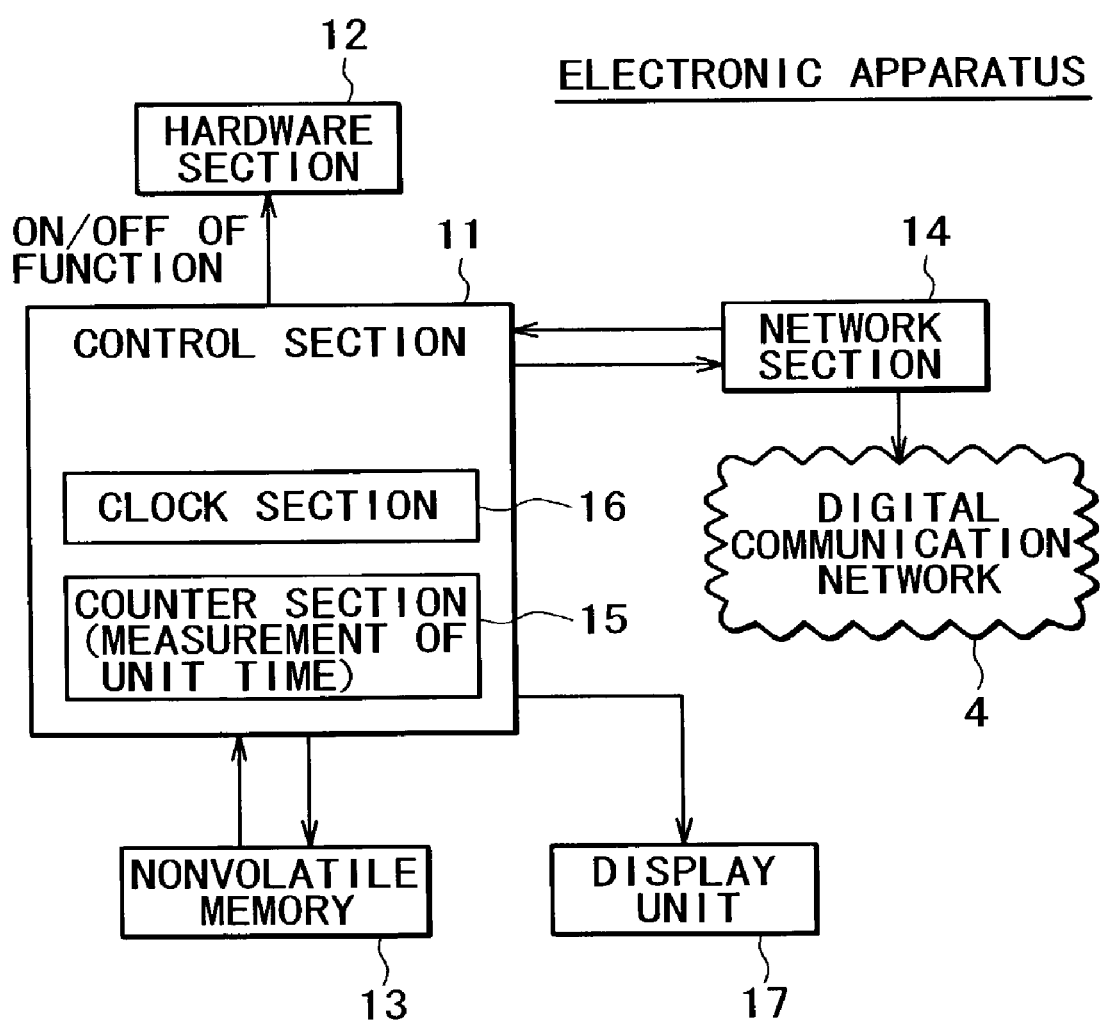
FIG. 62 is a block diagram showing an example of a configuration of an electronic apparatus used in the time period charging system of FIG. 58.
Figure 63:
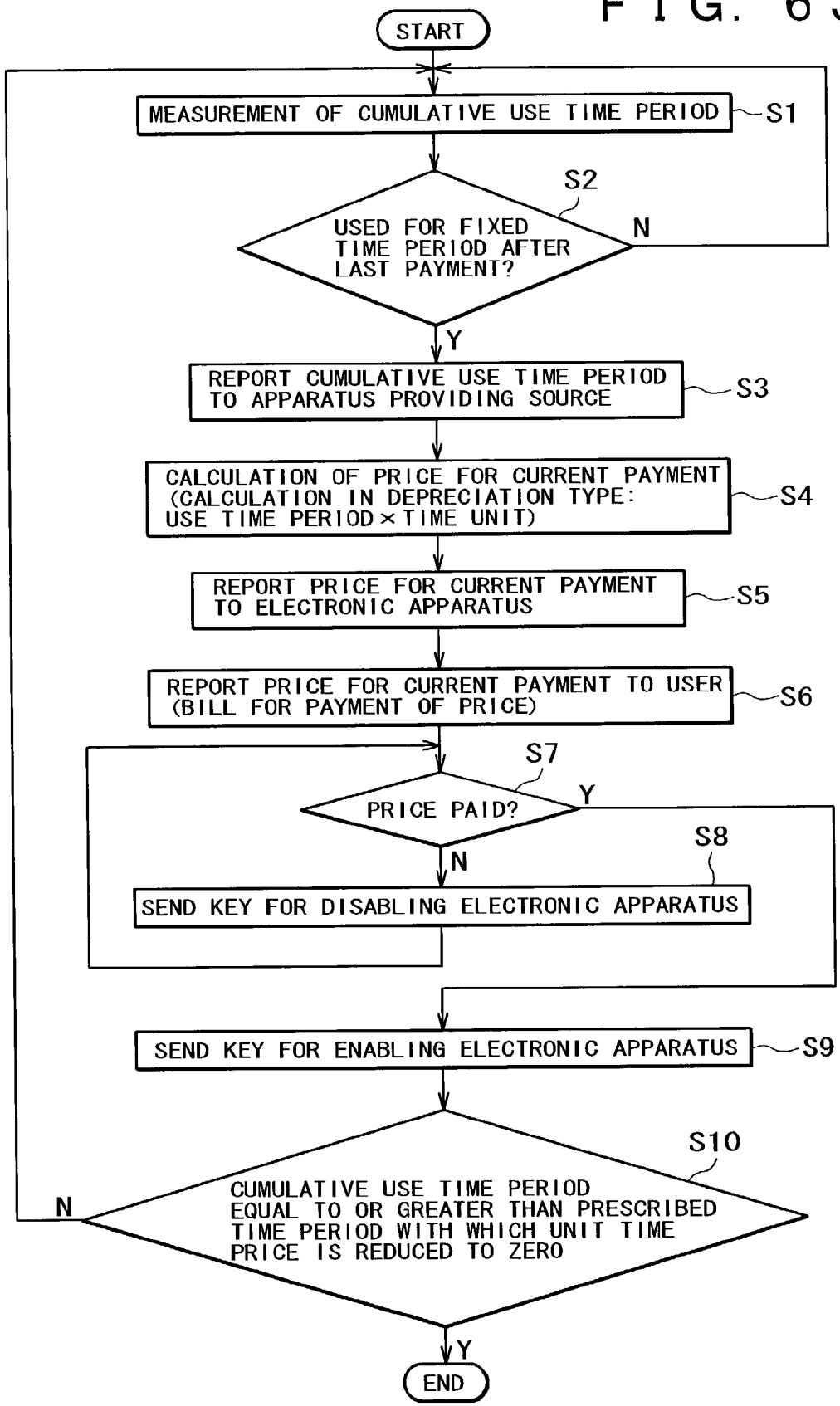
FIG. 63 is a flow chart illustrating a flow of a charging process in the time period charging system of FIG. 58.
Figure 64:
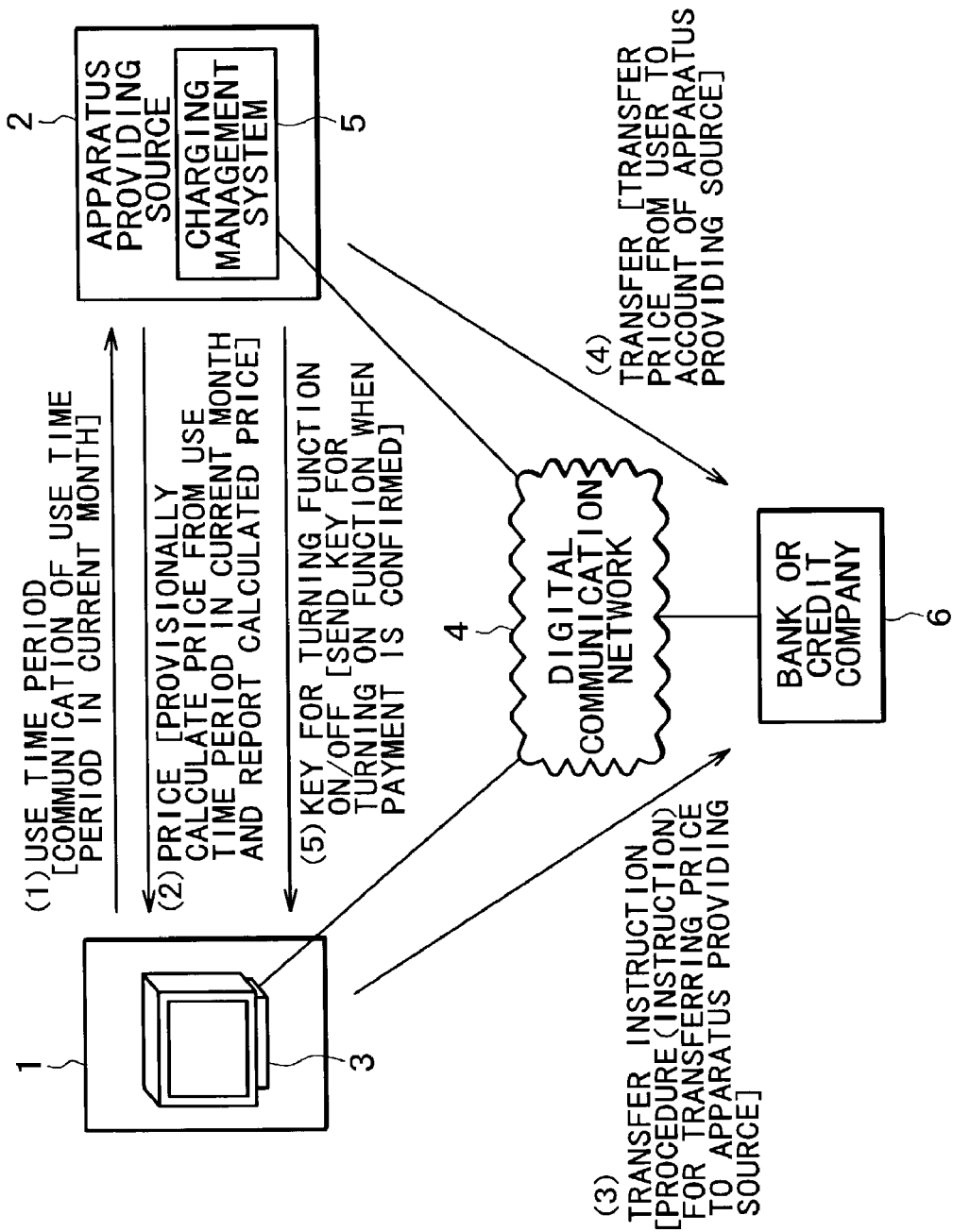
FIG. 64 is a block diagram illustrating a flow of a payment process in the time period charging system of FIG. 58.

Subsequently, processing operation of the imaginary UT market management system 220 when a seller registers a UT buying request and sells the imaginary currency UT is described with reference to FIG. 57. The flow chart of FIG. 57 illustrates operation performed, for example, by the control section in the imaginary UT market management system 220.

The imaginary UT market management system 220 first discriminates whether or not there is an access of a UT buying request (step S441). If the imaginary UT market management system 220 discriminates that there is an access of a UT buying request, then it performs membership confirmation based on an input of a member number of the accessing person (step S442). Then, the imaginary UT market management system 220 discriminates based on a result of the membership confirmation whether or not the accessing person is a member (step S443). If the imaginary UT market management system 220 discriminates that the accessing person is not a member, then it notifies the accessing person through the homepage that the registration for the accessing person is not permitted (step S454), thereby ending the processing routine.

If it is discriminated at step S443 that the accessing person is a member, then the imaginary UT market management system 220 discriminates whether or not the accessing person is a member registered already as a seller (step S444). If the accessing person is a member registered as a seller, then the imaginary UT market management system 220 notifies the accessing person through the homepage that registration of the accessing person is rejected (step S454), thereby ending the processing routine.

If it is discriminated at step S444 that the accessing person is not a seller, then the imaginary UT market management system 220 accepts registration of the accessing person as a buyer and accepts an input of a desired UT buying rate and UT number (step S445). Then, the imaginary UT market management system 220 searches for a selling rate closest to the accepted desired UT buying rate from among desired UT selling rates registered by registered sellers stored in the memory and displays the searched out selling rate on the homepage (step S446).

If the member of the buyer who sees the UT buying rate on the homepage wants to buy the imaginary currency UT at that rate, then the member inputs a buying acceptance instruction, but on the contrary if the member rejects buying at that rate, then the member inputs a buying rejection input. Thus, the imaginary UT market management system 220 discriminates whether or not a buying acceptance instruction is inputted (step S447). If a buying acceptance instruction is not inputted, then the imaginary UT market management system 220 discriminates whether or not a buying rejection instruction is inputted (step S453). If a buying rejection instruction is not inputted, then the processing returns to step S447, at which the imaginary UT market management system 220 waits for inputting of a buying acceptance instruction. Then, if a buying rejection instruction is inputted, then the processing routine is ended. The member needs to perform buyer registration again for changing instruction of the desired buying rate.

If it is discriminated at step S447 that a buying acceptance instruction is inputted, then the imaginary UT market management system 220 refers to a database of the member of the buyer and instructs the charging management system 210 of a settlement method of the member registered in the database (step S448).

Thus, a notification regarding whether or not settlement for the member is possible is returned from the charging management system 210. Therefore, the imaginary UT market management system 220 discriminates based on the notification whether or not settlement is possible (step S449). If it is discriminated that settlement is impossible from some reason, then the processing advances to step S454, at which the imaginary UT market management system 220 notifies the accessing person through the homepage that the registration is not permitted, thereby ending the processing routine.

If it is discriminated at step S449 that settlement is possible, then the imaginary UT market management system 220 transfers the bought UT data to the member of the buyer (step S450). The member of the buyer receives the UT data transferred thereto through the personal computer thereof and the adapter and rewrites the remaining UT number of the memory 832 of the electronic coin 80 so that it may have a value increased by the bought UT number.

Thereafter, the imaginary UT market management system 220 refers to a database also of the member of the seller and instructs the charging management system 210 of settlement by a settlement method of the member registered in the database (step S451). Then, the imaginary UT market management system 220 notifies the buyer of completion of the selling and buying through the homepage (step S452), thereby ending the processing routine.

Buying and selling of the imaginary currency UT is performed in such a manner as described above. It is to be noted that, even when the UT number registered by a seller and the UT number desired by a buyer to buy do not coincide with each other, if the UT number registered by the seller is greater than the UT number desired to buy, then buying and selling of the imaginary currency UT between them can be materialized. Further, also when a plurality of sellers indicate an equal selling rate and the sum total of the UT numbers of the sellers is greater than the UT number desired to buy, selling and buying between them can be materialized. In this instance, the imaginary currency UT may be sold preferentially from the selling person who has registered comparatively early.

Also the number of the imaginary currency UT sold and bought in this manner is used for determination of the UT exchange rate for the next month described hereinabove. To this end, the imaginary UT market management system 220 reports the number of the imaginary currency UT sold and bought in the month to the charging management system 210.

According to the eighth embodiment described above, since the imaginary currency UT is used, the unit price for the use time period can be varied readily, and an imaginary UT market can be provided to buy the imaginary currency at a desired exchange rate, which is very convenient.

It is to be noted that, while, in the eighth embodiment described above, the electronic circuit of the electronic coin 80 performs a charging process for the use time period, it is otherwise possible to use another configuration wherein a charging processing section is provided in the electronic apparatus 30 and the electronic coin 80 receives a result of a charging process for the use time period from the charging processing section.

Other Modifications

It is to be noted that, while, in the first to third embodiments described hereinabove, a charging process based on the use time period of the electronic apparatus 30 is performed without fail because it is presupposed that the electronic apparatus 30 is an object of charging based on a substantial use time period and use of the electronic apparatus 30 is always chargeable, the present invention can be applied also to charging based on a substantial use time period of contents on an electronic apparatus which itself is bought. In this instance, since the electronic apparatus is bought, any processing for time period charging with regard to use of the apparatus is unnecessary.

Further, a use price of contents need not necessarily be calculated independently, but when a chargeable time period with regard to use of an electronic apparatus is calculated, chargeable time period calculation may be performed so as to include the contents use price in the apparatus use price. In this instance, in calculation of chargeable time periods of functions of the electronic apparatus which involve use of contents, the contents use price may be weighted so that the chargeable time period with regard to use of the contents may be included in the chargeable time period with regard to the use of the electronic apparatus. In the case just described, measurement of the contents chargeable time period is unnecessary.

Further, in the fourth embodiment described hereinabove, a charging process based on prepayment information is performed by the electronic apparatus side based on the chargeable time period Ct with regard to use of the contents and the chargeable time period Dt with regard to use of the apparatus. However, naturally it is possible to send the chargeable time period Ct with regard to use of contents and the chargeable time period Dt with regard to use of the apparatus to the charging management system 210 so that a charging process may be executed based on the chargeable time periods Ct and Dt by the charging management system 210 side in a similar manner as in the first or second embodiment described hereinabove.

While preferred embodiments of the present invention have been described using specific terms, such description is for illustrative purposes only, and it is to be understood that changes and variations may be made without departing from the spirit or scope of the following claims.

What is claimed is:

1. An electronic apparatus, comprising:
a determination module that:
determines whether contents data is proprietary or non-proprietary, such that:
when the contents data is proprietary, a user is charged based on information representative of a time period within which the contents data is used and not based on an amount of contents data;
when the contents data is non-proprietary, the user is charged based on an amount of time for which said electronic apparatus is used and not based on an amount of contents data;
a contents data use time period measurement module that measures a time period for which the contents data is used;
an apparatus use time period measurement module that measures a time period for which said electronic apparatus is used; and
a charging processing module that produces,
when the determination module determines that the contents data is proprietary, information to be used by a charging process based on at least a result of the measurement of said contents data use time period measurement module;
when the determination module determines that the contents data is non-proprietary, information to be used by the charging process based on the result of the measurement of said apparatus use time period measurement module.

2. An electronic apparatus according to claim 1, wherein the contents data includes information regarding charging of the contents data, and said determination module determines, based on the information regarding the charging of the contents data, whether the contents data is proprietary or non-proprietary.

3. An electronic apparatus according to claim 2, wherein the contents data is stored on a storage medium, and said electronic apparatus further comprises a storage medium loading module into which the storage medium is loaded, wherein said the determination module determines, based on the information regarding the charging of the contents data stored on the storage medium loaded in said storage medium loading module, whether or not to charge the user based on the use of the contents data.

4. An electronic apparatus according to claim 2, wherein the information regarding the charging of the contents data includes information that limits the number of times of use of the contents data, and said electronic apparatus further comprises a use time number limitation module that limits the number of times of use of the contents data based on the information that limits the number of times of use, and a contents data use stopping module that stops use of the contents data by said electronic apparatus when the number of times of use of the contents data by said electronic apparatus exceeds the number of times of use limited by said use time number limitation module.

5. An electronic apparatus according to claim 2, wherein the information regarding charging of the contents data includes information regarding a use price of the contents data, and said charging processing module produces, when the determination module determines that the contents data is proprietary, information to be used by the charging process based on at least one of the results of the measurement of said contents data use time period measurement module and said apparatus use time period measurement module and the information regarding the use price of the contents data, when the determination module determines that the contents data is non-proprietary information to be used by the charging process based on the result of the measurement of said apparatus use time period measurement module.

6. An electronic apparatus according to claim 2, wherein the information regarding charging of the contents data at least includes information regarding a use price of the contents data and information regarding a use price of said electronic apparatus, and said charging processing module produces, when the determination module determines that the contents data is proprietary, information to be used by the charging process based on at least one of the results of the measurement of said contents data use time period measurement module and said apparatus use time period measurement module and at least one of the information regarding the use price of the contents data and the information regarding the use price of said electronic apparatus;

when the determination module determines that the contents data is non-proprietary, information to be used by the charging process based on the result of the measurement of said apparatus use time period measurement module and the information regarding the use price of said electronic apparatus.

7. An electronic apparatus according to claim 1, further comprising:

a storage module into which at least one of the information representative of the time period within which the contents data is used and the information representative of the time period within which said electronic apparatus is used is stored; and a signaling module that produces information to be used by the charging process based on the stored one or ones of the information representative of the use time period within which the contents data is used and the information representative of the time period within which said electronic apparatus is used and signaling the produced information to the outside of the electronic apparatus.

8. An electronic apparatus according to claim 1, wherein said charging processing module calculates information representative of a chargeable time period to be used for the charging process based on at least one of the information representative of the time period within which the contents data is used and the information representative of the time period within which said electronic apparatus is used, and said electronic apparatus further comprises a signaling module that signals the information regarding the chargeable time period to the outside of the apparatus.

9. An electronic apparatus according to claim 1, wherein said charging processing module rewrites information stored on a storage medium loaded in said electronic apparatus based on at least one of the information representative of the time period within which the contents data is used and the information representative of the time period within which said electronic apparatus is used.

10. An electronic apparatus according to claim 9, wherein the recording medium includes a memory into which a number of units of an imaginary currency is stored, and said charging processing module rewrites the number of units of the imaginary currency stored in the memory based on at least one of the information representative of the time period within which the contents data is used and the information representative of the time period within which said electronic apparatus is used.

11. An electronic apparatus according to claim 10, wherein said charging processing module converts at least one of the information representative of the time period within which the contents data is used and the information representative of the time period within which said electronic apparatus is used into a number of units of the imaginary currency, subtracts the number of units obtained by the conversion from the number of units of the imaginary currency stored in the memory and rewrites the number of units of the imaginary currency stored in the memory with the number of units obtained by the subtraction.

12. An electronic apparatus according to claim 1, further comprising:

a function execution module that executes a plurality of functions including at least a function of reproducing the contents data;

an operation inputting module that inputs an instruction to execute one of the functions; and a function execution control module that controls said function execution module to execute one of the functions designated by the instruction inputted by said operation inputting module;

wherein said contents data use time period measurement module measures execution time periods individually of the plurality of functions executed by said function execution module as time periods within which the contents data is used for individual functions.

13. An electronic apparatus according to claim 1, further comprising:

a function execution module that executes a plurality of functions including at least a function of reproducing the contents data;

an operation inputting module that inputs an instruction to execute one of the functions; and a function execution control module that controls said function execution module to execute one of the functions designated by the instruction inputted by said operation inputting module;

wherein said apparatus use time period measurement module measures execution time periods individually of the plurality of functions executed by said function execution module as time periods within which said electronic apparatus is used for individual functions.

14. An electronic apparatus according to claim 12, wherein said charging processing module performs weighting processing for the use time periods of the individual functions measured by said contents data use time period measurement module and said apparatus use time period measurement module individually corresponding to the functions based on execution time periods of the functions to calculate a chargeable time period of an object of charging.

15. An electronic apparatus according to claim 14, wherein said function execution control module includes a microprocessor, and the weighting processing is performed based on a load factor of said microprocessor used when each of the functions is executed.

16. A time period charging system, comprising;

at least one electronic apparatus including a determination module that:

determines whether contents data is proprietary or non-proprietary such that:

when the contents data is proprietary, a user is charged based on information representative of a time period within which the contents data is used and not based on an amount of contents data;

when the contents data is non-proprietary, the user is charged based on an amount of time for which said electronic apparatus is used and not based on an amount of contents data;

a contents data use time period measurement module that measures a time period for which the contents data is used;

an apparatus use time period measurement module that measures an operation time period of said electronic apparatus itself as a time period within which said electronic apparatus is used, a charging processing module that produces, when the determination module determines that the contents data is proprietary, information to be used by a charging process based on at least a result of the measurement of said contents data use time period measurement module;

when the determination module determines that the contents data is non-proprietary, information to be used by the charging process based on the result of the measurement of said apparatus use time period measurement module;

a signaling module that signals the information produced by said charging processing module; and a management apparatus, including:

an information management module that manages identification information for identifying said electronic apparatus, user identification information that identifies a user who uses said electronic apparatus and information regarding a settlement method by the user of said electronic apparatus, and a charge settlement module that performs a settlement process based on at least one of the identification information of said electronic apparatus and the user identification information signaled from said electronic apparatus and the information to be used by the charging process.

17. A time period charging system according to claim 16, wherein the contents data includes information regarding charging of the contents data, and said determination module determines, based on the information regarding the charging of the contents data, whether the contents data is proprietary or non-proprietary.

18. A time period charging system according to claim 17, wherein the contents data is stored on a storage medium, and said electronic apparatus further comprises a storage medium loading module into which the storage medium is loaded, and said determination module determines, based on the information regarding the charging of the contents data stored on the storage medium loaded in said storage medium loading module, whether or not to charge the user based on the use of the contents data.

19. A time period charging system according to claim 18, wherein the information regarding the charging of the contents data includes:

information representing a limit of the number of times of use of the contents data, and wherein said electronic apparatus further includes:

a use time number limitation module that limits a number of times of use of the contents data based on the information representing the limit of the number of times of use, and a contents data use stopping module that stops use of the contents data by said electronic apparatus when the number of times of use of the contents data by said electronic apparatus exceeds the number of times of use limited by said use time number limitation module.

20. A time period charging system according to claim 19, wherein said management apparatus further includes an information signaling module that signals information to cancel the limitation to the number of times of use of the contents data to said electronic apparatus, and said electronic apparatus further includes an acquisition module that acquires the information for canceling the limitation to the number of times of use of the contents data from said management apparatus and a use time number alteration module that alters the number of times of use of the contents data to a number of times of use greater than the number of times of use limited by said use time number limitation module.

21. A time period charging system according to claim 20, wherein the information to cancel the limitation to the number of times of use of the contents data is information regarding limitation to a new number of times of use of the contents data.

22. A time period charging system according to claim 20, wherein the information to cancel the limitation to the number of times of use of the contents data is required information for permitting further continued use of said electronic apparatus after the number of times by which said electronic apparatus is used becomes equal to the limited number of times of use.

23. A time period charging system according to claim 16, wherein said electronic apparatus further includes:

a function execution module that executes a plurality of functions including at least a function of reproducing the contents data;

an operation inputting module that inputs an instruction to execute one of the functions; and a function execution control module that controls said function execution module to execute one of the functions designated by the instruction inputted by said operation inputting module;

wherein said contents data use time period measurement module measures information regarding time periods within which the contents data is used based on information representative of a situation of use of the functions executed by said function execution module.

24. A time period charging system according to claim 16, wherein said electronic apparatus further includes:

a function execution module that executes a plurality of functions including at least a function of reproducing the contents data;

an operation inputting module that inputs an instruction to execute one of the functions; and a function execution control module that controls said function execution module to execute the one of the functions designated by the instruction inputted by said operation inputting module;

wherein said apparatus use time period measurement module measures information regarding time periods within which said electronic apparatus is used based on information representative of a situation of use of the functions executed by said function execution module.

25. A time period charging system according to claim 23, wherein said charging processing module performs weighting processing for the use time periods of the individual functions measured by said contents data use time period measurement module and said apparatus use time period measurement module individually corresponding to the functions based on the execution time periods of the functions to calculate a chargeable time period of an object of charging.

26. A time period charging system according to claim 25, wherein said function execution control module includes a microprocessor, and the weighting processing is performed based on a load factor of said microprocessor used when each of the functions is executed.

27. A time period charging system according to claim 25, wherein said electronic apparatus further includes a storage module that stores the information regarding the time period of use of the contents data and/or the information regarding the time period of use of said electronic apparatus as well as information representative of an operation situation of said electronic apparatus including information regarding any of the functions executed by said function execution module, and a transmission module that signals the information representative of the operation situation to said management apparatus.

28. A time period charging system according to claim 16, wherein said management apparatus further includes a notification module that issues a notification of an amount of money of the charge to be settled, a settlement time management module that manages a settlement time for payment of the amount of money from the user of said electronic apparatus, and a module that signals information that limits operation of said electronic apparatus to said electronic apparatus when said settlement time management module discriminates that a predetermined settlement process is not performed within a term for the settlement by payment, and said electronic apparatus further includes a module that executes a process that limits the operation of said electronic apparatus when the information that limits operation of said electronic apparatus is received.

29. A time period charging system according to claim 16, wherein said management apparatus further includes a notification module that issues a notification of an amount of money of the charge to be settled, a settlement time management module that manages a settlement time for payment of the amount of money from the user of said electronic apparatus, and a module that signals information for disabling said electronic apparatus to said electronic apparatus when said settlement time management module determines that a predetermined settlement process is not performed within a term for the settlement by payment, and said electronic apparatus further includes a module that executes a process to disable said electronic apparatus when the information to disable said electronic apparatus is received.

30. A time period charging system according to claim 16, wherein said management apparatus further includes a module that produces data for distributing information representative of the time period of use to at least one of a management company which owns said management apparatus, a company which provides said electronic apparatus, and a company which provides the contents data and a copyright holder of the contents data.

31. A time period charging system according to claim 16, wherein said electronic apparatus further includes a charging information calculation module that calculates information regarding a chargeable time period based on at least one of the information regarding the time period of use of the contents data and the information regarding the time period of use of said electronic apparatus, and said module of said electronic apparatus that signals the information to said management apparatus transmits the information regarding the chargeable time period to said management apparatus whereas said charge settlement module of said management apparatus performs charge settlement for the information regarding the time period of use of the contents data and/or the information regarding the time period of use of said electronic apparatus based on the information regarding the chargeable time period received from said electronic apparatus.

32. A method of producing information to be used by a charging process, comprising the steps of:
    determining, by an electronic apparatus, whether contents data is proprietary or non-proprietary, such that:
        when the contents data is proprietary, a user is charged based on information representative of a time period within which the contents data is used and not based on an amount of contents data;
        when the contents data is non-proprietary, the user is charged based on an amount of time for which the electronic apparatus is used and not based on an amount of contents data;
    measuring, by an electronic apparatus, at least one of a time period within which the contents data is used and a time period within which the electronic apparatus is used, based on a result of the determining; and producing, by an electronic apparatus,
    when it is determined that the contents data is proprietary, information to be used by the charging process based on at least information representative of the time period within which the contents data is used,
    when it is determined that the contents data is non-proprietary, information to be used by the charging process based on the information representative of the time period within which said electronic apparatus is used.

33. An electronic apparatus, comprising:
    a determination means that:
        determines whether contents data is proprietary or non-proprietary, such that:
            when the contents data is proprietary, a user is charged based on information representative of a time period within which the contents data is used and not based on an amount of contents data;
            when the contents data is non-proprietary, the user is charged for based on an amount of time for which said electronic apparatus is used and not based on an amount of contents data;
    a contents data use time period measurement means that measures a time period for which the contents data is used;
    an apparatus use time period measurement means that measures a time period for which said electronic apparatus is used; and
    a charging processing means that produces,
        when the determination means determines that the contents data is proprietary, information to be used by a charging process based on at least a result of the measurement of said contents data use time period measurement means;
        when the determination means determines that the contents data is non-proprietary, information to be used by the charging process based on the result of the measurement of said apparatus use time period measurement means.

* * * * *